United States Patent
Ichikawa et al.

(10) Patent No.: US 10,569,695 B2
(45) Date of Patent: Feb. 25, 2020

(54) VEHICULAR LAMP

(71) Applicant: Koito Manufacturing Co., Ltd, Tokyo (JP)

(72) Inventors: Tomoyuki Ichikawa, Shizuoka (JP); Satoshi Kikuchi, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 15/888,027

(22) Filed: Feb. 4, 2018

(65) Prior Publication Data

US 2018/0178710 A1    Jun. 28, 2018

Related U.S. Application Data

(63) Continuation of application No. PCT/JP2016/072203, filed on Jul. 28, 2016.

(30) Foreign Application Priority Data

Aug. 4, 2015  (JP) .................................. 2015-154404
Feb. 8, 2016  (JP) .................................. 2016-021811

(Continued)

(51) Int. Cl.
*B60Q 1/04* (2006.01)
*B60Q 1/14* (2006.01)
(Continued)

(52) U.S. Cl.
CPC .............. *B60Q 1/1407* (2013.01); *B60Q 1/04* (2013.01); *H02M 3/155* (2013.01);
(Continued)

(58) Field of Classification Search
CPC ............ H05B 33/0815; H05B 33/0818; H05B 33/0827; H05B 33/0845; H05B 33/0848;
(Continued)

(56) References Cited

U.S. PATENT DOCUMENTS 7,541,750 B2 *  6/2009  Shen .................. H05B 33/0887
                                                       315/291
2007/0013323 A1 *  1/2007  De Oto .............. H05B 33/0815
                                                        315/291
(Continued)

FOREIGN PATENT DOCUMENTS

CN          102037783 A       4/2011
CN          103687186 A       3/2014
(Continued)

OTHER PUBLICATIONS

International Search Report on corresponding PCT Application No. PCT/JP2016/072203, dated Oct. 12, 2016.
(Continued)

*Primary Examiner* — Jason Crawford
(74) *Attorney, Agent, or Firm* — Buchanan Ingersoll & Rooney PC

(57) ABSTRACT

A converter controller controls a switching converter. A current detection circuit generates a current detection signal $V_{CS}$ that corresponds to a coil current $I_L$ of the switching converter. An error amplifier amplifies the difference between the current detection signal $V_{CS}$ and an analog signal $V_{ADIM}$ that indicates a current to be supplied to a semiconductor light source, so as to generate an error signal $V_{ERR}$. A hysteresis comparator compares the current detection signal $V_{CS}$ with an upper threshold signal $V_{THH}$ and a lower threshold signal $V_{THL}$ determined according to the error signal $V_{ERR}$, and generates a control pulse $S_{CNT}$ that corresponds to a comparison result. A driver drives a switching transistor according to the control pulse $S_{CNT}$.

25 Claims, 34 Drawing Sheets

(30) Foreign Application Priority Data

Mar. 16, 2016 (JP) ................................ 2016-052924
Jun. 9, 2016 (JP) ................................ 2016-115494

(51) Int. Cl.
   *H02M 3/155* (2006.01)
   *H05B 33/08* (2020.01)
   *H05B 37/02* (2006.01)

(52) U.S. Cl.
   CPC ....... *H05B 33/083* (2013.01); *H05B 33/0809* (2013.01); *H05B 33/0815* (2013.01); *H05B 33/0845* (2013.01); *H05B 37/0209* (2013.01)

(58) Field of Classification Search
   CPC . H05B 37/0209; H05B 37/0281; B60Q 11/00
   See application file for complete search history.

(56) References Cited

U.S. PATENT DOCUMENTS

| | | |
|---|---|---|
| 2009/0015178 A1 | 1/2009 | Liu |
| 2009/0146631 A1 | 6/2009 | Fukumori |
| 2009/0224695 A1* | 9/2009 | Van Erp ............. H05B 33/0815 315/302 |
| 2009/0322261 A1 | 12/2009 | Araki |
| 2010/0315016 A1 | 12/2010 | Hoogzaad |
| 2011/0198998 A1* | 8/2011 | Kasaba ............... H02M 3/1582 315/77 |
| 2014/0070728 A1 | 3/2014 | Pflaum |
| 2014/0265890 A1* | 9/2014 | Ito ........................... B60Q 1/00 315/186 |
| 2015/0230302 A1* | 8/2015 | Ito ..................... H05B 33/0815 315/77 |
| 2016/0081171 A1* | 3/2016 | Ichikawa ............. B60Q 1/0088 315/77 |
| 2016/0096467 A1* | 4/2016 | Murakami ......... H05B 33/0815 315/82 |
| 2018/0056853 A1* | 3/2018 | Muramatsu .......... B60Q 1/1423 |

FOREIGN PATENT DOCUMENTS

| | | |
|---|---|---|
| EP | 2234255 A1 | 9/2010 |
| EP | 2675247 A1 | 12/2013 |
| EP | 2852258 A1 | 3/2015 |
| JP | 2008166165 A | 7/2008 |
| JP | 2009009817 A | 1/2009 |
| JP | 2010176853 A | 8/2010 |
| JP | 2010273447 A | 12/2010 |
| JP | 2013093214 A | 5/2013 |
| JP | 2013258003 A | 12/2013 |
| JP | 2014216600 A | 11/2014 |
| WO | 2008068682 A1 | 6/2008 |
| WO | 2009095865 A2 | 8/2009 |
| WO | 2011135505 A | 3/2011 |

OTHER PUBLICATIONS

International Preliminary Report on Patentability with Written Opinion of ISA on corresponding PCT Application No. PCT/JP2016/072203, dated Feb. 8, 2018.
C.J. Chuang et al., "An Efficient Fast Response Hysteresis Buck Converter with Adaptive Synthetic Ripple Modulator", 8th International Conference on Power Electronics—ECCE Asia, 2011 IEEE 8th International Conference, May 30, 2011, The Shilla Jeju, Korea, pp. 620-627.
M. Bodetto et al., "Sliding Mode Control of a Ćuk Converter with Variable Hysteresis Width for HBLEDs Applications", 2014 IEEE 11th International Multi-Conference on Systems, Signals & Devices, Feb. 11, 2014, pp. 1-6.
Chinese Office Action dated Mar. 26, 2019 issued by the Chinese Patent Office in corresponding Chinese Patent Application No. 201680045718.X, with English translation (18 pages).
Extended European Search Report dated Apr. 17, 2019 issued by the European Patent Office in corresponding European Patent Application No. 16832912.6 (24 pages).
Partial Supplementary European Search Report for corresponding European Application No. 16832912.6, dated Feb. 18, 2019, 18 pages.

* cited by examiner

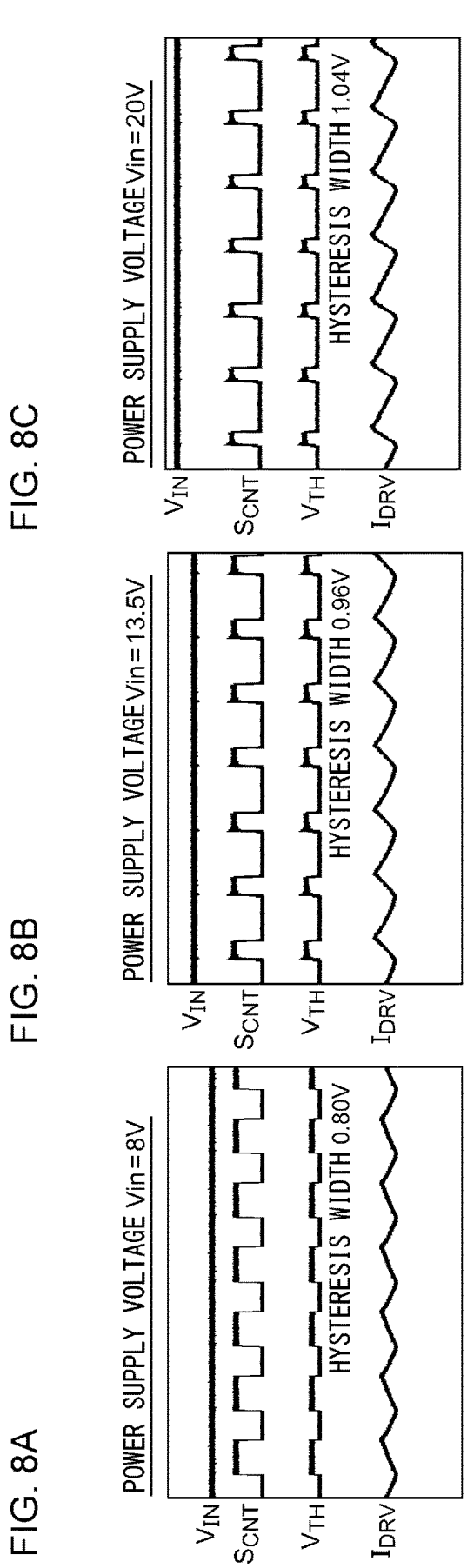

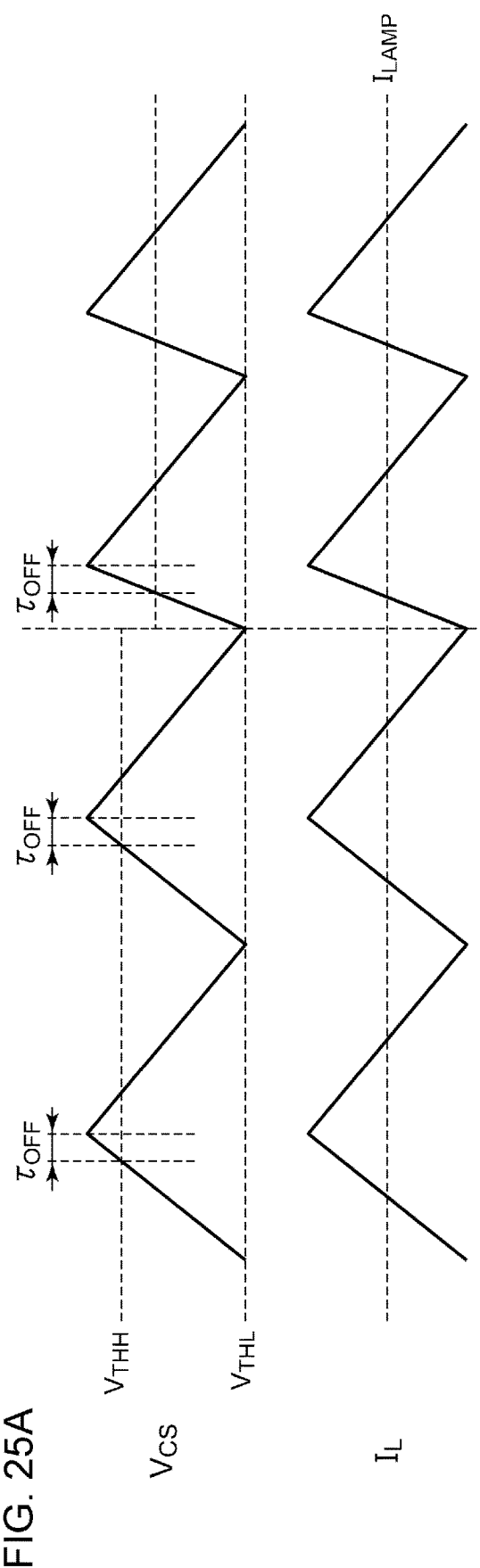
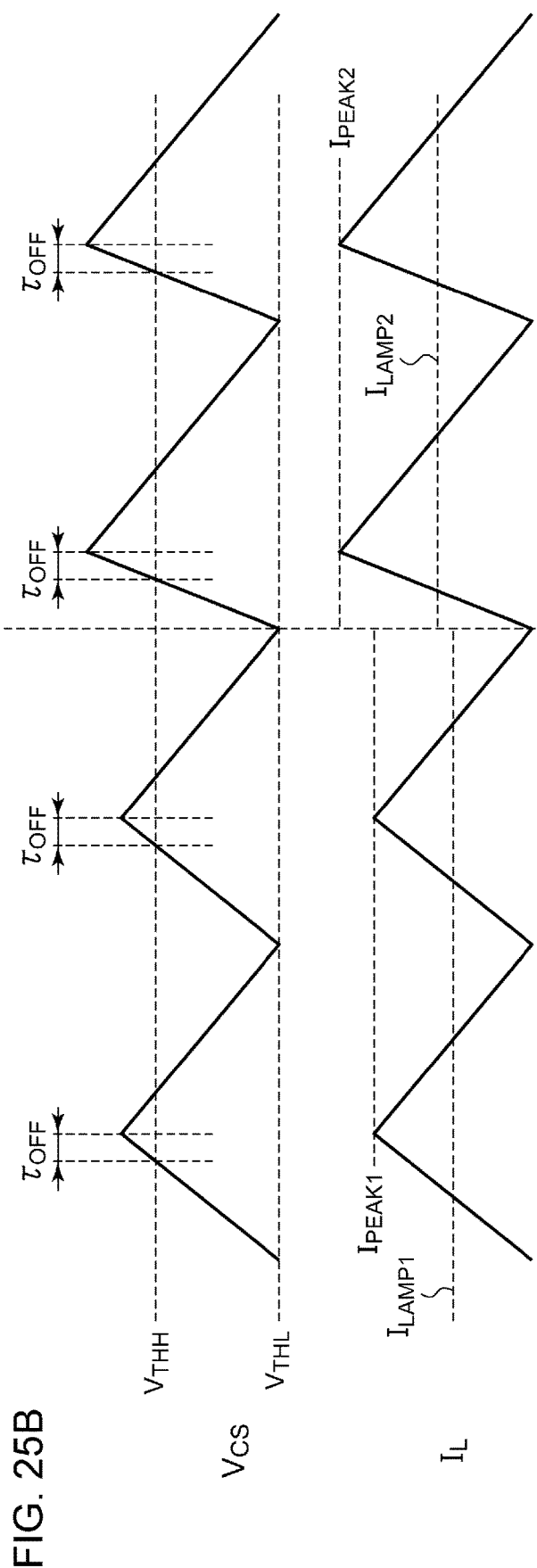

FIG. 32

VEHICULAR LAMP

BACKGROUND OF THE INVENTION

1. Field of the Invention

The present invention relates to a lighting circuit for a semiconductor light source.

2. Description of the Related Art

Typical vehicular lamps are capable of switching between a low-beam mode and a high-beam mode. The low-beam mode is used to illuminate a close range with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, this leads to a problem of imparting glare to a pedestrian or otherwise a driver of a leading vehicle ahead of the vehicle.

In recent years, the ADB (Adaptive Driving Beam) technique has been proposed, in which a high-beam distribution pattern is dynamically and adaptively controlled based on the state of the surroundings of a vehicle. With the ADB technique, the presence or absence of a leading vehicle, an oncoming vehicle, or a pedestrian ahead of the vehicle is detected, and illumination is reduced or otherwise turned off for a region that corresponds to such a vehicle or pedestrian thus detected, thereby reducing glare imparted to such a vehicle or pedestrian.

In many cases, a switching converter is used to turn on a light source of an vehicular lamp. With the ADB control operation, there is a need to turn on and off the light source at high speed and to change the light amount at high speed. In order to meet such a request, the present inventor has investigated an arrangement employing a hysteresis control method (which is also referred to as "Bang-Bang control" or "ripple control") that provides high responsivity. FIG. 1 is a block diagram showing a vehicular lamp employing a hysteresis control method investigated by the present inventors. It should be noted that this comparison technique thus investigated should not be recognized as a known technique.

A vehicular lamp 1r includes a semiconductor light source 10 and a lighting circuit 20r. The semiconductor light source 10 includes a semiconductor device such as an LED (light-emitting diode), an LD (laser diode), or the like. The lighting circuit 20r includes a switching converter 30r, an output filter 31, and a converter controller 32r.

The switching converter 30r receives a battery voltage $V_{BAT}$ (which will also be referred to as the "input voltage $V_{IN}$") from a battery 2 via a switch 4, and supplies a lamp current (driving current) $I_{LAMP}$ to the semiconductor light source 10. For example, the switching converter 30r is configured as a step-down converter (Buck converter) including an input capacitor C1, a switching transistor M1, a diode D1, and an inductor L1.

The converter controller 32r detects a coil current $I_L$ of the switching converter 30r (i.e., output current of the step-down converter), and adjusts the duty ratio of the switching of the switching transistor M1 such that the output current $I_{LAMP}$ that corresponds to the coil current $I_L$ matches a target current $I_{REF}$ that corresponds to a target light amount of the semiconductor light source 10. The converter controller 32r is configured as a controller employing a hysteresis control method, including a current detection circuit 34, a hysteresis comparator 36, and a driver 38. A current sensing resistor (which will be referred to as the "sensing resistor" hereafter) $R_{CS}$ is arranged on a path of the coil current $I_L$. A voltage drop occurs across the sensing resistor $R_{CS}$ in proportion to the coil current $I_L$. The current detection circuit 34 generates a current detection signal $V_{CS}$ that represents the present coil current $I_L$ based on the voltage drop across the sensing resistor $R_{CS}$.

The hysteresis comparator 36 compares the current detection signal $V_{CS}$ with a pair of threshold signals $V_{THL}$ and $V_{THH}$ determined according to a reference voltage $V_{REF}$, and generates a control pulse $S_{CNT}$ that corresponds to a comparison result.

Specifically, when the current detection signal $V_{CS}$ reaches an upper threshold signal $V_{THH}$ that corresponds to a peak value $I_{PEAK}$ of the coil current $I_L$, the control pulse $S_{CNT}$ is switched to a first level. When the current detection signal $V_{CS}$ reaches a lower threshold signal $V_{THL}$ that corresponds to a bottom value $I_{BOTTOM}$ of the coil current $I_L$, the control pulse $S_{CNT}$ is switched to a second level. The driver 38 drives the switching transistor M1 according to the control pulse $S_{CNT}$.

The coil current $I_L$ reciprocates between the peak value $I_{PEAK}$ and the bottom value $I_{BOTTOM}$. A capacitor C2 and an inductor L2 form an output filter (current smoothing filter) 31, and smooth the coil current $I_L$ so as to generate the lamp current $I_{LAMP}$. The lamp current $I_{LAMP}$ thus obtained is supplied to the semiconductor light source 10.

Such a converter employing the hysteresis control method has an advantage of high-speed responsivity. However, in some cases, this arrangement has a disadvantage from the viewpoint of stability of the switching frequency and stability of the output as compared with a constant current control method employing an error amplifier.

SUMMARY OF THE INVENTION

The present invention has been made in order to solve such a problem. Accordingly, it is an exemplary purpose of an embodiment of the present invention to provide a converter having at least one improved characteristic.

1. An embodiment of the present invention relates to a lighting circuit. The lighting circuit comprises: a switching converter structured to supply electric power to a semiconductor light source; and a converter controller structured to control the switching converter. The converter controller comprises: a current detection circuit structured to generate a current detection signal that corresponds to a driving current supplied from the switching converter to the semiconductor light source; a hysteresis comparator structured to compare the current detection signal with an upper threshold signal and a lower threshold signal, and to generate a control pulse according to a comparison result; and a driver structured to drive a switching transistor of the switching converter according to the control pulse. The voltage difference between the upper threshold signal and the lower threshold signal is changed such that a frequency of the control pulse approaches a target value thereof.

With this embodiment, the switching frequency can be stabilized regardless of fluctuation of the input voltage or the output voltage, or otherwise variation in the inductance.

The lighting circuit may further comprise: a frequency detection circuit structured to generate a frequency detection signal that indicates a frequency of the control pulse; and a threshold voltage adjustment circuit structured to change a voltage difference between the upper threshold signal and the lower threshold signal such that the frequency detection signal approaches a reference value.

The threshold voltage adjustment circuit may comprise: an error signal generating circuit structured to generate a frequency error signal that corresponds to a difference between the frequency detection signal and the reference value; and a voltage source structured to generate an upper voltage and a lower voltage, and to change a voltage difference between the upper voltage and the lower voltage according to the frequency error signal. Also, the hysteresis comparator may comprise: a selector structured to receive the upper voltage and the lower voltage, and to select one from among the upper voltage and the lower voltage according to the control pulse; and a first comparator structured to compare the current detection signal with a threshold voltage that corresponds to an output of the selector.

The voltage source may comprise: a first terminal at which the upper voltage is developed; a second terminal at which the lower voltage is developed; a first resistor arranged between a fixed voltage line and the first terminal; a first transistor arranged between the first terminal and the second terminal; a second resistor arranged between the second terminal and a ground line; and an operational amplifier having an output coupled to a control terminal of the transistor, one input terminal coupled to receive the frequency error signal, and the other input terminal coupled to the second terminal.

The error signal generating circuit may comprise a second comparator structured to generate a pulse signal that indicates a comparison result between the frequency detection signal and a reference value, and a low-pass filter structured to smooth the output signal of the second comparator. The error signal generating circuit may comprise an error amplifier.

The frequency detection signal detection circuit may comprise a F/V conversion circuit. The frequency detection circuit may comprise a high-pass filter coupled to receive a control pulse or otherwise a gate pulse of the switching transistor, a first capacitor, a charger circuit structured to charge the first capacitor, and a second transistor structured to discharge the first capacitor according to the output signal of the high-pass filter. The frequency detection circuit may output a frequency detection signal that corresponds to the amplitude of a first periodic signal that occurs across the first capacitor.

The frequency detection circuit may further comprise a peak hold circuit structured to receive the first periodic signal, and to output a frequency detection signal that indicates the peak value of the first periodic signal. The frequency detection circuit may further comprise an averaging circuit structured to receive the first periodic signal, and to output a frequency detection signal that indicates an average value of the first periodic signal.

With an embodiment, the lighting circuit may further comprise a modulator structured to generate a modulation signal having a lower frequency than a switching frequency of the switching transistor, and to modulate a difference between the upper threshold signal and the lower threshold signal according to the modulation signal.

With an embodiment, the lighting circuit may further comprise a modulator structured to superimpose, on a reference value, a modulation signal having a lower frequency than a switching frequency of the switching transistor. Also, the modulator may comprise an oscillator structured to generate a modulation signal having any one from among a triangle wave, a sawtooth wave, a ramp wave, a sine wave, and a trapezoidal wave.

With an embodiment, the converter controller may be structured to receive a pulse dimming signal that has been pulse modulated according to a target light amount for the semiconductor light source, and to alternately repeat an operating period in which the switching transistor is switched on and off and a suspension period in which the switching is suspended. Also, during the suspension period, the threshold voltage adjustment circuit may hold the frequency detection signal at a level that has been set in the immediately previous operating period. In this case, this arrangement provides improved frequency stability in the pulse dimming operation.

The error signal generating circuit may comprise: a second comparator structured to generate a pulse signal that indicates a comparison result between the frequency detection signal and the reference value; a sample-and-hold capacitor having one end that is set to a fixed electric potential; and a resistor and a switch arranged in series between an output of the second comparator and the other end of the sample-and-hold capacitor. The switch may be structured to switch on and off according to the pulse dimming signal. This allows the frequency detection signal to be held at a level that has been set in the immediately previous operating period even in the suspension period.

Another embodiment of the present invention also relates to a lighting circuit. The lighting circuit comprises: a switching converter structured to supply electric power to a semiconductor light source; and a converter controller structured to control the switching converter. The converter controller comprises: a current detection circuit structured to generate a current detection signal that corresponds to a driving current supplied from the switching converter to the semiconductor light source; a hysteresis comparator structured to compare the current detection signal with an upper threshold signal and a lower threshold signal, and to generate a control pulse according to a comparison result; and a driver structured to drive a switching transistor of the switching converter according to the control pulse. With this embodiment, this arrangement is capable of modulating the switching frequency.

The lighting circuit may further comprise a modulator structured to generate a modulation signal having a lower frequency than a switching frequency of the switching transistor, and to modulate the difference between the upper threshold signal and the lower threshold signal according to the modulation signal.

The modulator may comprise: an oscillator structured to generate a modulation signal having any one from among a triangle wave, a sawtooth wave, a ramp wave, a sine wave, and a trapezoidal wave; and a voltage source structured to generate an upper voltage and a lower voltage, and to change a voltage difference between the upper voltage and the lower voltage according to the modulation signal. Also, the hysteresis comparator may comprise: a selector structured to receive the upper voltage and the lower voltage, and to select one from among the upper voltage and the lower voltage according to the control pulse; and a first comparator structured to compare the current detection signal with a threshold voltage that corresponds to an output of the selector.

Yet another embodiment of the present invention relates to a vehicular lamp. The vehicular lamp comprises: a semiconductor light source; and any one of the aforementioned lighting circuits structured to turn on the semiconductor light source.

2. Yet another embodiment of the present invention relates to a lighting circuit. The lighting circuit comprises: a switching converter structured to supply electric power to a semiconductor light source; and a converter controller structured to control the switching converter. The converter controller comprises: an error amplifier structured to amplify a difference between a first current detection signal that corresponds to a coil current of the switching converter or otherwise an output current thereof and an analog signal that indicates a driving current to be supplied to the semiconductor light source, so as to generate an error signal; a hysteresis comparator structured to compare a second detection signal that corresponds to the coil current with an upper threshold signal and a lower threshold signal determined according to the error signal, and to generate a control pulse that corresponds to a comparison result; and a driver structured to drive a switching transistor of the switching converter according to the control pulse.

This embodiment provides both the hysteresis control operation that provides high-speed responsivity and the feedback control operation that provides high-precision current controllability. This arrangement is capable of solving at least one of the aforementioned problems.

The lighting circuit may further comprise an output filter structured to smooth the output current of the switching converter so as to generate the driving current. Also, the first current detection signal may correspond to the driving current. This provides improved detection precision for the current supplied to the semiconductor light source.

The converter controller may further comprise: a current detection circuit structured to generate the second current detection signal that corresponds to the coil current of the switching converter; and a low-pass filter structured to smooth the second current detection signal so as to generate the first current detection signal. In this case, this arrangement requires only a single sensing resistor inserted on the current path, thereby allowing power loss to be reduced.

Yet another embodiment of the present invention also relates to a lighting circuit. The lighting circuit comprises: a switching converter structured to supply electric power to a semiconductor light source; and a converter controller structured to control the switching converter. The converter controller is structured to be switchable between a hysteresis control mode and an error amplifier control mode based on an output of an error amplifier.

With this embodiment, a suitable mode can be selected according to the operating state of the vehicular lamp such as the lamp current (luminance), input voltage, output voltage, or the like. This arrangement is capable of solving at least one of the aforementioned problems.

The semiconductor light source may be structured as a semiconductor laser. When a driving current supplied to the semiconductor laser is larger than a laser oscillation threshold value, the hysteresis control mode may be selected. When the driving current is smaller than the laser oscillation threshold value, the error amplifier control mode may be selected.

The converter controller may comprise: a first error amplifier structured to amplify a difference between a third current detection signal that corresponds to a DC component of a coil current of the switching converter or otherwise a DC component of an output current thereof and a first analog signal, so as to generate a first error signal; an oscillator structured to generate a periodic signal having any one from among a triangle wave, a sawtooth wave, and a ramp wave; a hysteresis voltage source structured to generate an upper threshold signal and a lower threshold signal determined according to a second analog signal; a comparator unit structured such that: (i) in the hysteresis control mode, the comparator unit compares a fourth current detection signal that corresponds to the coil current with the upper threshold signal and the lower threshold signal, and generates a control pulse that corresponds to a comparison result; and such that (ii) in the error amplifier control mode, the comparator unit compares the first error signal with the periodic signal, and generates a control pulse that corresponds to a comparison result; and a driver structured to drive a switching transistor of the switching converter according to the control pulse.

With this embodiment, the comparator used in the error amplifier control mode and the comparator used in the hysteresis control mode can be configured as a single shared comparator. This allows the circuit area to be reduced.

The lighting circuit according to an embodiment may further comprise: a frequency detection circuit structured to generate a frequency detection signal that indicates a frequency of the control pulse; and a hysteresis width adjuster structured to change a voltage difference between the upper threshold signal and the lower threshold signal such that the frequency detection signal approaches a reference value. This arrangement is capable of suppressing fluctuation in the switching frequency in the hysteresis mode.

Also, the oscillator also share circuit components with at least a part of the frequency detection circuit and the hysteresis width adjuster. For example, the oscillator may generate a periodic signal by charging and discharging a capacitor included in the frequency detection circuit. By configuring this capacitor as a shared capacitor, this allows the circuit area to be further reduced. Also, the oscillator may share a comparator with the hysteresis width adjuster, in order to compare the voltage across the capacitor with the threshold voltage. This allows the circuit area to be further reduced.

The converter controller may further comprise a second error amplifier structured to amplify a difference between a fifth current detection signal that corresponds to a DC component of the coil current or otherwise a DC component of the output current with a reference signal that indicates a target value of the fifth detection signal, so as to generate a second error signal. Also, the hysteresis voltage source may be structured to receive the second error signal instead of the second analog signal, and to generate the upper threshold signal and the lower threshold signal determined according to the second error signal.

The lighting circuit may further comprise an output filter structured to smooth the output current of the switching converter, so as to generate a driving current to be supplied to the semiconductor light source. Also, the fifth current detection signal also correspond to the driving current.

The converter controller may further comprise: a current detection circuit structured to generate a current detection signal that corresponds to the coil current; and a low-pass filter structured to smooth the current detection signal generated by the current detection circuit, so as to generate the fifth current detection signal.

Yet another embodiment of the present invention relates a vehicular lamp. The vehicular lamp may comprise: a semiconductor light source; and any one of the aforementioned lighting circuits structured to turn on the semiconductor light source.

Yet another embodiment of the present invention also relates to a vehicular lamp. The vehicular lamp comprises: a first semiconductor light source and a second semiconductor light source each having one end coupled to a common node; a first switch arranged in series with the first semiconductor light source; a second switch arranged in series with the second semiconductor light source; and a converter structured to supply a driving current to the first semiconductor light source and the second semiconductor light source. The first switch and the second switch are structured to switch on and off according to respective PWM dimming signals having opposite logical values.

With this embodiment, when the duty ratio of the PWM dimming pulse is 100%, this arrangement is capable of turning on one from among the first semiconductor light source and the second semiconductor light source. When the duty ratio thereof is 0%, this arrangement is capable of turning on the other one from among the first semiconductor light source and the second semiconductor light source. By changing the duty ratio, this arrangement is capable of switching between the lighting-on state of the first semiconductor light source and the lighting-on state of the second semiconductor light source in a seamless manner.

It should be noted that any combination of the aforementioned components, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 8A through 8C are operation waveform diagrams each showing the operation of a lighting circuit;

FIG. 25A is an operation waveform diagram showing the operation of the lighting circuit shown in FIG. 24, and FIG. 25B is an operation waveform diagram showing the operation of a conventional lighting circuit;

FIG. 32 is a circuit diagram showing an example configuration of a part of the lighting circuit shown in FIG. 31;

DETAILED DESCRIPTION OF THE INVENTION

Figure 1:
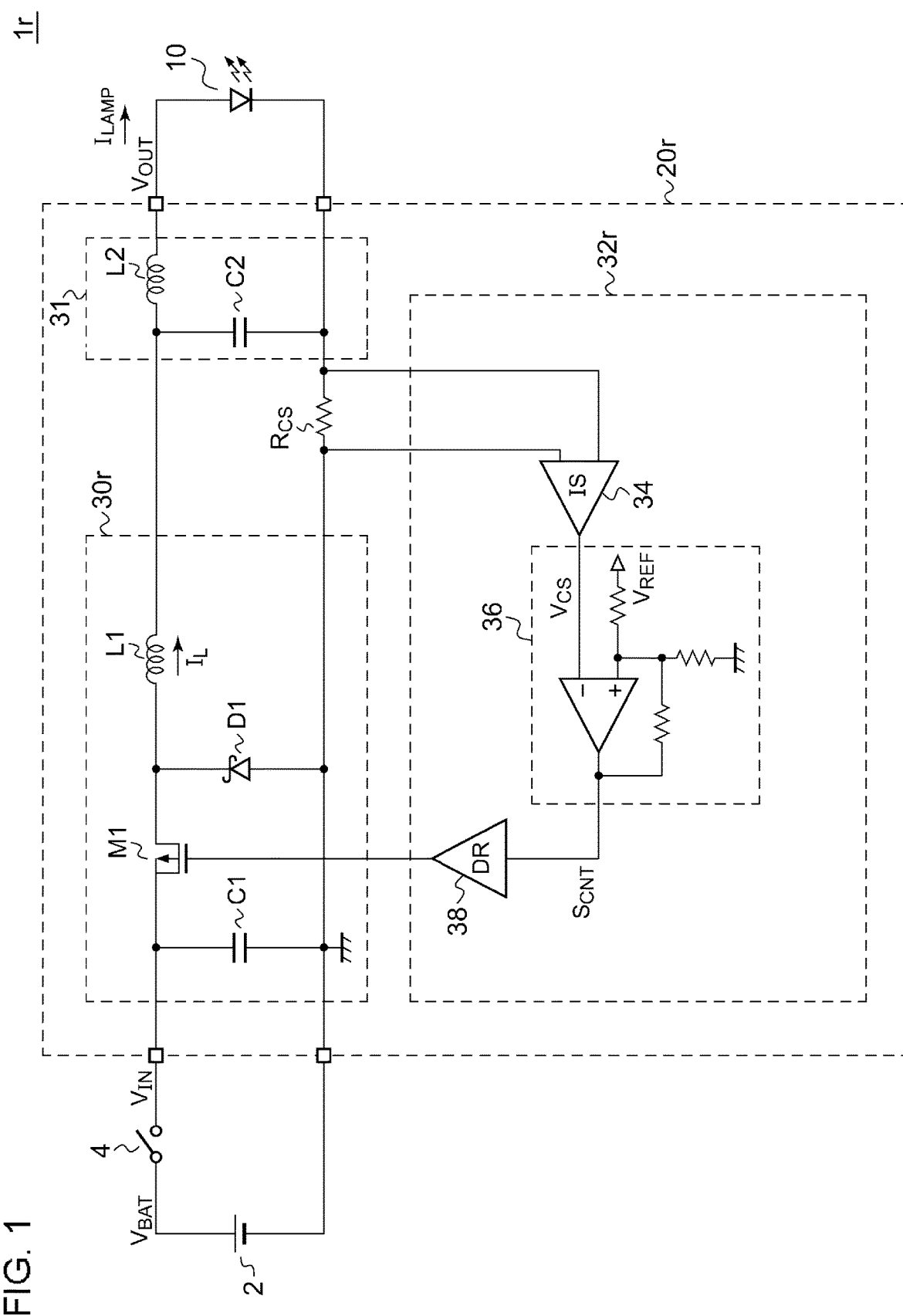
FIG. 1 is a block diagram showing a vehicular lamp employing a hysteresis control method investigated by the present inventors.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

First Problem

Figure 2:
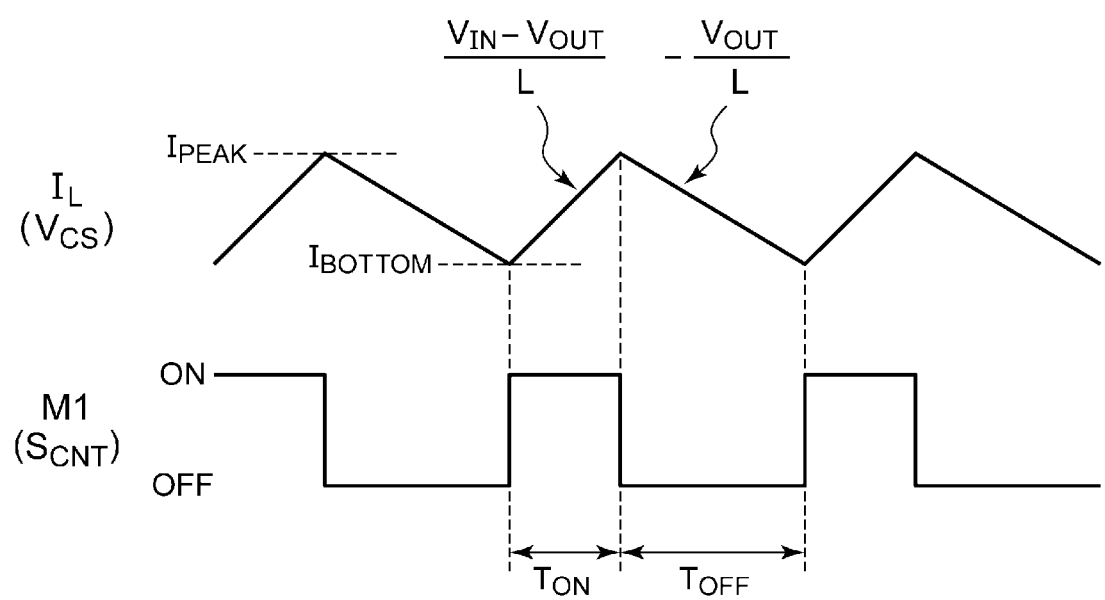
FIG. 2 is an operation waveform diagram showing the operation of a lighting circuit shown in FIG. 1.

FIG. 2 is an operation waveform diagram showing the operation of the lighting circuit 20r shown in FIG. 1. During the high-level period of the control pulse $S_{CNT}$, the switching transistor M1 is turned on. Conversely, during the low-level period of the control pulse $S_{CNT}$, the switching transistor M1 is turned off. When the switching transistor M1 is turned on, $V_{IN}$ is applied to the left end of the inductor L1, and $V_{OUT}$ is applied to the right end. In this state, the voltage across both ends of the inductor L1 is represented by $V_{IN}-V_{OUT}$. Accordingly, the coil current $I_L$ (i.e., driving current $I_{DRV}$) that flows through the inductor L1 rises with a slope represented by $(V_{IN}-V_{OUT})/L$. Here, L represents the inductance of the inductor L1. When the switching transistor M1 is turned off, the left end of the inductor L1 is essentially set to the ground potential (strictly, $-V_F$), and $V_{OUT}$ is applied to the right end. Accordingly, the voltage across both ends of the inductor L1 is represented by $-V_{OUT}$. Thus, the coil current $I_L$ (i.e., driving current $I_{DRV}$) drops with a slope represented by $-V_{OUT}/L$.

The on time $T_{ON}$ and the off time $T_{OFF}$ of the switching transistor M1 are represented by the following Expressions (1) and (2).

$$T_{ON}=\Delta I/\{(V_{IN}-V_{OUT})/L\} \quad (1)$$

$$T_{OFF}=\Delta I/(V_{OUT}/L)\} \quad (2)$$

Here, $\Delta I$ represents the hysteresis width of the coil current $I_L$, i.e., the difference between the peak value $I_{PEAK}$ and the bottom value $I_{BOTTOM}$. As represented by the following Expression, $\Delta I$ is proportional to the difference $\Delta V$ between the upper threshold signal $V_{THH}$ and the lower threshold signal $V_{THL}$.

$$\Delta I=\Delta V/R_{CS}$$

Accordingly, fluctuation of the input voltage $V_{IN}$ (i.e., the battery voltage $V_{BAT}$) or fluctuation of the output voltage $V_{OUT}$ leads to fluctuation in the switching period $T_{ON}+T_{OFF}$ of the switching transistor M1. In other words, this leads to fluctuation in the switching frequency. This leads to a difficulty in supporting a measure against electromagnetic noise.

In particular, it can be assumed that such in-vehicle devices have a problem of large fluctuation of the power supply voltage $V_{BAT}$. Such an arrangement requires large costs in order to support a measure against noise. An arrangement is conceivable configured to monitor the input voltage $V_{IN}$ and the output voltage $V_{OUT}$, and to correct the frequency based on the monitored values. However, such an arrangement is not capable of correcting fluctuation in the switching frequency due to variation in the inductance or due to fluctuation in the temperature.

Second Problem

In a case in which the switching frequency of the switching transistor M1 is maintained at a completely constant value, this leads to concentration of the electromagnetic noise spectrum. In some cases, such a state is undesirable. For example, even in a case in which the switching frequency is designed such that it is outside the radio broadcast band, in some cases, the harmonic waves thereof become a cause of the occurrence of beat noise in a radio.

Description will be made below regarding several embodiments relating to at least one of the first and second problems.

First Embodiment

Figure 3:
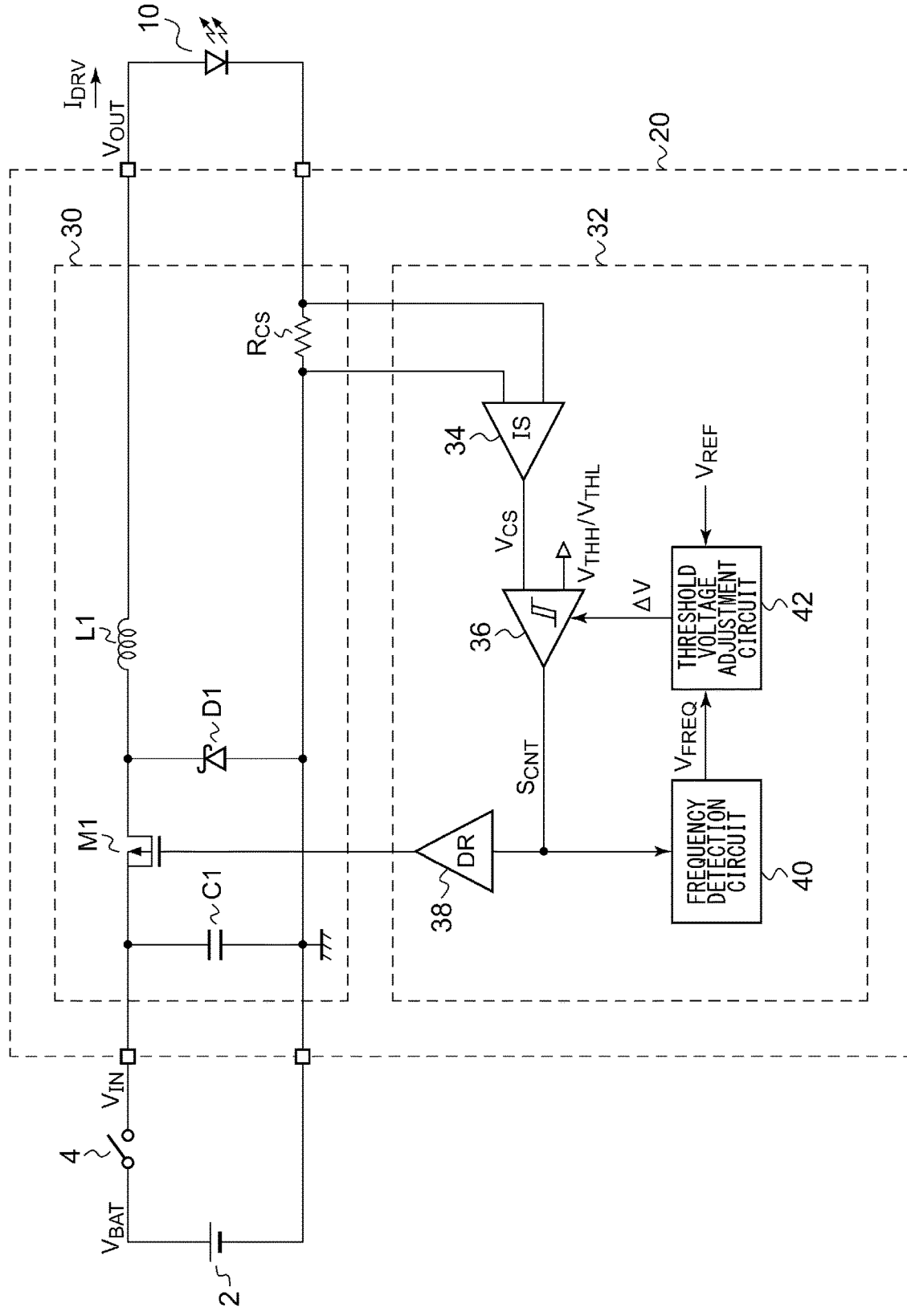
FIG. 3 is a block diagram showing a vehicular lamp according to a first embodiment.

FIG. 3 is a block diagram showing a vehicular lamp 1 according to a first embodiment. The vehicular lamp 1 includes a semiconductor light source 10 and a lighting circuit 20. Examples of the semiconductor light source 10 include LEDs, LDs, organic EL (electroluminescence), and the like. However, the semiconductor light source 10 is not restricted in particular. The lighting circuit 20 includes a switching converter 30 and a converter controller 32. As with the arrangement shown in FIG. 1, the switching converter 30 is configured as a step-down converter. The converter controller 32 stabilizes the driving current $I_{DRV}$ which is supplied from the switching converter 30 to the semiconductor light source 10, to a predetermined target current $I_{REF}$.

The converter controller 32 includes a current detection circuit 34, a hysteresis comparator 36, a driver 38, a frequency detection circuit 40, and a threshold voltage adjustment circuit 42. The current detection circuit 34 generates a current detection signal $V_{CS}$ that corresponds to the driving current $I_{DRV}$ supplied from the switching converter 30 to the semiconductor light source 10. As with the arrangement shown in FIG. 1, a sensing resistor $R_{CS}$ may be arranged on a path of the driving current $I_{DRV}$. The current detection circuit 34 may amplify a voltage drop across the sensing resistor $R_{CS}$ so as to generate the current detection signal $V_{CS}$.

The hysteresis comparator 36 compares the current detection signal $V_{CS}$ with an upper threshold signal $V_{THH}$ and a lower threshold signal $V_{THL}$, and generates a control pulse $S_{CNT}$ that corresponds to the comparison result. The driver 38 drives a switching transistor M1 of the switching converter 30 according to the control pulse $S_{CNT}$. In the present embodiment, the high level of the control pulse $S_{CNT}$ corresponds to the on state of the switching transistor M1. The low level of the control pulse $S_{CNT}$ corresponds to the off state of the switching transistor M1.

The frequency detection circuit 40 generates a frequency detection signal $V_{FREQ}$ that indicates the frequency of the control pulse $S_{CNT}$, i.e., the switching frequency of the switching transistor M1.

The threshold adjustment circuit 42 adjusts the voltage difference $\Delta V$ between the upper threshold signal $V_{THH}$ and the lower threshold signal $V_{THL}$ such that the frequency detection signal $V_{FREQ}$ approaches a reference value $V_{REF}$. It should be noted that, in this operation, the threshold voltage adjustment circuit 42 preferably maintains the center level between the upper threshold signal $V_{THH}$ and the lower threshold signal $V_{THL}$.

The above is the basic configuration of the lighting circuit 20. The present invention encompasses various kinds of apparatuses and circuits that can be regarded as a block configuration or a circuit configuration shown in FIG. 3, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 4:
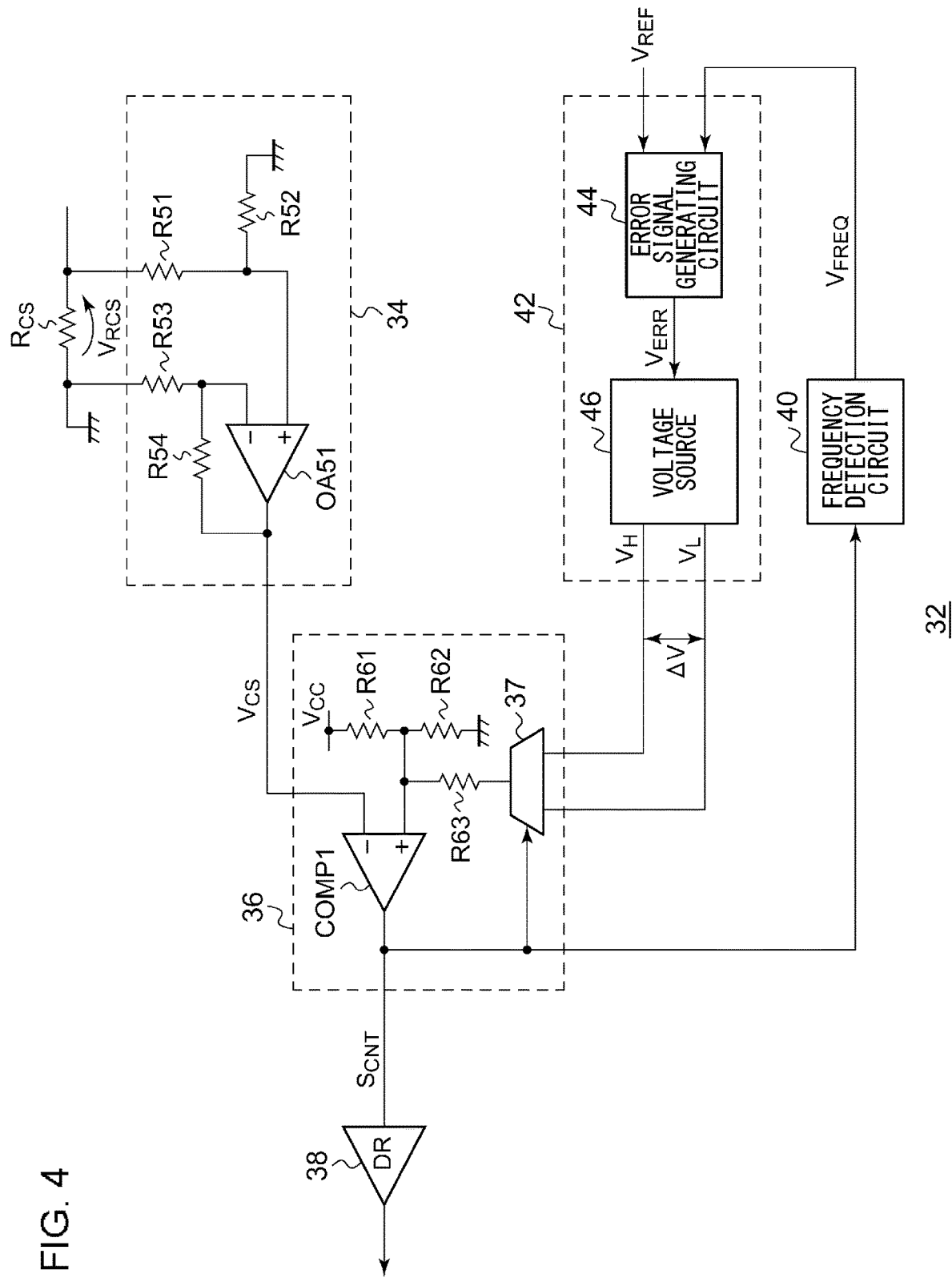
FIG. 4 is a circuit diagram showing an example configuration of a converter controller according to the first embodiment.

FIG. 4 is a circuit diagram showing an example configuration of the converter controller 32 according to the first embodiment. The current detection circuit 34 is configured as a non-inverting amplifier including resistors R51 through R54 and an operational amplifier OA51. The detection signal $V_{CS}$ is represented by the following Expression.

$$V_{CS}=V_{RCS}\times R52/(R51+R52)\times(R53+R54)/R53$$

The configuration of the current detection circuit 34 is not restricted in particular. For example, the resistors R51 and R52 may be omitted. Also, the sensing resistor $R_{CS}$ may be arranged on the anode side of the semiconductor light source 10 in series with the inductor L1. In this case, the current detection circuit 34 may be configured to convert the output voltage $V_{RCS}$, generated with the output voltage $V_{OUT}$ as a reference voltage, to a voltage with the ground voltage (0 V) as a reference voltage. Also, the current detection circuit 34 may be configured as an inverting amplifier. In this case, the polarity of the hysteresis comparator 36 arranged as a downstream stage may preferably be inverted.

The threshold voltage adjustment circuit 42 includes an error signal generating circuit 44 and a voltage source 46. The error signal generating circuit 44 generates a frequency error signal $V_{ERR}$ that corresponds to the difference between the frequency detection signal $V_{FREQ}$ and the reference value $V_{REF}$. The voltage source 46 generates a set of the upper voltage $V_H$ and the lower voltage $V_L$. The voltage source 46 adjusts the voltage difference $\Delta V$ ($=V_H$ and $V_L$) between the two voltages $V_H$ and $V_L$ according to the frequency error signal $V_{ERR}$ while maintaining the average of the two voltages $V_H$ and $V_L$.

The hysteresis comparator 36 includes a first comparator COMP1 and a selector 37. The selector 37 receives the upper voltage $V_H$ and the lower voltage $V_L$, and selects one from among them that corresponds to the control pulse $S_{CNT}$. Specifically, when the control pulse $S_{CNT}$ is set to a level (high level) that corresponds to the on state of the switching transistor M1, the selector 37 selects the upper voltage $V_H$. When the control pulse $S_{CNT}$ is set to a level (low level) that corresponds to the off state of the switching transistor M1, the selector 37 selects the lower voltage $V_L$. The first comparator COMP1 compares the current detection signal $V_{CS}$ with the threshold voltage $V_{THH}$ or $V_{THL}$ that corresponds to the output of the selector 37. In FIG. 4, the output voltages ($V_H$ and $V_L$) are subjected to weighted averaging (weighted addition) by means of the resistors R61 through R63, so as to generate the threshold voltages ($V_{THH}$ and $V_{THL}$). It should be noted that the resistors R61 through R63 may be omitted. In this case, the upper voltage $V_H$ and the lower voltage $V_L$ are employed as the upper threshold signal $V_{THH}$ and the lower threshold signal $V_{THL}$, respectively.

Figure 5:
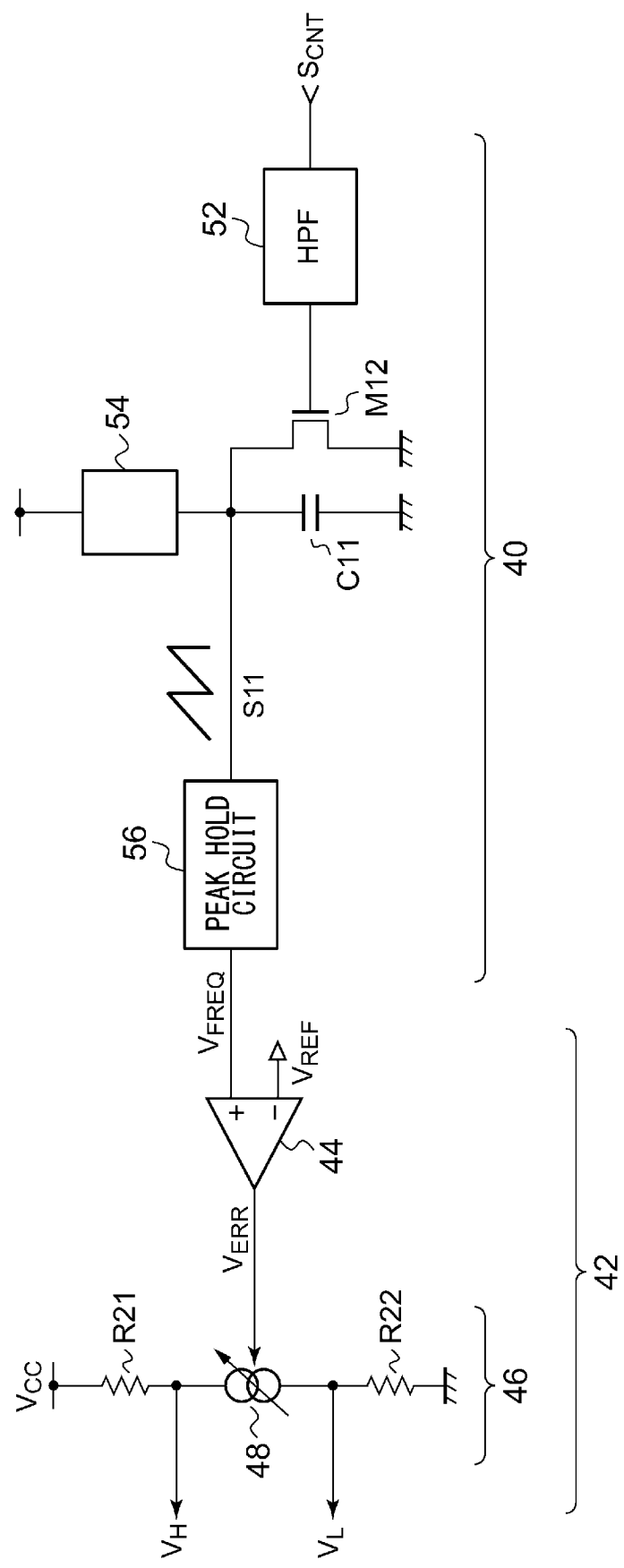
FIG. 5 is a circuit diagram showing an example configuration of a frequency detection circuit and a threshold voltage adjustment circuit.

FIG. 5 is a circuit diagram showing an example configuration of the frequency detection circuit 40 and the threshold voltage adjustment circuit 42. The voltage source 46 includes a first terminal P1, a second terminal P2, a first resistor R21, a second resistor R22, and a current source 48. The current source 48 is provided on a path including the first resistor R21 and the second resistor R22, and generates a current $I_C$ that corresponds to the frequency error signal $V_{ERR}$. The upper voltage $V_H$ and the lower voltage $V_L$ occur at the first terminal P1 and the second terminal P2, respectively, and are represented by the following Expressions.

$$V_H=V_{CC}-R21\times I_C$$

$$V_L=R22\times I_C$$

The voltage difference $\Delta V$ between the two voltages $V_H$ and $V_L$ is represented by $\Delta V=V_H-V_L=V_{CC}-I_C\times(R21+R22)$. When the current $I_C$ changes according to the frequency error signal $V_{ERR}$, this changes the voltage difference $\Delta V$.

The average value of the two voltages $V_H$ and $V_L$ is represented by $(V_H+V_L)/2=(V_{CC}-R21\times I_C+R22\times I_C)/2$. In a case in which R21=R22, the average value is represented by $V_{CC}/2$, which is a constant value.

The frequency detection circuit 40 can be regarded as a F/V conversion circuit. The frequency detection circuit 40 includes a high-pass filter 52, a first capacitor C11, a second transistor M12, a charger circuit 54, and a peak hold circuit 56. The high-pass filter 52 receives the control pulse $S_{CNT}$ or otherwise a gate pulse of the switching transistor M1. The high-pass filter 52 can also be regarded as a differentiating circuit. One end of the first capacitor C11 is grounded. The charger circuit 54 charges the first capacitor C11. The charger circuit 54 is configured as a current source or otherwise a resistor. The second transistor M12 is coupled in parallel with the first capacitor C11. When the output signal of the high-pass filter 52 exceeds the gate-source threshold voltage of the second transistor M12, the first capacitor C11 is discharged.

A first periodic signal S11 having a ramp waveform is generated at the first capacitor C11. The frequency detection circuit 40 outputs the frequency detection signal $V_{FREQ}$ that corresponds to the amplitude of the first periodic signal S11. Specifically, the peak hold circuit 56 receives the first periodic signal S11, and outputs the frequency detection signal $V_{FREQ}$ that indicates the peak value of the first periodic signal S11.

Figure 6:
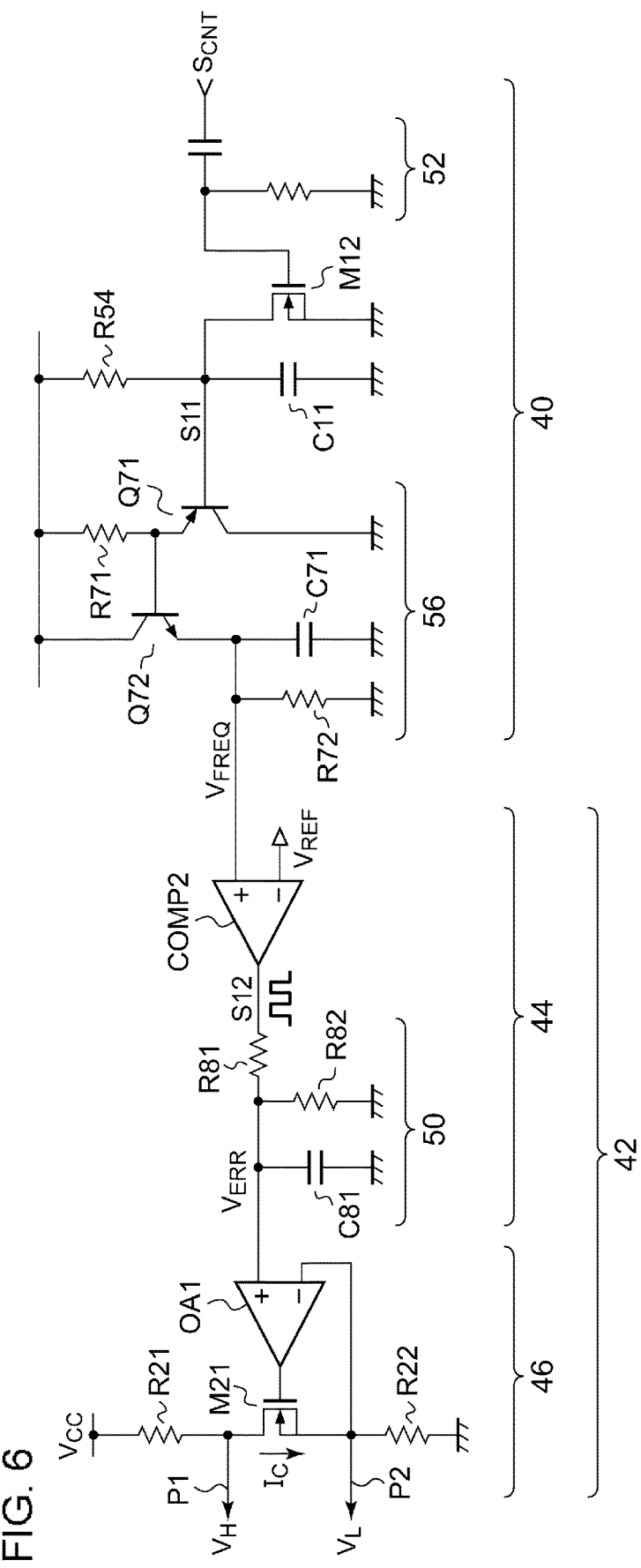
FIG. 6 is a circuit diagram showing a more specific configuration of the frequency detection circuit and the threshold voltage adjustment circuit.

FIG. 6 is a circuit diagram showing a more specific configuration of the frequency detection circuit 40 and the threshold voltage adjustment circuit 42. The peak hold circuit 56 includes transistors Q71 and Q72, resistors R71 and R72, and a capacitor C71. It should be noted that the configuration of the peak hold circuit 56 is not restricted to such an arrangement.

The error signal generating circuit 44 includes a second comparator COMP2 and a low-pass filter 50. The second comparator COMP2 generates a pulse signal S12 that indicates a comparison result between the frequency detection signal $V_{FREQ}$ and the reference value $V_{REF}$. The low-pass filter 50 smoothes the output signal S12 of the second comparator COMP2. The low-pass filter 50 includes resistors R81 and R82 and a capacitor C81. However, the configuration of the low-pass filter 50 is not restricted in particular.

The error signal generating circuit 44 may be an error amplifier configured as an operational amplifier. Alternatively, the error signal generating circuit 44 may be an error amplifier including a transconductance amplifier that generates a current that corresponds to a difference between the frequency detection signal $V_{FREQ}$ and the reference value $V_{REF}$ and a capacitor that smoothes the output current of the transconductance amplifier and converts the smoothed output current into a voltage.

The voltage source 46 includes a first resistor R21, a second resistor R22, a first transistor M21, and an operational amplifier OA1. The first transistor M21 is arranged between the first terminal P1 and the second terminal P2. The output of the operational amplifier OA1 is coupled to a control terminal (gate) of the first transistor. The frequency error signal $V_{ERR}$ is input to one input terminal (non-inverting input terminal) of the operational amplifier OA1, and the other input terminal (inverting input terminal) is coupled to the second terminal P2. The operational amplifier OA1, the first transistor M21, and the second resistor R22 can be regarded as a current source that generates the current $I_C$ that corresponds to the frequency error signal $V_{ERR}$, which corresponds to the current source 48 shown in FIG. 5. With this configuration, the upper voltage $V_H$ and the lower voltage $V_L$ are represented by the following Expressions.

$$V_H = V_{CC} - R21 \times I_C = V_{CC} - R21 \times V_{ERR}/R22$$

$$V_L = V_{ERR}$$

In a case in which R21=R22, the following Expressions hold true.

$$V_H = V_{CC} - V_{ERR}$$

$$V_L = V_{ERR}$$

Figure 7:
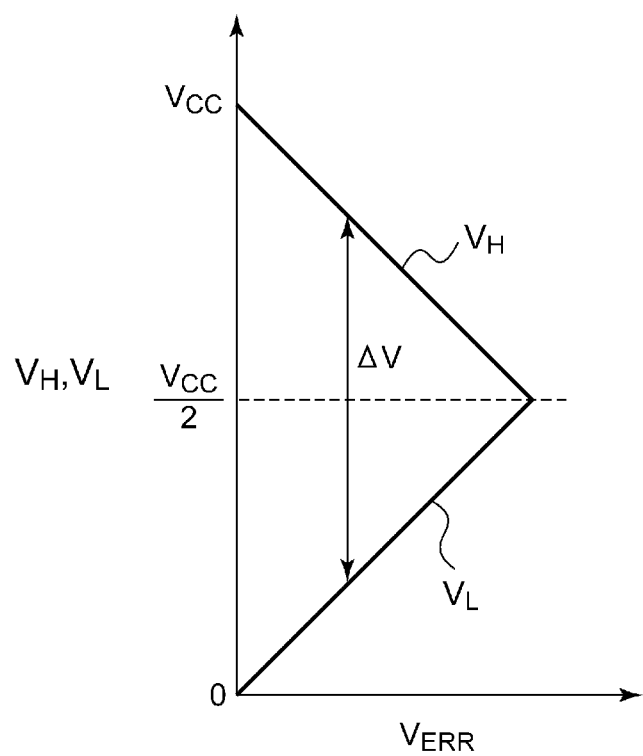
FIG. 7 is a diagram showing an upper voltage $V_H$ and a lower voltage $V_L$.

FIG. 7 is a diagram showing the upper voltage $V_H$ and the lower voltage $V_L$.

The above is the configuration of the lighting circuit 20 according to the first embodiment. Next, description will be made regarding the operation thereof.

When the switching frequency of the switching transistor M1 is higher than the target frequency, the relation $V_{FREQ} < V_{REF}$ holds true, which lowers the frequency error signal $V_{ERR}$. This raises the voltage difference $\Delta V$ between the upper voltage $V_H$ and the lower voltage $V_L$, which raises the voltage difference between the threshold voltages $V_{THH}$ and $V_{THL}$. This provides a feedback operation so as to lower the switching frequency, i.e., such that the switching frequency approaches the target frequency. Conversely, when the switching frequency of the switching transistor M1 is lower than the target frequency, the relation $V_{FREQ} > V_{REF}$ holds true, which raises the frequency error signal $V_{ERR}$. This lowers the voltage difference $\Delta V$ between the upper voltage $V_H$ and the lower voltage $V_L$. This provides a feedback operation so as to raise the switching frequency, i.e., such that the switching frequency approaches the target frequency. As described above, with the lighting circuit 20, this arrangement is capable of stabilizing the switching frequency such that it approaches the target frequency.

Furthermore, by maintaining the average level of the upper threshold signal $V_{THH}$ and the lower threshold signal $V_{THL}$ at a constant level, this arrangement is capable of maintaining the average of the driving current $I_{DRV}$ at a constant value. This is capable of preventing the occurrence of flicker in the semiconductor light source 10.

Figure 9A:
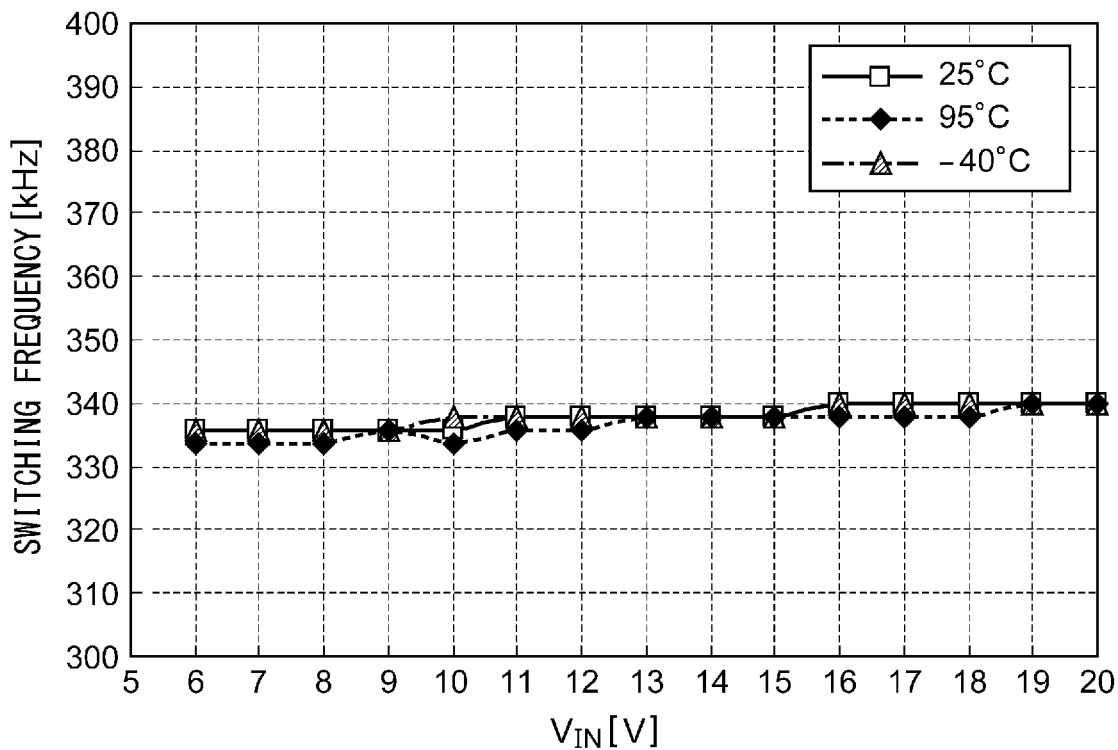
FIG. 9A is a diagram showing the relation between the input voltage $V_{IN}$ and the switching frequency.
Figure 9B:
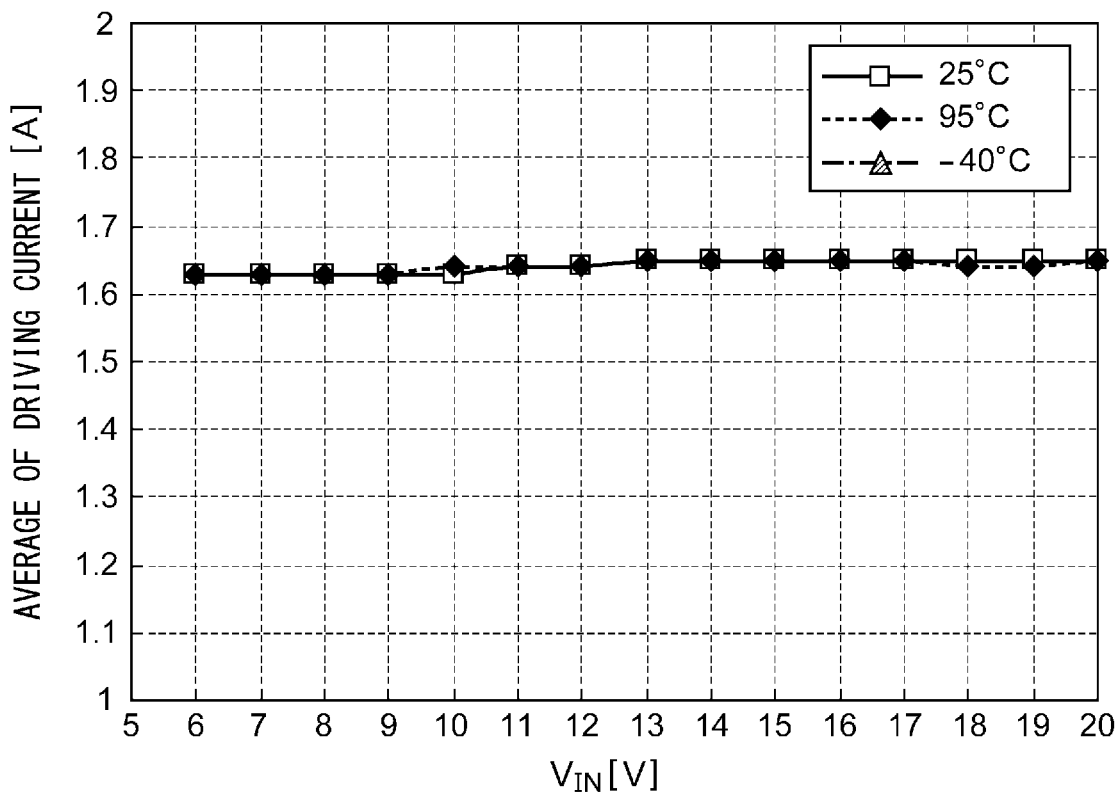
FIG. 9B is a diagram showing the relation between the input voltage $V_{IN}$ and the average value of the driving current $I_{DRV}$.

FIGS. 8A through 8C are operation waveform diagrams each showing the operation of the lighting circuit 20. FIGS. 8A through 8C show operation waveforms with different input voltages $V_{IN}$. FIG. 9A is a diagram showing the relation between the input voltage $V_{IN}$ and the switching frequency. FIG. 9B is a diagram showing the relation between the input voltage $V_{IN}$ and an average value of the driving current $I_{DRV}$.

The frequency feedback control operation functions as an effective measure against fluctuation in the switching frequency due to all kinds of fluctuation and variation such as fluctuation of the output voltage $V_{OUT}$, variation in the inductance of the inductor L1, and fluctuation in the temperature, in addition to fluctuation of the input voltage $V_{IN}$. This is capable of suppressing unexpected fluctuation in the switching frequency. This allows the costs required for a measure against switching noise to be reduced.

Next, description will be made regarding modifications of the first embodiment.

[First Modification]

Figure 10A:
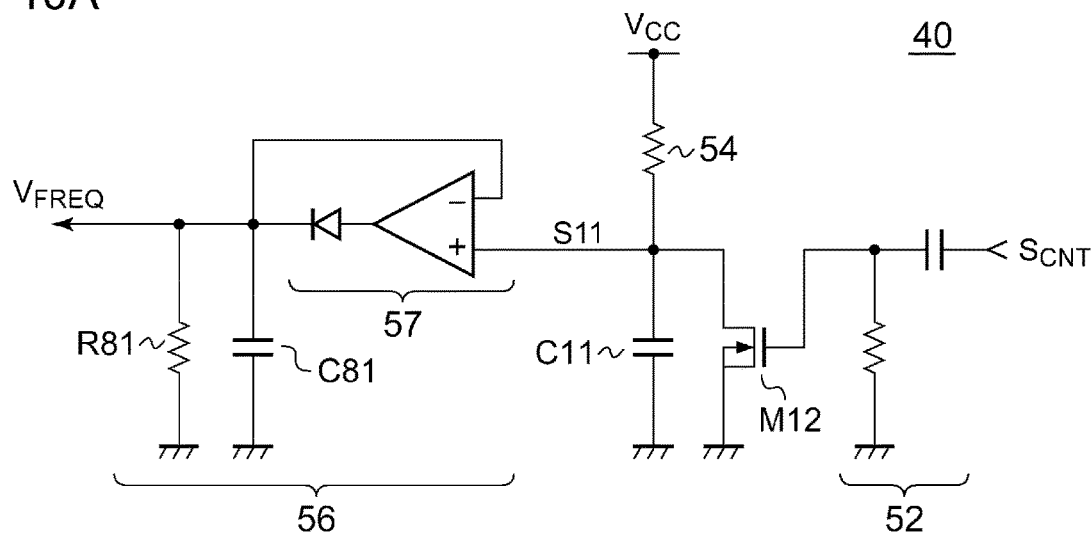
FIGS. 10A and 10B are circuit diagrams each showing the frequency detection circuit according to a first modification.
Figure 10B:
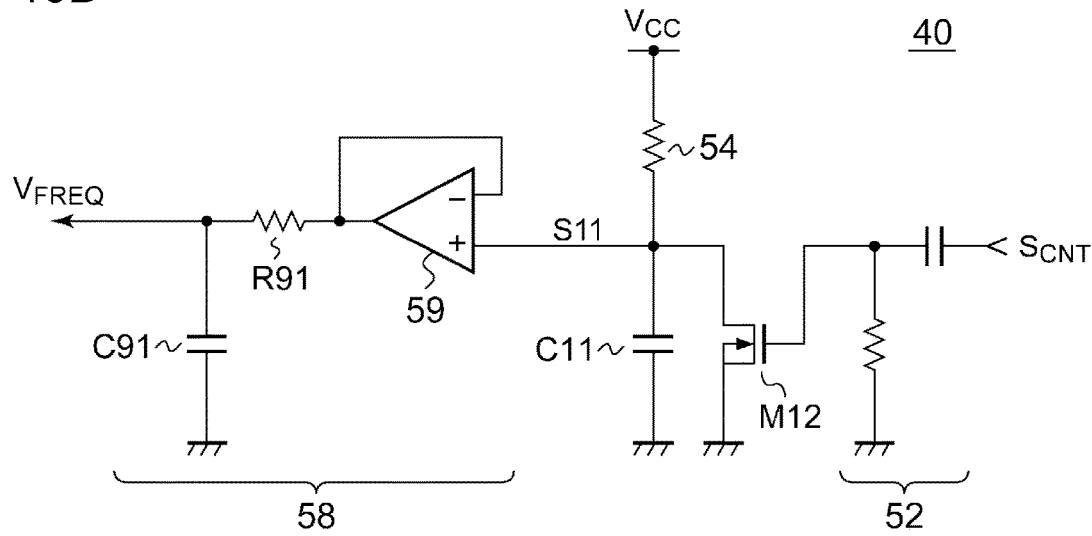

FIGS. 10A and 10B are circuit diagrams each showing the frequency detection circuit 40 according to the first modification. In the frequency detection circuit 40 shown in FIG. 10A, the peak hold circuit 56 has a configuration that differs from that shown in FIG. 6. The peak hold circuit 56 includes a capacitor C81, a resistor R81, and a buffer 57. The buffer 57 is capable of functioning as a current source. However, the buffer 57 is not capable of functioning as a current sink. A peak voltage of the first periodic signal S11 occurs at the capacitor C81.

The frequency detection circuit 40 shown in FIG. 10B includes an averaging circuit 58 instead of the peak hold circuit 56. The averaging circuit 58 includes a buffer 59, a resistor R91, and a capacitor C91, for example. The resistor 91 and the capacitor C91 function as a low-pass filter, which averages the output of the buffer 59.

[Second Modification]

Figure 11:
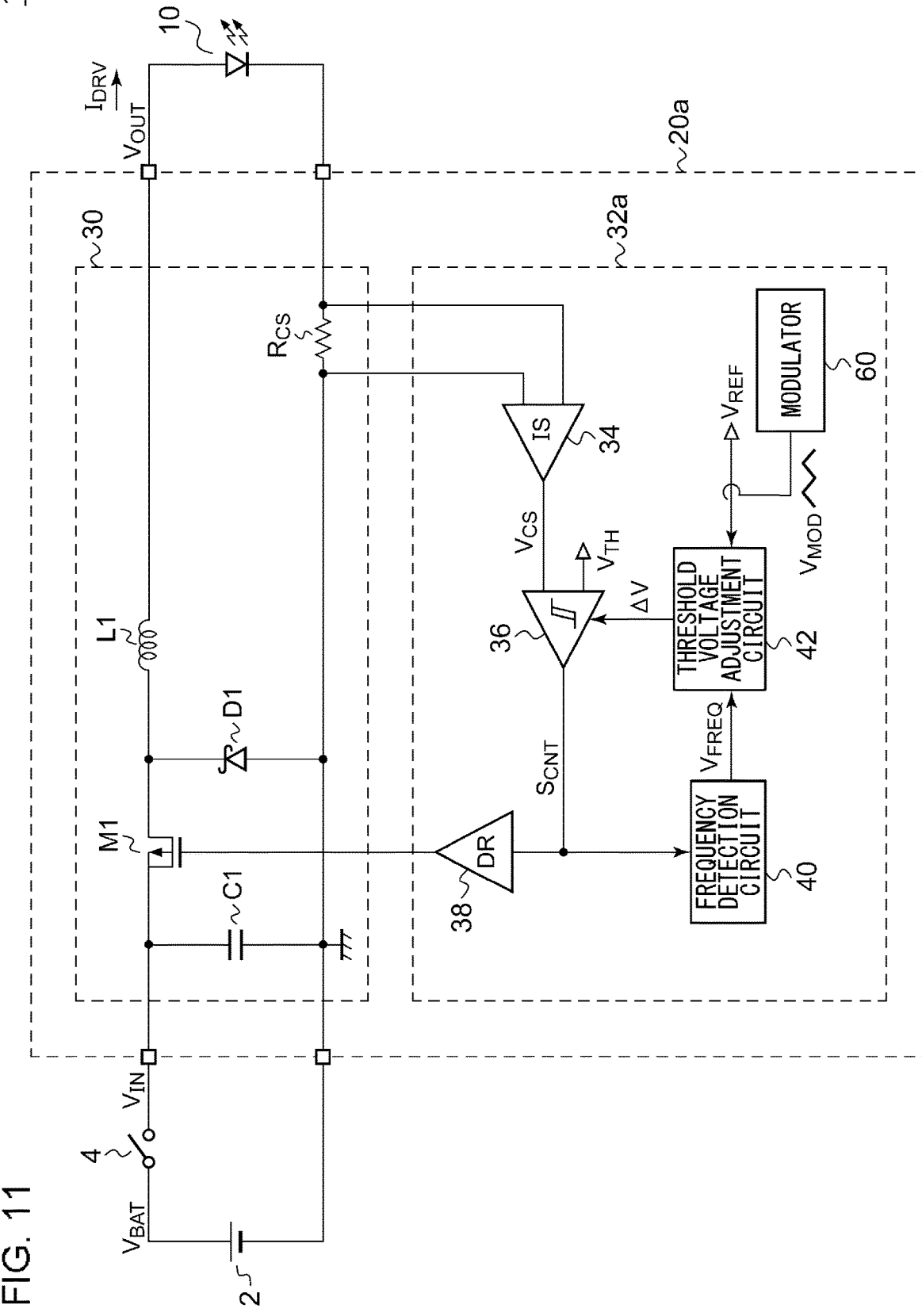
FIG. 11 is a block diagram showing the lighting circuit according to a second modification.

FIG. 11 is a block diagram showing a lighting circuit 20a according to a second modification. A converter controller 32a shown in FIG. 11 further includes a modulator 60 in addition to the converter controller 32 shown in FIG. 3. The modulator 60 superimposes a modulation signal $V_{MOD}$ having a frequency that is lower than the switching frequency of the switching transistor M1 on the reference value $V_{REF}$ that provides the target value of the switching frequency.

Figure 12:
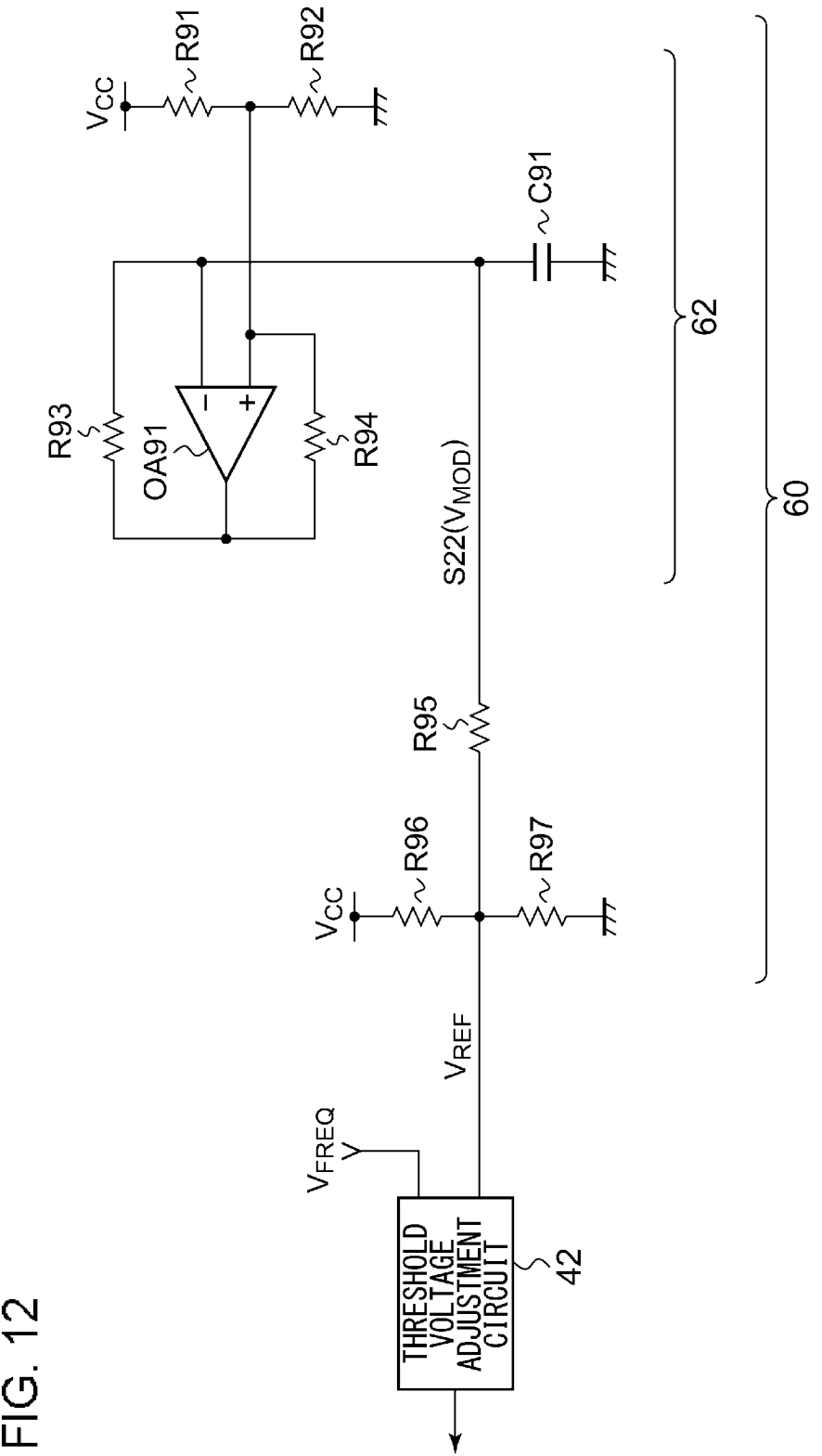
FIG. 12 is a circuit diagram showing an example configuration of a modulator.

FIG. 12 is a circuit diagram showing an example configuration of the modulator 60. The modulator 60 includes an oscillator 62 that generates the modulation signal $V_{MOD}$ having a frequency that is sufficiently lower than the switching frequency. The modulator 60 changes the reference value $V_{REF}$ according to the modulation signal $V_{MOD}$. The oscillator 62 includes resistors R91 through R94, a capacitor C91, and an operational amplifier OA91. A triangle-wave modulation signal $V_{MOD}$ occurs at the capacitor C91 with the voltage level determined by the resistors R91 and R92 as a reference voltage.

It should be noted that the waveform of the modulation signal $V_{MOD}$ is not restricted in particular. Also, the modulation signal $V_{MOD}$ may be designed to be any one from among a sawtooth wave, a ramp wave, a sine wave, and a trapezoidal wave. From a different viewpoint, the modulation signal $V_{MOD}$ may preferably be configured as a periodic signal having a slope. The modulation signal $V_{MOD}$ and the power supply voltage $V_{CC}$ are subjected to weighted averaging (weighted addition) by means of the resistors R95 through R97, thereby generating the reference value $V_{REF}$ on which the modulation signal $V_{MOD}$ has been superimposed.

With this modification, the switching frequency is feedback controlled such that the actual switching frequency approaches the target frequency, while slowly changing the target frequency of the switching frequency according to the modulation signal $V_{MOD}$. This arrangement is capable of removing the effects of fluctuation of the input voltage $V_{IN}$ or the output voltage $V_{OUT}$, variation in the inductance, fluctuation in the temperature, etc., and of providing the switching frequency with a sufficiently wide spectrum. This arrangement is capable of suppressing the occurrence of beat noise, etc.

It should be noted that, with this modification, the modulator 60 may preferably modulate the difference ΔV between the upper threshold signal $V_{THH}$ and the lower threshold signal $V_{THL}$ according to the modulation signal $V_{MOD}$. For example, in a case in which the threshold voltage adjustment circuit 42 has the configuration shown in FIG. 6, the modulator 60 may superimpose the modulation signal $V_{MOD}$ on the frequency error signal $V_{ERR}$, which is an input signal of the operational amplifier OA1. Alternatively, the modulator 60 may superimpose the modulation signal $V_{MOD}$ on the gate signal of the first transistor M21, which is an output signal of the operation amplifier OA1.

Figure 13:
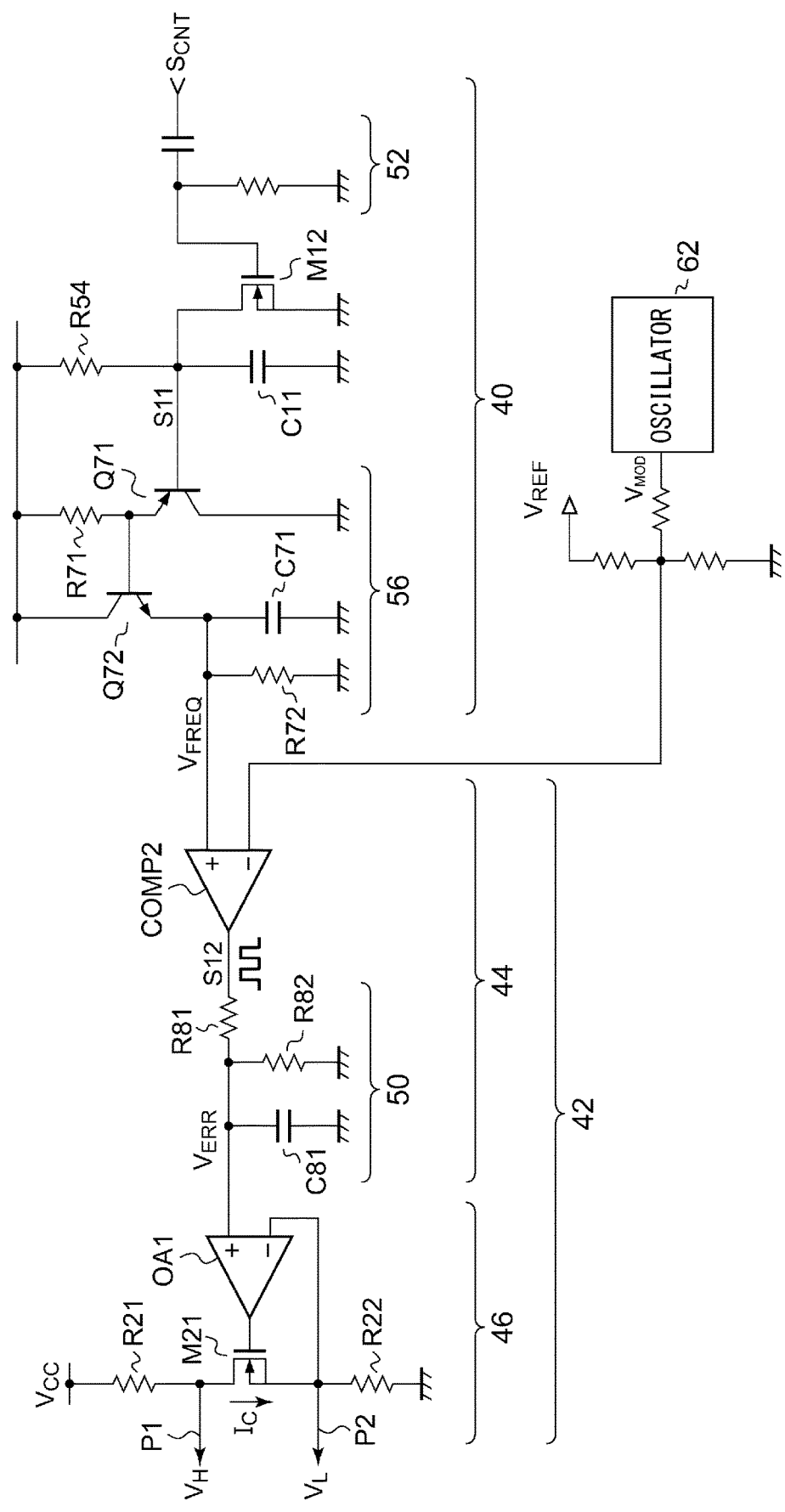
FIG. 13 is a circuit diagram showing another example configuration of a part of the lighting circuit according to the second modification.

FIG. 13 is a circuit diagram showing another example configuration of a part of the lighting circuit 20a according to the second modification. In the modulator 60, the modulation signal $V_{MOD}$ is superimposed on the reference voltage $V_{REF}$ supplied to the input terminal (inverting input terminal) of the second comparator COMP2.

[Third Modification]

Description has been made in the embodiment regarding an arrangement in which the frequency detection circuit 40 and the threshold voltage adjustment circuit 42 are each configured as an analog circuit. Also, at least a part thereof may be configured as a digital circuit. For example, the frequency detection circuit 40 may be configured as a digital counter that measures the period (frequency) of the control pulse $S_{CNT}$. In this case, the frequency detection signal is generated as a digital value. Also, the threshold voltage adjustment circuit 42 may be configured as a digital circuit. For example, the error signal generating circuit 44 may be configured as a compensator that performs a PI (Proportional Integral) control operation or a PID (Proportional Integral Derivative) control operation. Also, the voltage source 46 may be configured as a D/A converter or the like.

Furthermore, the overall configuration of the converter controller 32 may be configured based on a digital circuit. In this case, an A/D converter that converts the output signal of the current detection circuit 34 into a digital value may preferably be provided as an additional component, and the hysteresis comparator 36 may be configured as a digital comparator.

[Fourth Modification]

The switching converter 30 may be configured as a step-up converter, a step-up/step-down converter, or otherwise a converter employing a transformer. Also, the switching converter 30 may be configured as other kinds of converters such as a Cuk converter or the like.

[Fifth Modification]

Figure 14A:
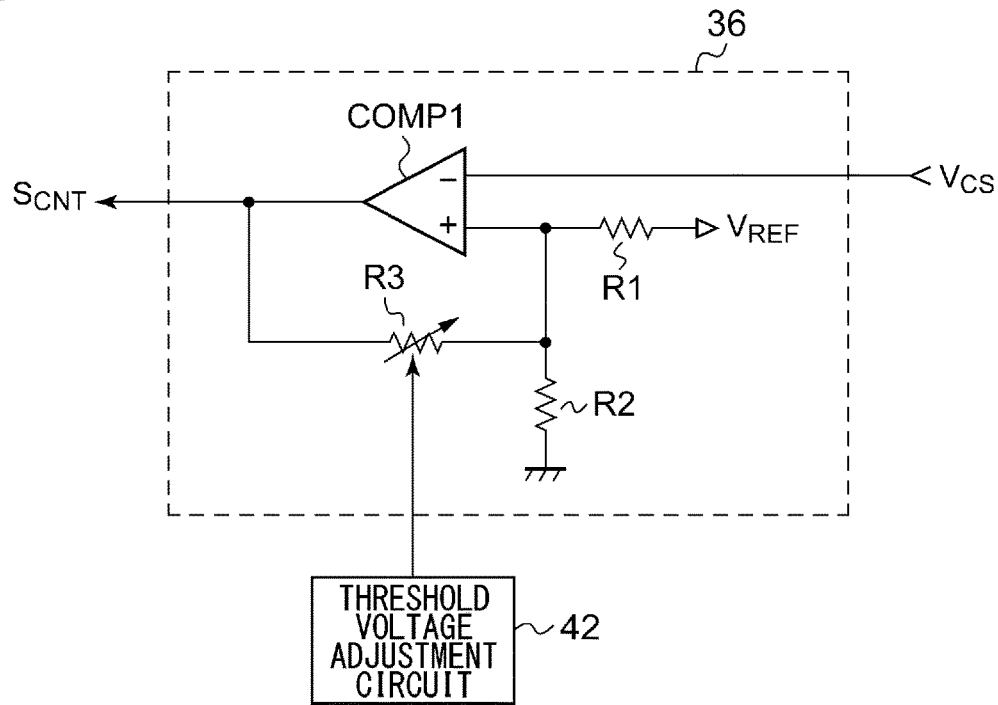
FIGS. 14A and 14B are circuit diagrams each showing a hysteresis comparator according to a modification.
Figure 14B:
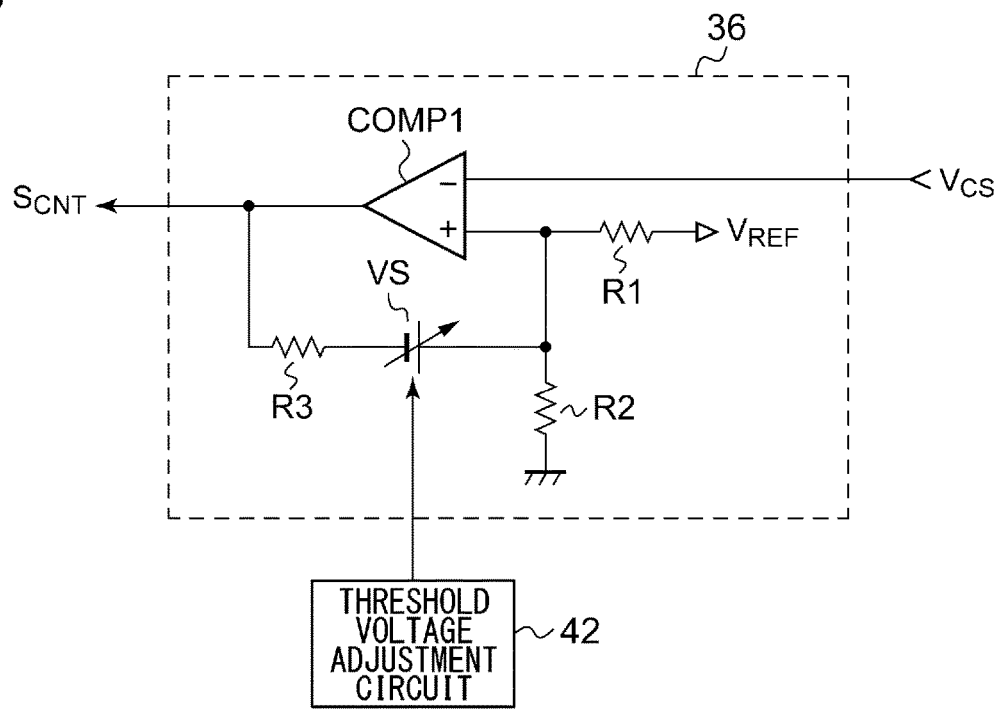

The configuration of the hysteresis comparator 36 is not restricted to such an arrangement shown in FIG. 4. FIGS. 14A and 14B are circuit diagrams each showing the hysteresis comparator 36 according to a modification. The hysteresis comparators shown in FIGS. 14A and 14B each include resistors R1 through R3 in addition to the first comparator COMP1. Furthermore, as with the arrangement shown in FIG. 1, the threshold voltage $V_{TH}$ is provided with hysteresis by means of the feedback control operation. In the arrangement shown in FIG. 14A, the feedback amount is changed by changing the resistance value of the feedback resistor R3, so as to change the voltage difference between the threshold voltages $V_{THH}$ and $V_{THL}$. In the arrangement shown in FIG. 14B, a variable voltage source VS is provided to a feedback path, and the voltage generated by the variable voltage source VS is changed so as to change the voltage difference between the threshold voltages $V_{THH}$ and $V_{THL}$.

[Sixth Modification]

Figure 15:
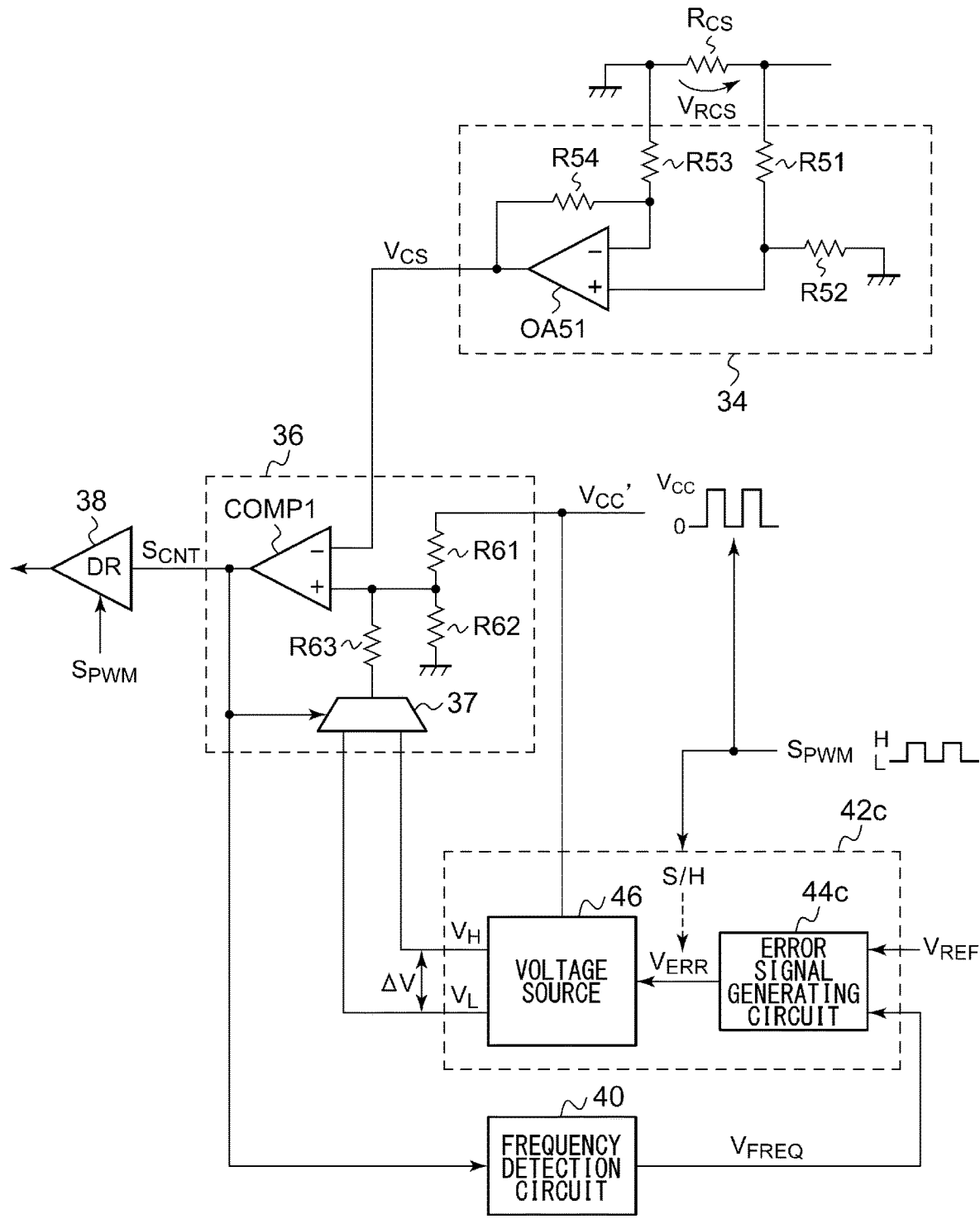
FIG. 15 is a circuit diagram showing the converter controller according to a sixth modification.

FIG. 15 is a circuit diagram showing a converter controller 32c according to a sixth modification. The converter controller 32c receives a pulse-width modulated PWM dimming signal, and has a PWM dimming (PWM illumination reducing) function of changing the light amount output from the light source according to the duty ratio of the PWM dimming signal. The PWM dimming signal $S_{PWM}$ has a frequency on the order of several hundred Hz. In a period in which the PWM dimming signal $S_{PWM}$ is set to a first level (e.g., high level), the converter controller 32 switches on and off the switching transistor M1 according to the control pulse $S_{CNT}$ (operating period). In a period in which the PWM dimming signal $S_{PWM}$ is set to the second level (e.g., low level), the switching transistor M1 is turned off (suspension period). It should be noted that, instead of such PWM modulation, other kinds of pulse modulation such as pulse density modulation (PDM), pulse frequency modulation (PFM), or the like, may be employed. The configuration for providing the PWM dimming operation is not restricted in particular. For example, as shown in FIG. 15, the power supply voltage $V_{CC}'$ supplied to the resistor R61 and/or the power supply voltage $V_{CC}'$ supplied to the voltage source 46 may be switched between 0 V and $V_{CC}$ according to the PWM dimming signal $Sp_{PWM}$. Alternatively, the enable state and the disable state of the driver 38 may be controlled according to the PWM dimming signal $S_{PWM}$. With this configuration, the light amount output from the semiconductor light source 10 can be controlled according to the duty ratio of the PWM dimming signal $S_{PWM}$.

In a case in which the converter controller 32c supports the PWM dimming operation, during the suspension period, the control pulse $S_{CNT}$ is fixedly set to the low level (or otherwise the high level). Accordingly, in this state, the switching frequency becomes zero. Accordingly, the frequency detection signal $V_{FREQ}$ detected by the frequency detection circuit 40 becomes a voltage level that corresponds to the zero frequency. In this case, the voltage level of the frequency error signal $V_{ERR}$ deviates from the optimum value for the operating period. As a result, immediately after the PWM dimming signal $S_{PWM}$ transits from the second level (suspension period) to the first level (operating period), the switching frequency of the control pulse $S_{CNT}$ deviates from the target value, following which the switching frequency gradually approaches the target value.

Figure 16:
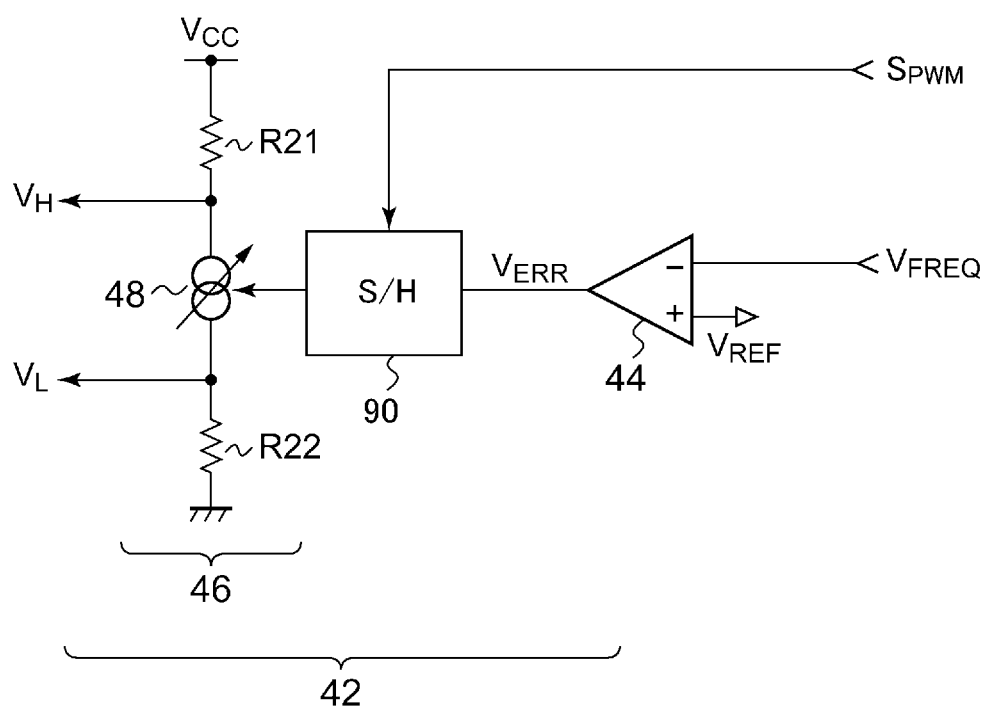
FIG. 16 is a circuit diagram showing a specific example configuration of the threshold voltage adjustment circuit shown in FIG. 15.

In order to solve this problem, a threshold voltage adjustment circuit 42c has a function of sampling and holding the frequency error signal $V_{ERR}$ using the PWM dimming signal $S_{PWM}$. FIG. 16 is a circuit diagram showing a specific example configuration of the threshold voltage adjustment circuit 42c shown in FIG. 15. The threshold voltage adjustment circuit 42c further includes a sample-and-hold circuit 90. The sample-and-hold circuit 90 receives the PWM dimming signal $S_{PWM}$ in addition to the frequency error signal $V_{ERR}$. At a timing (e.g., negative edge) at which the PWM dimming signal $S_{PWM}$ transits from the first level (operating period) to the second level (suspension period), the sample-and-hold circuit 90 samples the frequency error signal $V_{ERR}$, and holds the frequency error signal $V_{ERR}$ thus sampled during the suspension period.

Figure 17:
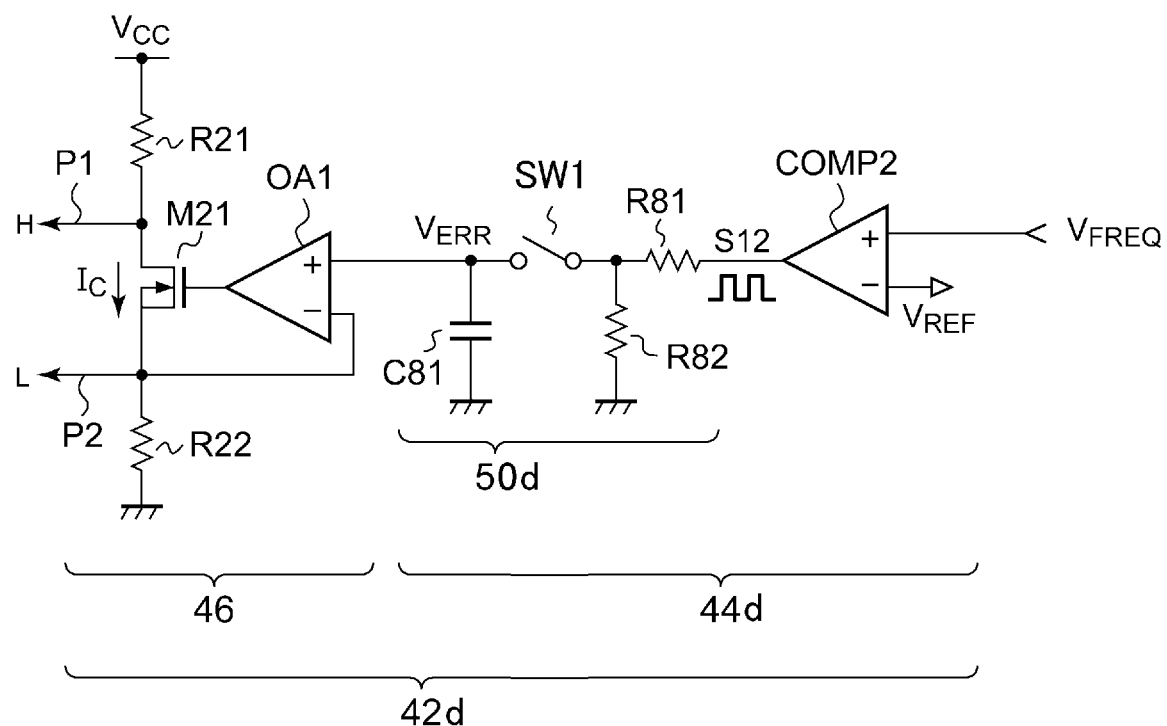
FIG. 17 is a circuit diagram showing another example configuration of the threshold voltage adjustment circuit shown in FIG. 15.

FIG. 17 is a circuit diagram showing another example configuration of a threshold voltage adjustment circuit 42d shown in FIG. 15. In the threshold voltage adjustment circuit 42d, the sample-and-hold circuit 90 shown in FIG. 16 is monolithically configured together with an error signal generating circuit 44d. As described with reference to FIG. 6, the error signal generating circuit 44d includes a second comparator COMP2 and a low-pass filter 50d. A switch SW1 is arranged between a capacitor C81 and a resistor R81 that form the low-pass filter 50d. In the operating period in which the PWM dimming signal $S_{PWM}$ is set to the first level, the switch SW1 is set to the on state. In the suspension period in which the PWM dimming signal $S_{PWM}$ is set to the second level, the switch SW1 is set to the off state.

With the sixth modification, the frequency error signal $V_{ERR}$ is maintained at the voltage level set in the operating period even during the suspension period. This allows the switching frequency to immediately approach the target value.

Second Embodiment

Figure 18:
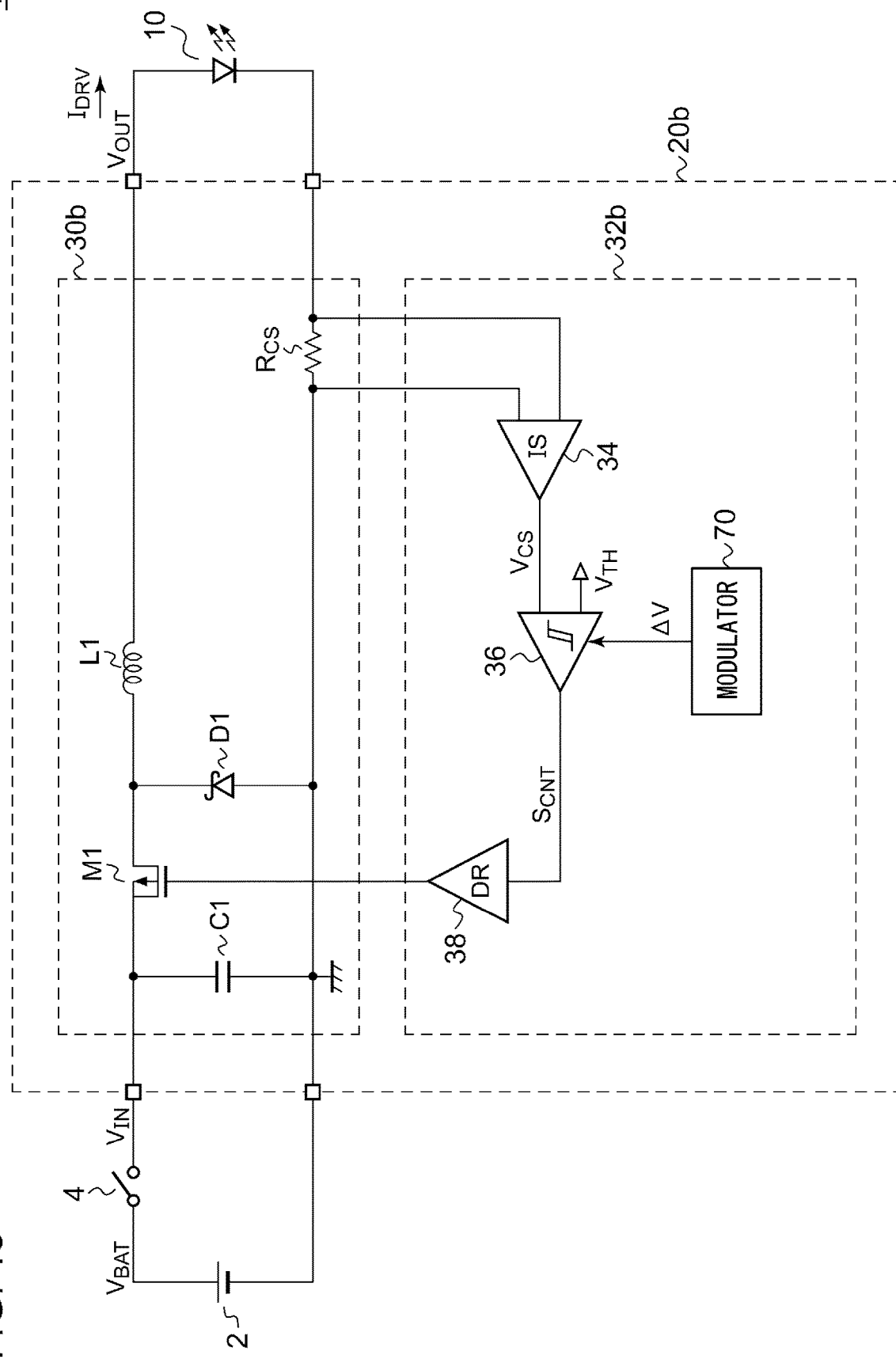
FIG. 18 is a block diagram showing a vehicular lamp according to a second embodiment.

FIG. 18 is a block diagram showing a vehicular lamp 1b according to a second embodiment. The converter controller 32b shown in FIG. 18 includes a current detection circuit 34, a hysteresis comparator 36, a driver 38, and a modulator 70. The current detection circuit 34 generates a current detection signal $V_{CS}$ that corresponds a driving current $I_{DRV}$ supplied from the switching converter 30 to the semiconductor light source 10.

The hysteresis comparator 36 compares the current detection signal $V_{CS}$ with the upper threshold signal $V_{THH}$ and the lower threshold signal $V_{THL}$, and generates a control pulse $S_{CNT}$ that corresponds to the comparison result. The driver 38 drives the switching transistor M1 of the switching converter 30 according to the control pulse. The modulator 70 generates a modulation signal $V_{MOD}$ having a lower frequency than the switching frequency of the switching transistor M1. The modulator 70 modulates the difference between the upper threshold signal $V_{THH}$ and the lower threshold signal $V_{THL}$ according to the modulation signal $V_{MOD}$.

Figure 19A:
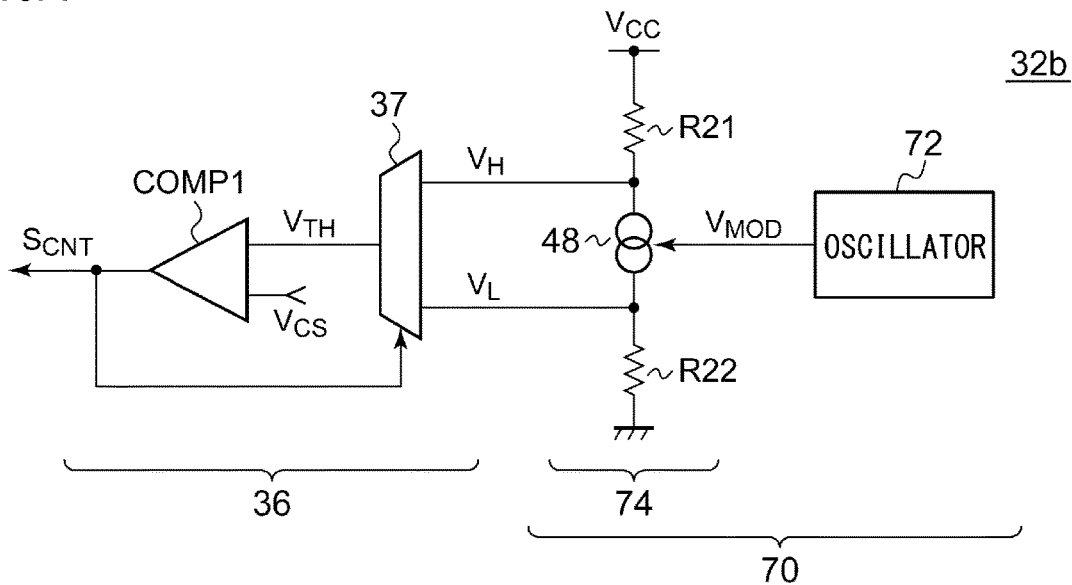
FIGS. 19A and 19B are circuit diagrams each showing a specific example configuration of the converter controller shown in FIG. 18.
Figure 19B:
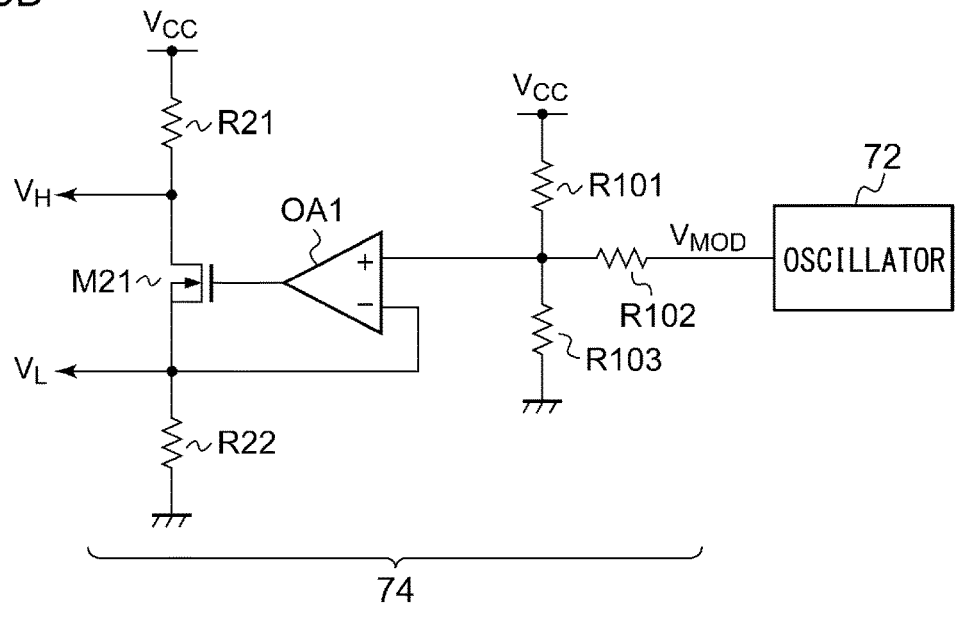

FIGS. 19A and 19B are circuit diagrams each showing a specific example configuration of the converter controller 32b shown in FIG. 18. Description will be made with reference to FIG. 19A. The modulator 70 includes an oscillator 72 and a voltage source 74. The oscillator 72 generates a modulation signal $V_{MOD}$ having any one from among a triangle wave, a sawtooth wave, a ramp wave, a sine wave, and a trapezoidal wave. The oscillator 72 may have the same configuration as that of the oscillator 62 shown in FIG. 12. Also, other configurations may be employed.

The voltage source 74 generates an upper voltage $V_H$ and a lower voltage $V_L$, and changes the voltage difference $\Delta V$ between the upper voltage $V_H$ and the lower voltage $V_L$ according to the modulation signal $V_{MOD}$. The voltage source 74 may be configured in the same manner as the voltage source 46 shown in FIG. 5.

The hysteresis comparator 36 includes a selector 37 and a first comparator COMP1 as with the arrangement shown in FIG. 4. It should be noted that, in FIG. 19A, the output $V_{TH}$ of the selector 37 is directly input to the first comparator COMP1, and accordingly, the upper voltage $V_H$ and the lower voltage $V_L$ are employed as the threshold voltages $V_{THH}$ and $V_{THL}$, respectively. Also, the resistors R61 through R63 may be arranged as additional components as shown in FIG. 4.

Description will be made with reference to FIG. 19B. The voltage source 74 includes resistors R101 through R103, an operational amplifier OA1, a first resistor R21, a second resistor R22, and a first transistor M21. The modulation signal $V_{MOD}$ and the power supply voltage $V_{CC}$ are subjected to weighed addition by means of the resistors R101 through R103. The operational amplifier OA1, the first transistor M21, and the second resistor R22 correspond to the current source 48 shown in FIG. 19A. In a case in which R21=R22, this arrangement is capable of modulating the difference between the upper voltage $V_H$ and the lower voltage $V_L$ according to the modulation signal $V_{MOD}$ while maintaining the average of the upper voltage $V_H$ and the lower voltage $V_L$ at a constant value.

With the second embodiment, this arrangement is capable of spreading the spectrum of the switching frequency, thereby suppressing the occurrence of beat noise or the like.

Several modifications described in the first embodiment are also applicable to the second embodiment, which are encompassed within the technical scope of the present invention.

[Usage]

Figure 20:
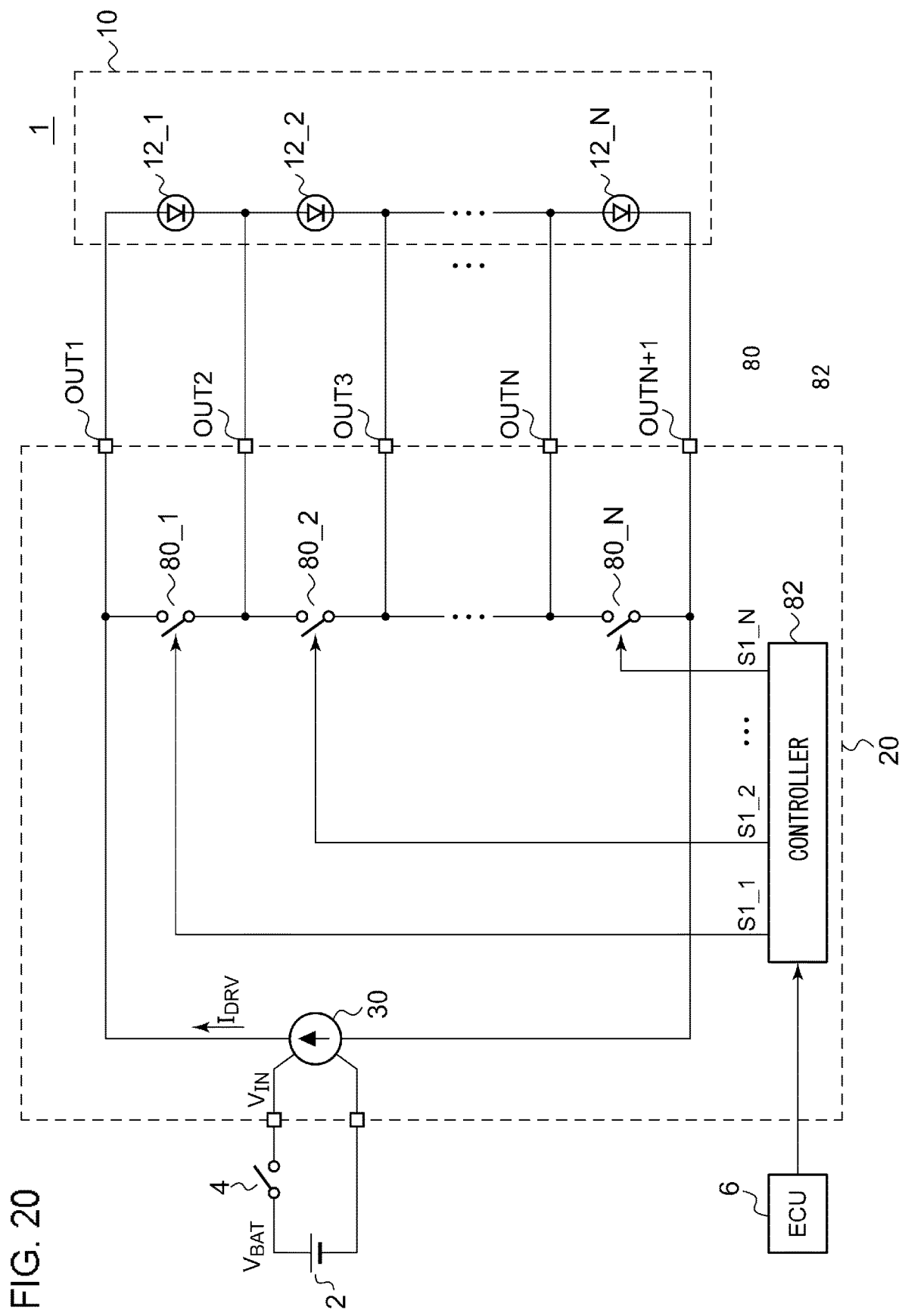
FIG. 20 is a block diagram showing a vehicular lamp having an ADB function employing an array method.

FIG. 20 is a block diagram showing the vehicular lamp 1 having an ADB function using an array method. In order to support the ADB function, the high-beam illumination region is formed of N (N represents an integer of 2 or more) multiple divided sub regions. The semiconductor light source 10 includes multiple light-emitting elements 12_1 through 12_N associated with the N sub regions. Each light-emitting element 12 is configured as a semiconductor device such as an LED (light-emitting diode), LD (laser diode), or the like. The light-emitting elements 12 are arranged such that they irradiate the corresponding sub regions. The lighting circuit 20 controls the on state (lighting-on state) and the off state (lighting-off state) of each of the multiple light-emitting elements 12_1 through 12_N, so as to change the high-beam light distribution. Alternatively, the lighting circuit 20 PWM (pulse-width modulation) controls the light-emitting elements 12 with a high frequency so as to adjust the effective luminance.

The lighting circuit 20 includes multiple bypass circuits 80_1 through 80_N and a controller 82 in addition to the switching controller 30 and the unshown converter controller 32. The multiple bypass circuits 80_1 through 80_N are associated with the multiple light-emitting elements 12_1 through 12_N. Each bypass circuit 80 is configured to be switchable between the on state and the off state. When the i-th bypass circuit 80_i is set to the on state, the driving current $I_{DRV}$ flows through the bypass circuit 80_i instead of flowing through the light-emitting element 12_i, which turns off the light-emitting element 12_i. When the bypass circuit 80_i is set to the off state, the driving current $I_{DRV}$ flows through the light-emitting element 12_i, which turns on the light-emitting element 12_i.

An upstream processor (e.g., electronic control unit ECU) 6 configured to control the vehicular lamp 1 determines the sub regions to be irradiated by the high-beam based on the state ahead of the vehicle, and instructs the controller 82 of the lighting circuit 20. The controller 82 controls the states of the bypass circuits 80_1 through 80_N according to a control instruction received from the processor 6. Specifically, the controller 82 selects the light-emitting elements 12 that correspond to the sub regions to be irradiated, and the bypass circuits 80 respectively arranged in parallel with the light-emitting elements thus selected are set to the off state. Furthermore, the bypass circuits 80 respectively arranged in parallel with the remaining light-emitting elements 12 are turned on.

Figure 21:
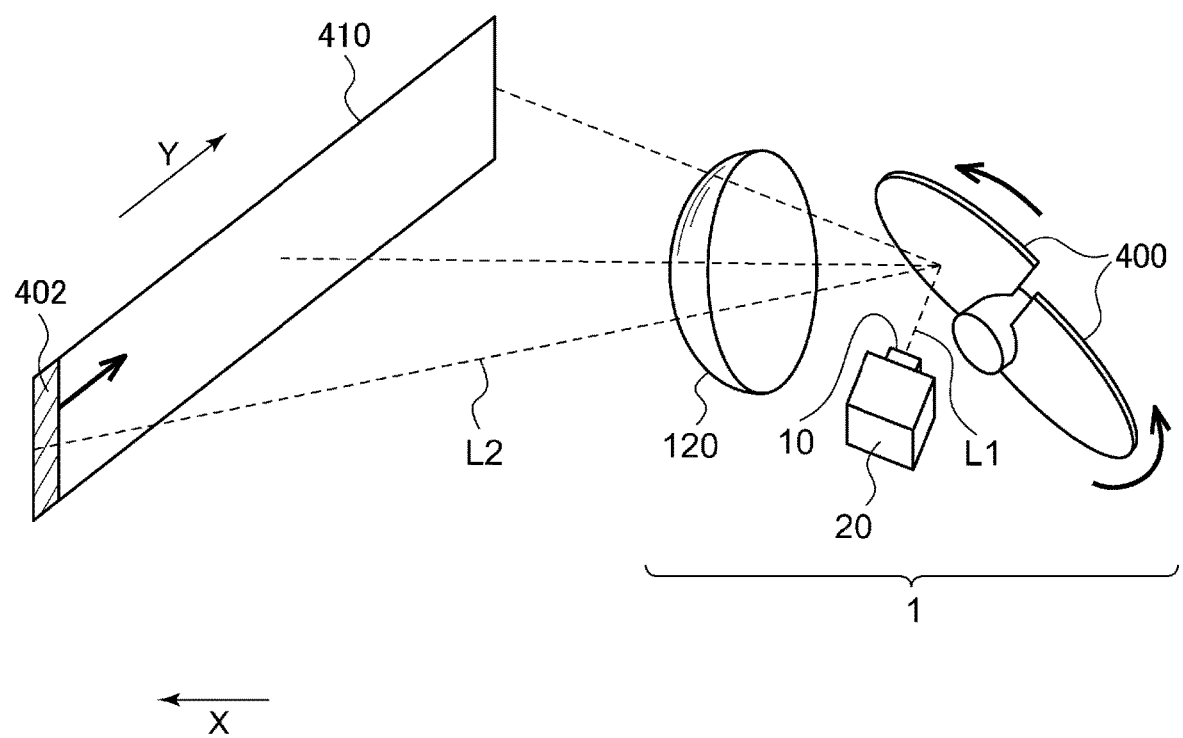
FIG. 21 is a perspective view showing a schematic configuration of a vehicular lamp having an ADB function employing a blade scanning method.

FIG. 21 is a perspective view showing a schematic configuration of a vehicular lamp 1 having an ADB function employing a blade scanning method. The vehicular lamp 1 mainly includes a blade (reflecting mirror) 400, a light source 10, a projector lens 120, and a lighting circuit 20. Multiple light sources 10 may be provided. Here, for ease of understanding and simplicity of description, description will be made regarding an arrangement including a single light source 10.

The light source 10 is configured as a semiconductor light source employing an LED (light-emitting diode) or a laser diode. The blade 400 receives an output light L1 from the light source 10. Furthermore, the blade 400 repeats a predetermined periodic movement so as to scan a reflected light L2 in a forward region ahead of the vehicle along a horizontal direction (Y direction in the drawing). In the present embodiment, the blade 400 is mounted on a rotor of an unshown motor, and is rotationally driven. At a given time point, the output light L1 input to the blade 400 is reflected with a reflection angle that corresponds to the position (rotational angle of the rotor) of the blade 400, thereby forming an illumination region 402.

The blade 400 is rotationally driven so as to change the reflection angle, thereby scanning the illumination region 402 in the Y direction. By repeatedly performing this movement at a high speed, e.g., at a frequency of 50 Hz or more, the light distribution pattern 410 is formed. The lighting circuit 20 controls the light amount (luminance) to be supplied from the light source 10 in synchronization with the periodic movement of the blade 400 so as to obtain a desired light distribution pattern. An area (region) that is provided with the illumination region 402 will be referred to as the "lighting-on region $R_{ON}$". Conversely, an area (region) that is not provided with the illumination region 402 will be referred to as the "lighting-off region $R_{OFF}$". The light distribution pattern 410 is a combination of the lighting-on regions $R_{ON}$ and the lighting-off regions $R_{OFF}$.

It should be noted that the configuration for scanning the light ahead of the vehicle is not restricted to such an arrangement shown in FIG. 21. For example, instead of the blade 400, a polygon mirror or a mirror galvanometer may be employed. Alternatively, a liquid crystal scanner may be employed so as to scan the light. Also, the light may be scanned by shifting or displacing a lens in a periodic manner. Also, an actuator may be mounted on the light source 10, and the light source 10 itself may be shifted or displaced. Also, an optical element (electro-optical element) array that is capable of controlling the light phase may be employed. With such an arrangement, by controlling the wave front of the light, the light traveling direction may be controlled so as to scan the light.

Next, description will be further made regarding problems with the switching converter.

[Third Problem]

Figure 22A:
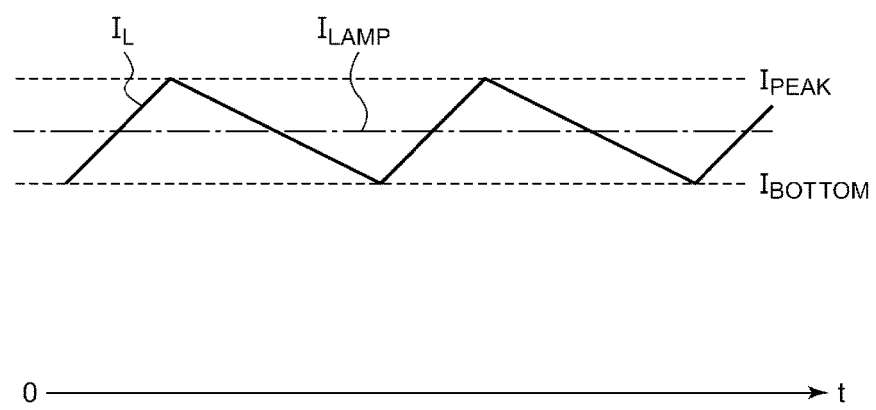
FIGS. 22A and 22B are operation waveform diagrams each showing the operation of the lighting circuit shown in FIG. 1.
Figure 22B:
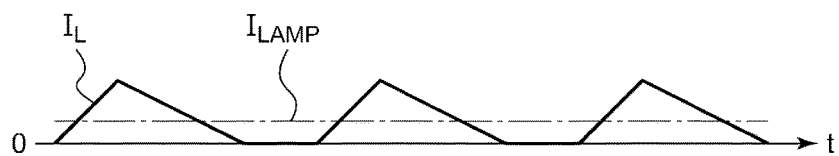

FIGS. 22A and 22B are operation waveform diagrams each showing the operation of the lighting circuit 20r shown in FIG. 1. FIG. 22A shows the operation when the lamp current $I_{LAMP}$ is large. FIG. 22B shows the operation when the lamp current $I_{LAMP}$ is small. When the lamp current $I_{LAMP}$ is large as shown in FIG. 22A, and specifically, when the bottom current $I_{BOTTOM}$ is greater than zero, the lamp current $I_{LAMP}$ matches the average value of the peak current and the bottom current. Accordingly, the average level of the lamp current $I_{LAMP}$, i.e., the luminance, can be linearly controlled according to the reference voltage $V_{ADIM}$.

However, when the lamp current $I_{LAMP}$ is small as shown in FIG. 22B, the operation mode becomes a current discontinuous mode, in which the lamp current $I_{LAMP}$ deviates from the average value of the peak value $I_{PEAK}$ and the bottom value $I_{BOTTOM}$ of the coil current $I_L$. Accordingly, the linear luminance control operation cannot be performed according to the reference voltage $V_{ADIM}$. It should be noted that a similar problem can occur in a case in which the output filter 31 is omitted.

[Fourth Problem]

Figure 23:
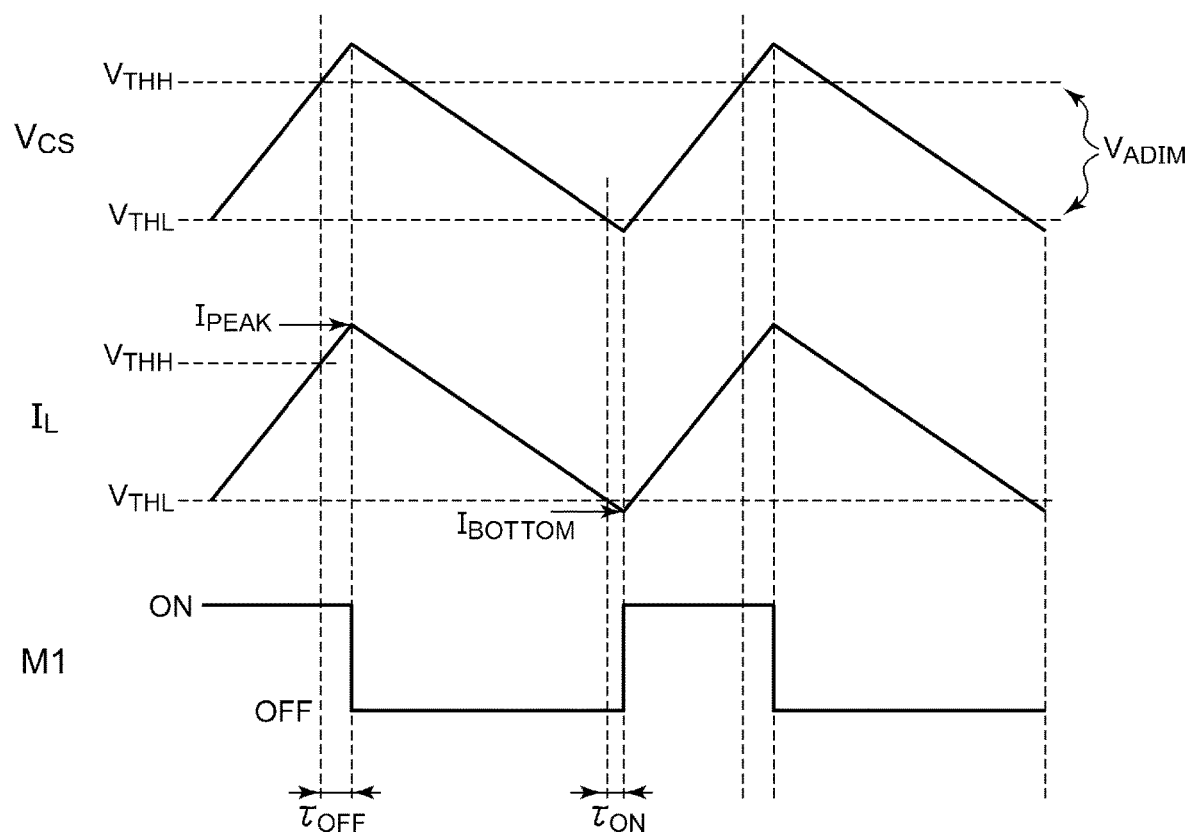
FIG. 23 is an operation waveform diagram showing the operation of the lighting circuit shown in FIG. 1.

FIG. 23 is an operation waveform diagram showing the operation of the lighting circuit 20r shown in FIG. 1. A delay time $\tau_{OFF}$ ($\tau_{ON}$) occurs from the time point at which the detection voltage $V_{CS}$ crosses the threshold signal $V_{THH}$ ($V_{THL}$) to the time point at which the switching transistor M1 turns off (turns on) due to the effects of a delay that occurs in the hysteresis comparator 36, a delay that occurs in the driver 38, a delay that occurs in the switching transistor M1, etc.

Due to the effects of the delay times $\tau_{ON}$ and $\tau_{OFF}$, the peak value $I_{PEAK}$ of the coil current $I_L$ becomes greater than a value $I_{THH}$ that corresponds to the threshold signal $V_{THH}$, and the bottom value $I_{BOTTOM}$ of the coil current $I_L$ becomes smaller than a value $I_{THL}$ that corresponds to the threshold signal $V_{THL}$.

The slope of the coil current $I_L$ is represented by ($V_{IN}$−$V_{OUT}$)/L1. Accordingly, the peak current $I_{PEAK}$ is represented by the following Expression (1).

$$I_{PEAK}=I_{THH}+\tau_{OFF}\times(V_{IN}-V_{OUT})/L1 \quad (1)$$

On the other hand, the falling slope of the coil current $I_L$ is represented by −$V_{OUT}$/L1. Accordingly, the bottom current $I_{BOTTOM}$ is represented by the following Expression (2).

$$I_{BOTTOM}=I_{THL}+\tau_{ON}\times V_{OUT}/L1 \quad (2)$$

Accordingly, if the output voltage $V_{OUT}$ or the input voltage $V_{IN}$ fluctuates, this leads to fluctuation in the average of the coil current $I_L$, i.e., fluctuation in the lamp current $I_{LAMP}$. This results in fluctuation in the light amount output from the lamp.

Description will be made below regarding several embodiments relating to at least one of the third and fourth problems.

Third Embodiment

Figure 24:
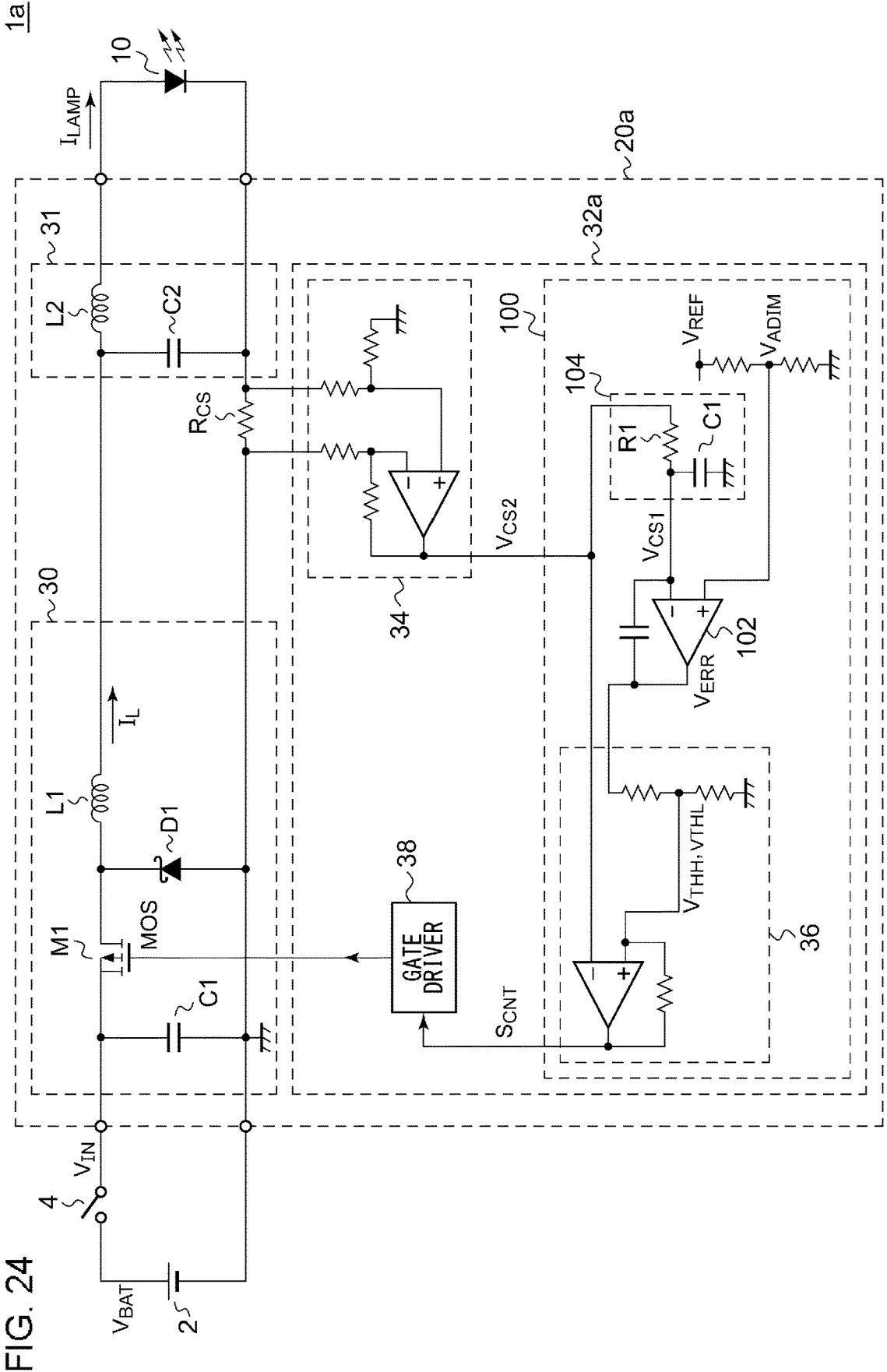
FIG. 24 is a block diagram showing a vehicular lamp according to a third embodiment.

FIG. 24 is a block diagram showing a vehicular lamp 1a according to a third embodiment. The vehicular lamp 1a includes a battery 2, a switch 4, a semiconductor light source 10, and a lighting circuit 20a.

Examples of the semiconductor light source 10 include LEDs, LDs, organic EL (electroluminescence), and the like. However, the semiconductor light source 10 is not restricted in particular. The lighting circuit 20a includes a switching converter 30, an output filter 31, and a converter controller 32a. As with the arrangement shown in FIG. 1, the switching converter 30 is configured as a step-down converter. The converter controller 32a stabilizes the lamp current $I_{LAMP}$, which is supplied from the switching converter 30 to the semiconductor light source 10 via the output filter 31, to a predetermined target current $I_{REF}$.

It should be noted that the switching converter 30 may be configured as a step-up converter, a step-up/step-down converter, or otherwise a converter employing a transformer. Also, the switching converter 30 may be configured as other kinds of converters such as a Cuk converter or the like.

The converter controller 32a includes a current detection circuit 34, a pulse modulator 100, and a driver 38. The current detection circuit 34 generates a current detection signal (which will be referred to as the "second current detection signal") $V_{CS2}$ that corresponds to the coil current (output current) $I_L$ of the switching converter 30. A ripple component that occurs in the synchronization of the switching of the switching transistor M1 is superimposed on the second current detection signal $V_{CS2}$. As with the arrangement shown in FIG. 1, a sensing resistor $R_{CS}$ may be inserted in series with the inductor L1 on the anode side of the semiconductor light source 10. With such an arrangement, the voltage drop across the sensing resistor $R_{CS}$ may be amplified by means of the current detection circuit 34, so as to generate the second current detection signal $V_{CS2}$. The configuration of the current detection circuit 34 is not restricted in particular.

The pulse modulator 100 generates a control pulse $S_{CNT}$ based on the second current detection signal $V_{CS2}$. In the present embodiment, the pulse modulator 100 is configured as a controller employing a hysteresis control (Bang-Bang control) method.

The pulse modulator 100 includes an error amplifier 102 and a low-pass filter 104 in addition to the hysteresis comparator 36.

The error amplifier 102 amplifies the difference between the DC component of the coil current $I_L$, i.e., the first current signal $V_{CS1}$ that corresponds to the DC component of the lamp current $I_{LAMP}$ supplied to the semiconductor light source 10, and an analog signal (which will be referred to as the "analog dimming signal" hereafter) $V_{ADIM}$ that indicates the lamp current $I_{LAMP}$ (consequently the luminance) to be supplied, so as to generate an error signal $V_{ERR}$. The first current detection signal $V_{CS1}$ is configured as a current component obtained by removing a ripple component from the coil current $I_L$. More specifically, the low-pass filter 104 is arranged on the upstream side of the error amplifier 102. The low-pass filter 104 smoothes the second current detection signal $V_{CS2}$, so as to generate the first current detection signal $V_{CS1}$. For example, the low-pass filter 104 may be configured as an RC filter. The error amplifier 102 amplifies the difference between the first current detection signal $V_{CS1}$ which is an output of the low-pass filter 104 and the analog dimming signal $V_{ADIM}$.

The hysteresis comparator 36 compares the second current detection signal $V_{CS2}$ with the upper threshold signal $V_{THH}$ and the lower threshold signal $V_{THL}$ determined according to the error signal $V_{ERR}$, and generates the control pulse $S_{CNT}$ that corresponds to the comparison result.

The driver 38 drives the switching transistor M1 of the switching converter 30 according to the control pulse $S_{CNT}$. In the present embodiment, the high level of the control pulse $S_{CNT}$ corresponds to the on state of the switching transistor M1. The low level of the control pulse $S_{CNT}$ corresponds to the off state of the switching transistor M1. The switching transistor M1 is configured as a P-channel MOSFET. When the control pulse $S_{CNT}$ is set to the high level, the driver 38 applies a low-level voltage (e.g., ground voltage) to the gate of the switching transistor M1. When the control pulse $S_{CNT}$ is set to the low level, the driver 38 applies a high-level voltage (e.g., input voltage $V_{IN}$) to the gate of the switching transistor M1.

The above is the configuration of the vehicular lamp 1a. Next, description will be made regarding the operation thereof.

FIG. 25A is an operation waveform diagram showing the operation of the lighting circuit 20a shown in FIG. 24. FIG. 25B is an operation waveform diagram showing the operation of a conventional lighting circuit. In the first-half period in FIGS. 25A and 25B, the operation waveforms are shown when the input voltage $V_{IN}$ is small. In the second-half period in FIGS. 25A and 25B, the operation waveforms are shown when the input voltage $V_{IN}$ is large. For ease of understanding, description will be made assuming that $\tau_{ON}$ is zero.

First, description will be made with reference to FIG. 25B regarding the operation of a conventional circuit. As described relating to the fourth problem, the peak current $I_{PEAK}$ is represented by the Expression (1).

$$I_{PEAK} = I_{THH} + \tau_{OFF} \times (V_{IN} - V_{OUT})/L1 \qquad (1)$$

In a case in which $V_{THH}$ is constant, $I_{THH}$ is also constant. Accordingly, when the input voltage $V_{IN}$ changes, this changes the peak current $I_{PEAK}$. Accordingly, this leads to a change in the average value of the coil current $I_L$, i.e., leads to a change in the lamp current $I_{LAMP}$. Specifically, when the input voltage $V_{IN}$ becomes large, this leads to an increase in the slope of $V_{CS}$ in a period in which the coil current $I_L$ rises. This also leads to an increase in the peak current $I_{PEAK}$. Conversely, when the input voltage $V_{IN}$ becomes small, this leads to a reduction in the peak current $I_{PEAK}$. As a result, $I_{PEAK2}$ becomes larger than $I_{PEAK1}$, and accordingly, $I_{LAMP2}$ becomes larger than $I_{LAMP1}$.

Next, description will be made with reference to FIG. 25A regarding the operation of the lighting circuit 20a shown in FIG. 24. With the lighting circuit 20a, the error amplifier 102 adjusts the error signal $V_{ERR}$ such that the average value of the current detection signal $V_{CS}$ (i.e., the average value of the coil current $I_L$) approaches the analog dimming voltage $V_{ADIM}$, thereby adjusting the threshold signals $V_{THH}$ and $V_{THL}$. For ease of understanding, description will be made assuming that the lower threshold signal $V_{THL}$ is fixed, and only the upper threshold signal $V_{THH}$ is adjusted.

In a case in which a feedback control operation is performed by the error amplifier 102 such that the bottom current $I_{BOTTOM}$ is maintained at a constant value, $I_{THH}$ in Expression (1) is adjusted such that the peak current $I_{PEAK}$ is maintained at a constant value. As a result, the lamp current $I_{LAMP}$ is also maintained at a constant value. In the actual operation, $I_{THH}$ and $I_{THL}$ are adjusted such that $(I_{PEAK} + I_{BOTTOM})/2$ is maintained at a constant value.

The above is the operation of the lighting circuit 20a.

With the lighting circuit 20a, this arrangement is capable of feedback controlling the threshold currents $I_{THH}$ and $I_{THL}$ such that the average current thereof is maintained at a constant value even if the slope of the lamp current $I_{LAMP}$ changes due to a change in the input voltage $V_{IN}$ or the output voltage $V_{OUT}$. This is capable of solving the fourth problem.

Furthermore, in a case in which an application is used in a range in which the converter operates in the current discontinuous mode, the threshold signal $V_{THH}$ is adjusted such that the average value of the coil current $I_L$, i.e., the average value of the lamp current $I_{LAMP}$, is adjusted based on the analog dimming voltage $V_{ADIM}$. This provides improved controllability in a region in which the light amount is small, thereby solving the third problem.

As described above, with the lighting circuit 20a, this arrangement is capable of solving at least one from among the third problem and the fourth problem.

Furthermore, the lighting circuit 20a shown in FIG. 24 requires only a single sensing resistor $R_{CS}$ for detecting a current. Accordingly, this arrangement is advantageous from the viewpoint of power loss as compared with a fourth embodiment described later.

Fourth Embodiment

Figure 26:
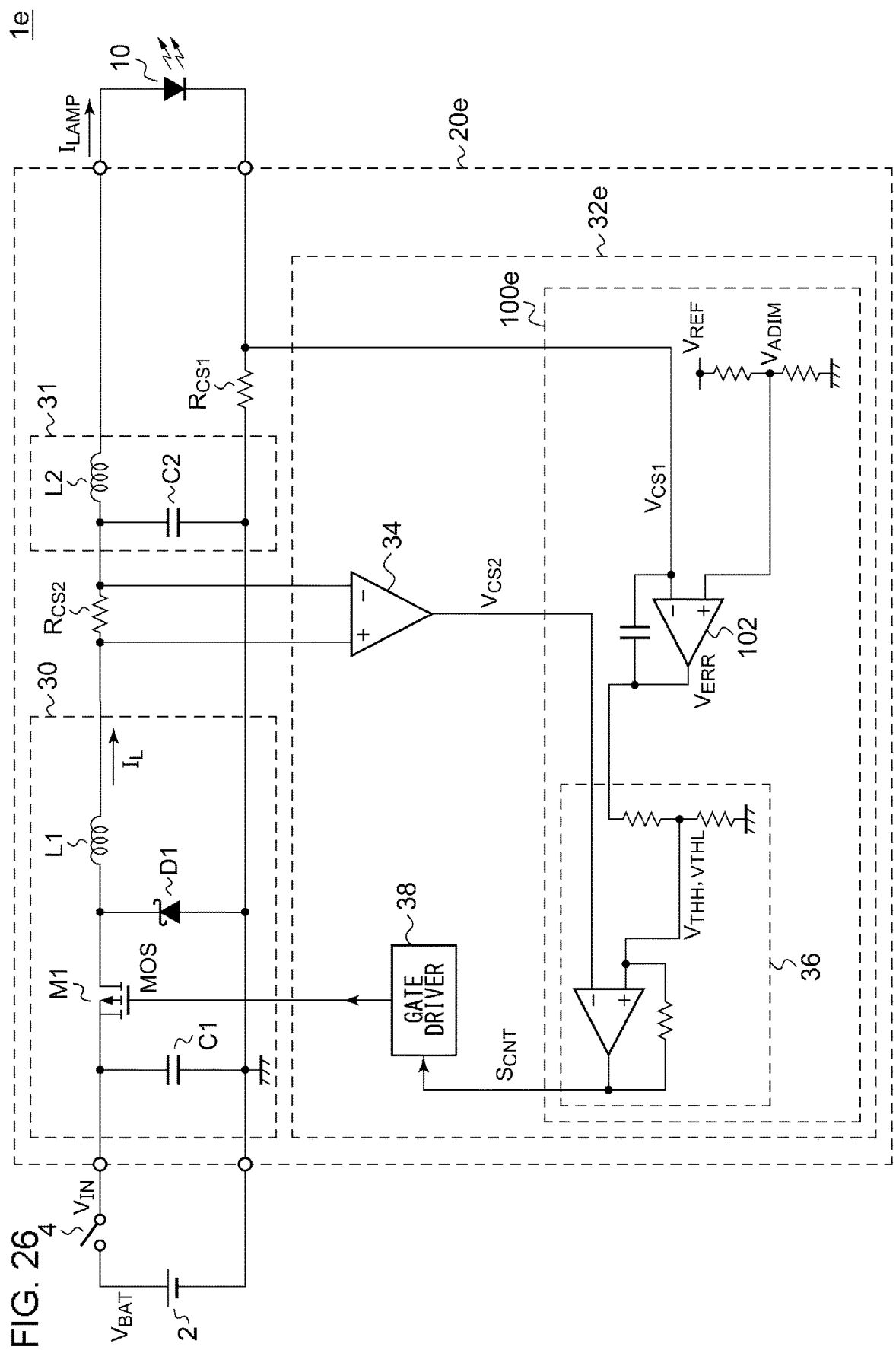
FIG. 26 is a block diagram showing a lighting circuit according to a fourth embodiment.

FIG. 26 is a block diagram showing a lighting circuit 20e according to a fourth embodiment. The lighting circuit 20e includes a first sensing resistor $R_{CS1}$ provided on a side closer to the semiconductor light source 10 as compared with the output filter 31, and a second sensing resistor $R_{CS2}$ provided on a side closer to the inductor L1 as compared with the output filter 31.

The voltage drop across the first sensing resistor $R_{CS1}$ is proportional to the lamp current $I_{LAMP}$ (i.e., the DC component of the coil current $I_L$) smoothed by the output filter 31, which corresponds to the first current detection signal $V_{CS1}$.

The above is the configuration of the lighting circuit 20e according to the fourth embodiment. The fourth embodiment provides the same effects as those provided by the third embodiment.

Furthermore, with the arrangement shown in FIG. 24, the first current detection signal $V_{CS1}$ is affected by detection error in the current detection circuit 34. In contrast, with the arrangement shown in FIG. 26, the first current detection signal $V_{CS1}$ is generated without involving the current detection circuit 34. Thus, this arrangement is capable of detecting the lamp current $I_{LAMP}$ with high precision without suffering the effects of detection error in the current detection circuit 34.

In addition, the arrangement shown in FIG. 26 does not require the low-pass filter 104 shown in FIG. 24. This allows a required cost to be reduced, and allows the circuit area to be reduced.

It should be noted that, in the fourth embodiment, the second sensing resistor $R_{CS2}$ may be inserted on the ground side in the same manner as the sensing resistor $R_{CS}$ shown in FIG. 24. Also, an arrangement may be made in which the first sensing resistor $R_{CS1}$ is arranged on the anode side of the semiconductor light source 10, and a current detection amplifier is provided as an additional component in order to convert the voltage drop across the first sensing resistor $R_{CS1}$ into a value with the ground voltage as a reference voltage.

Fifth Embodiment

Figure 27:
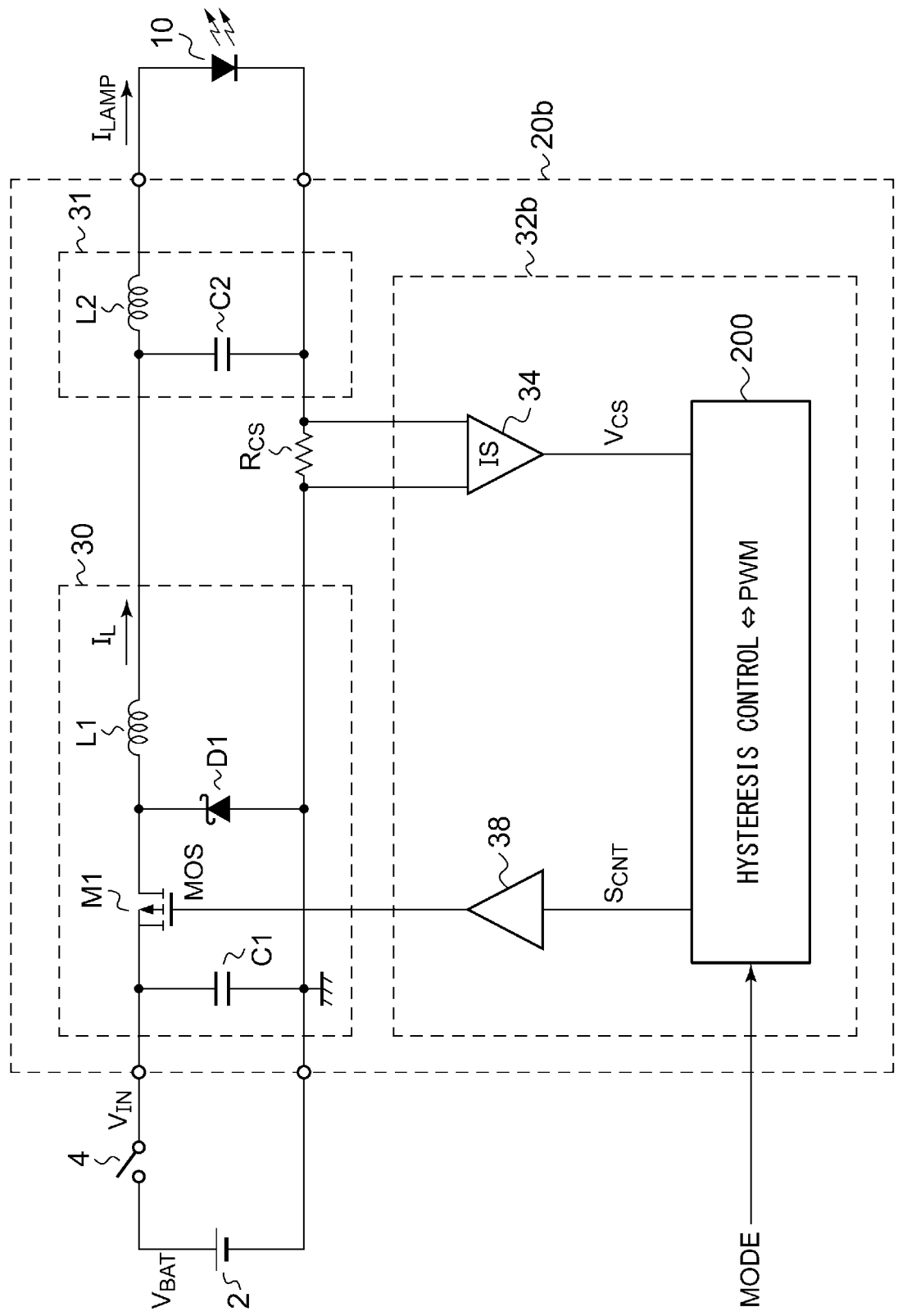
FIG. 27 is a circuit diagram showing a lighting circuit according to a fifth embodiment.

FIG. 27 is a circuit diagram showing a lighting circuit 20b according to a fifth embodiment. The converter controller 32b is configured to be switchable between the hysteresis control mode and an error amplifier control mode based on the output of the error amplifier. For example, the converter controller 32b receives, as an input signal from an external circuit, a mode control signal MODE which indicates the mode to be set. Description will be made in the present embodiment assuming that the PWM (pulse width modulation) control operation is performed in the error amplifier control mode. Accordingly, this mode will be referred to as the "PWM mode".

More specifically, the converter controller 32b includes a current detection circuit 34, a driver 38, and a pulse modulator 200. The current detection circuit 34 generates a current detection signal $V_{CS}$ that corresponds to the coil current (or output current) $I_L$ of the converter 30. The pulse modulator 200 generates a control pulse $S_{CNT}$ based on the current detection signal $V_{CS}$. Specifically, in the hysteresis control mode, the current detection signal $V_{CS}$ is compared with the threshold signals $V_{THH}$ and $V_{THL}$, and the control pulse $S_{CNT}$ is output based on the comparison result. Furthermore, in the PWM mode, the pulse modulator 200 adjusts the duty ratio of the control pulse $S_{CNT}$ such that the time average value of the current detection signal $V_{CS}$ approaches a target value thereof. The driver 38 drives the switching transistor M1 according to the control pulse $S_{CNT}$.

The above is the configuration of the lighting circuit 20b. With the lighting circuit 20b, by selecting a suitable mode according to the operation state of the vehicular lamp, e.g., according to the lamp current (luminance) $I_{LAMP}$, the input voltage $V_{IN}$, the output voltage $V_{OUT}$, etc., this arrangement is capable of solving at least one of the aforementioned problems.

For example, in a situation in which the operation can be performed in the current continuous mode, the hysteresis mode is selected. Conversely, in a situation in which the operation is performed in the current discontinuous mode, the PWM mode is selected. This provides a linear control operation over a wide luminance range (current range). That is to say, this arrangement is capable of solving the third problem.

Furthermore, as can be understood from Expressions (1) and (2), as the lamp current $I_{LAMP}$ becomes smaller, i.e., as $I_{THH}$ and $I_{THL}$ become smaller, the effects of the delay times $\tau_{ON}$ and $\tau_{OFF}$ become larger. Accordingly, in a case in which the control operation is performed so as to select the PWM mode in a situation in which the lamp current $I_{LAMP}$ is small, this arrangement is capable of solving the fourth problem.

Figure 28:
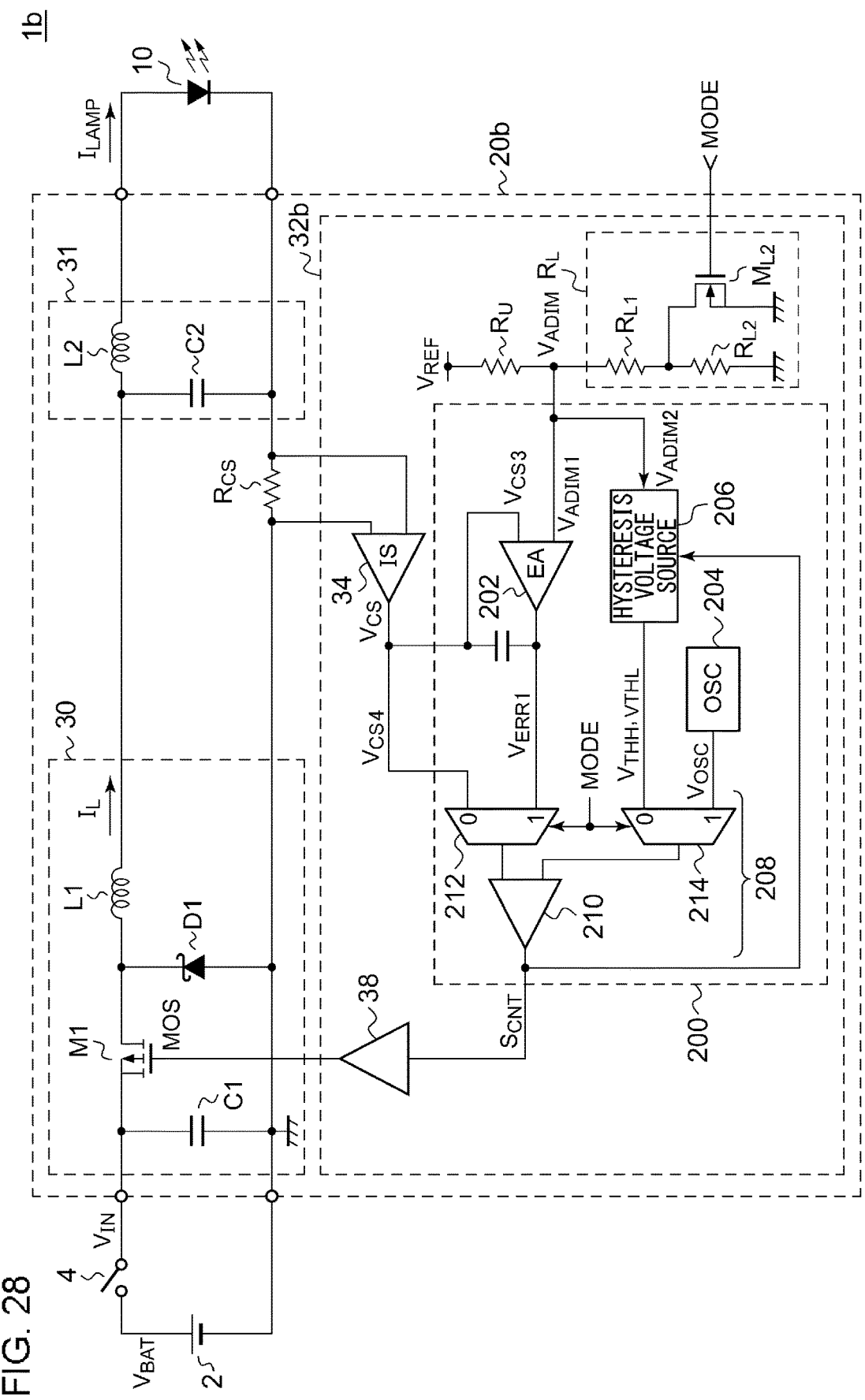
FIG. 28 is a circuit diagram showing an example configuration of the lighting circuit shown in FIG. 27.

FIG. 28 is a circuit diagram showing an example configuration of the lighting circuit 20b shown in FIG. 27. The pulse modulator 200 includes a first error amplifier 202, an oscillator 204, a hysteresis voltage source 206, and a comparator unit 208.

The first error amplifier 202 amplifies the difference between a third current detection signal $V_{CS3}$ that corresponds to the lamp current $I_{LAMP}$ and a first analog signal $V_{ADIM1}$ so as to generate a first error signal $V_{ERR1}$. The first analog signal $V_{ADIM1}$ indicates a target value of the lamp current $I_{LAMP}$ to be set in the PWM mode (error amplifier control mode).

The oscillator 204 generates a periodic signal $V_{OSC}$ having any one from among a triangle wave, a sawtooth wave, and a ramp wave. The hysteresis voltage source 206 generates the upper threshold signal $V_{THH}$ and the lower threshold signal $V_{THL}$ determined according to a second analog signal $V_{ADIM2}$. The second analog signal $V_{ADIM2}$ indicates a target value of the lamp current $I_{LAMP}$ (coil current $I_L$) to be set in the hysteresis control mode.

In the hysteresis control mode, the comparator unit 208 compares a fourth current detection signal $V_{CS4}$ that corresponds to the coil current $I_L$ with the upper threshold signal $V_{THH}$ and the lower threshold signal $V_{THL}$, and generates a control pulse $S_{CNT}$ based on the comparison result. Furthermore, in the PWM mode, the comparator unit 208 compares the first error signal $V_{ERR1}$ with the periodic signal $V_{OSC}$, and generates the control pulse $S_{CNT}$ based on the comparison result. For example, the comparator unit 208 includes a comparator 210, a first selector 212, and a second selector 214. The first selector 212 selects one from among the current detection signal $V_{CS}$ and the first error signal $V_{ERR1}$ according to the mode control signal MODE. The second selector 214 selects one from among the threshold signal $V_{THH}$ or otherwise $V_{THL}$ and the periodic signal $V_{OSC}$ according to the mode control signal MODE. The high level (1) of the mode control signal MODE corresponds to the PWM mode, and the low level (0) thereof corresponds to the hysteresis control mode.

In FIG. 28, the third current detection signal $V_{CS3}$ and the fourth current detection signal $V_{CS4}$ are each configured as a current detection signal $V_{CS}$ generated by the current detection circuit 34. However, the present invention is not restricted to such an arrangement. Also, the third current detection signal $V_{CS3}$ and the fourth current detection signal $V_{CS4}$ may be separately generated by means of different sensing resistors.

For example, the semiconductor light source 10 is configured as a semiconductor laser. In this case, when the lamp current $I_{LAMP}$ is larger than a laser oscillation threshold value, the hysteresis control mode is selected. Conversely, when the lamp current $I_{LAMP}$ is smaller than the laser oscillation threshold value, the PWM mode is selected. In other words, the voltage level of the analog dimming signal $V_{ADIM}$ is controlled according to the mode. The analog dimming voltage $V_{ADIM}$ is generated by dividing the reference voltage $V_{REF}$ by means of resistors. By configuring the voltage dividing ratio to be switchable according to the mode control signal MODE, this arrangement is capable of switching a combination of the lamp current $I_{LAMP}$ and the operation mode of the pulse modulator 200 according to the mode control signal MODE. For example, an arrangement may be made in which an upper-side resistor $R_U$ of the resistor voltage dividing circuit is configured to have a fixed resistance value, and a lower-side resistor $R_L$ thereof is switched according to the mode control signal MODE. The lower-side resistor $R_L$ may include first resistors $R_{L1}$ and $R_{L2}$ and a switch $M_{L2}$, and the on/off state of the switch $M_{L2}$ may be switched according to the mode control signal MODE. In FIG. 28, when the mode control signal MODE is set to 1, the hysteresis control mode is selected. In this mode, the analog dimming signal $V_{ADIM}$ is set to the first analog signal $V_{ADIM1}$. On the other hand, when MODE=0, the PWM mode is selected. In this mode, the analog dimming signal $V_{ADIM}$ is set to the second analog signal $V_{ADIM2}$.

With the pulse modulator 200 shown in FIG. 28, the operation mode is switchable between two modes.

Sixth Embodiment

Figure 29:
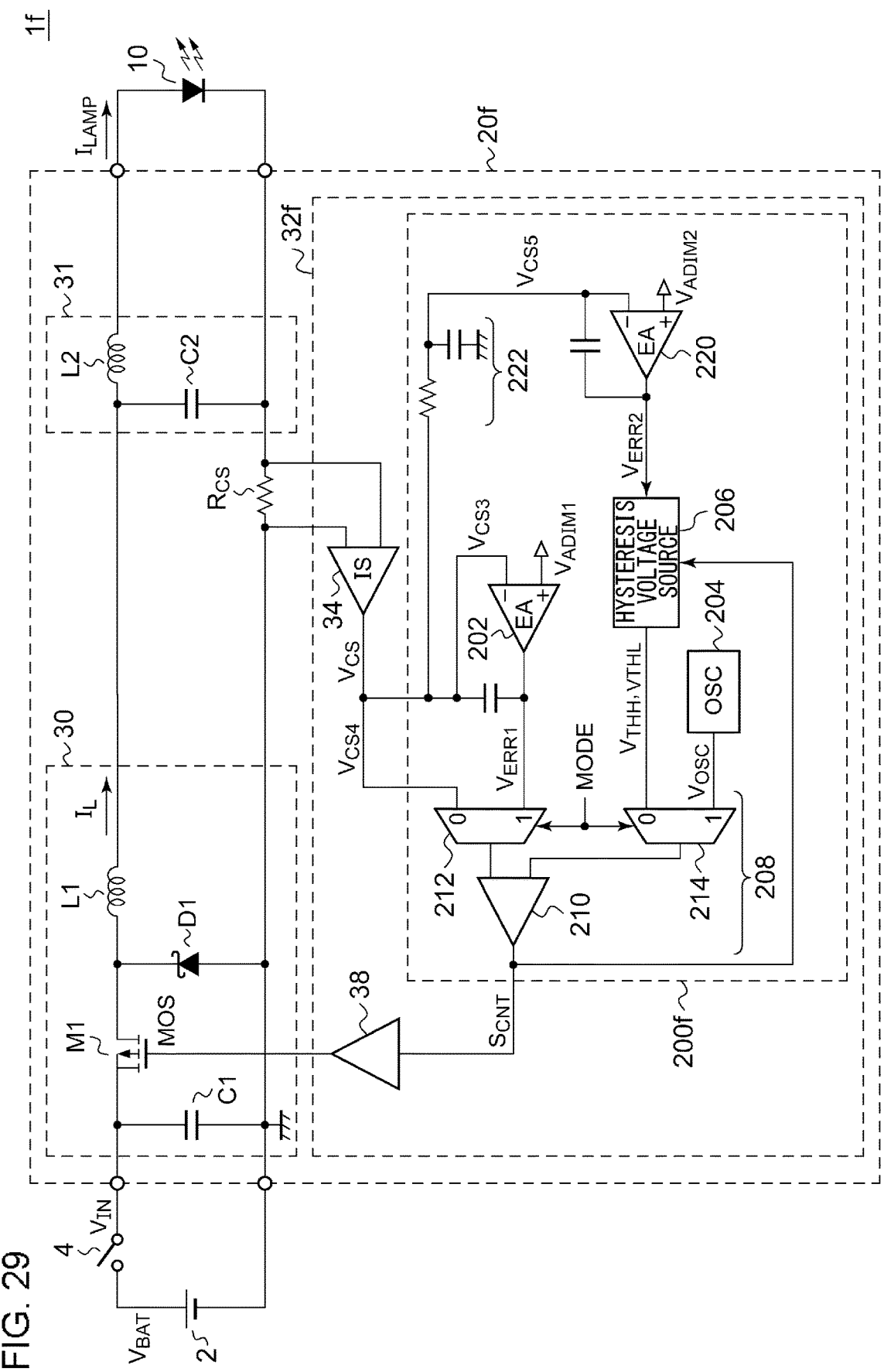
FIG. 29 is a circuit diagram showing a lighting circuit according to a sixth embodiment.

FIG. 29 is a circuit diagram showing a lighting circuit 20f according to a sixth embodiment. The sixth embodiment can be regarded as a combination of the fifth embodiment and the third embodiment.

A converter controller 32f further includes a second error amplifier 220 and a filter 222 in addition to the configuration of the converter controller 32b shown in FIG. 28. The second error amplifier 220 amplifies the difference between the DC component of the lamp current $I_{LAMP}$, i.e., a fifth current detection signal $V_{CS5}$ that corresponds to the DC component of the coil current $I_L$, and a reference signal $V_{ADIM2}$ that indicates a target value of the fifth current detection signal $V_{CS5}$, so as to generate a second error signal $V_{ERR2}$. The filter 222 corresponds to the low-pass filter 104 shown in FIG. 24. The filter 222 smoothes the current detection signal $V_{CS}$ generated by the current detection circuit 34, so as to generate the fifth current detection signal $V_{CS5}$.

The hysteresis voltage source 206 receives the second error signal $V_{ERR2}$ instead of the second analog signal $V_{ADIM2}$ shown in FIG. 28. The hysteresis voltage source 206 generates the upper threshold signal $V_{THH}$ and the lower threshold signal $V_{THL}$ determined according to the second error signal $V_{ERR2}$.

The above is the configuration of the lighting circuit 20f. With the lighting circuit 20f shown in FIG. 29, this arrangement has the advantages provided by the third embodiment in addition to the advantages provided by the fifth embodiment.

Seventh Embodiment

Figure 30:
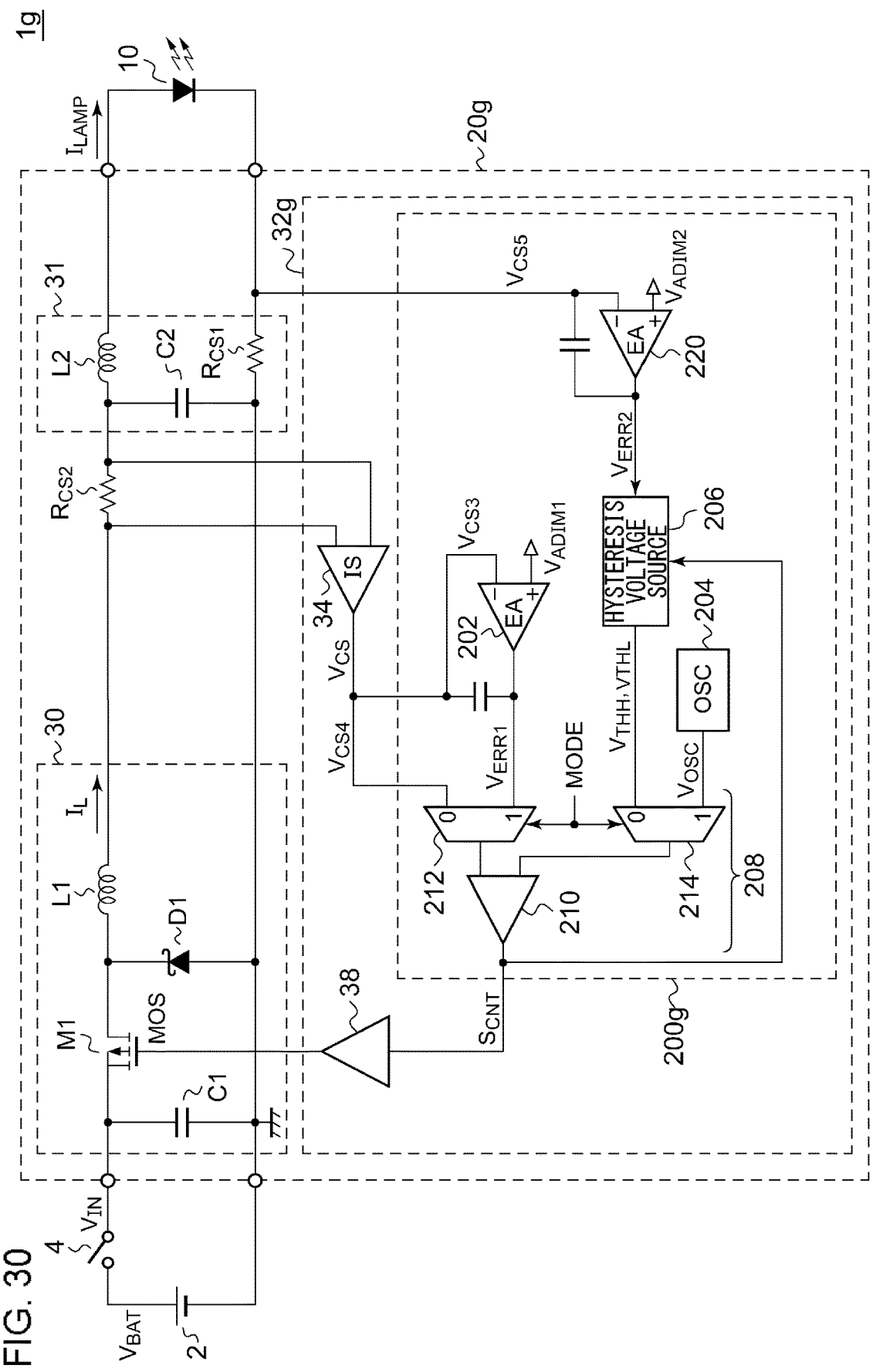
FIG. 30 is a circuit diagram showing a lighting circuit according to a seventh embodiment.

FIG. 30 is a circuit diagram showing a lighting circuit 20g according to a seventh embodiment. The seventh embodiment can be regarded as a combination of the fifth embodiment and the fourth embodiment.

The lighting circuit 20g is provided with two sensing resistors $R_{CS1}$ and $R_{CS2}$ in the same manner as the lighting circuit 20e shown in FIG. 26. The fifth current detection signal $V_{CS5}$ corresponds to the lamp current $I_{LAMP}$ output via the output filter 31 including the inductor L2 and the capacitor C2. The other configuration is the same as that shown in FIG. 29.

Eighth Embodiment

Figure 31:
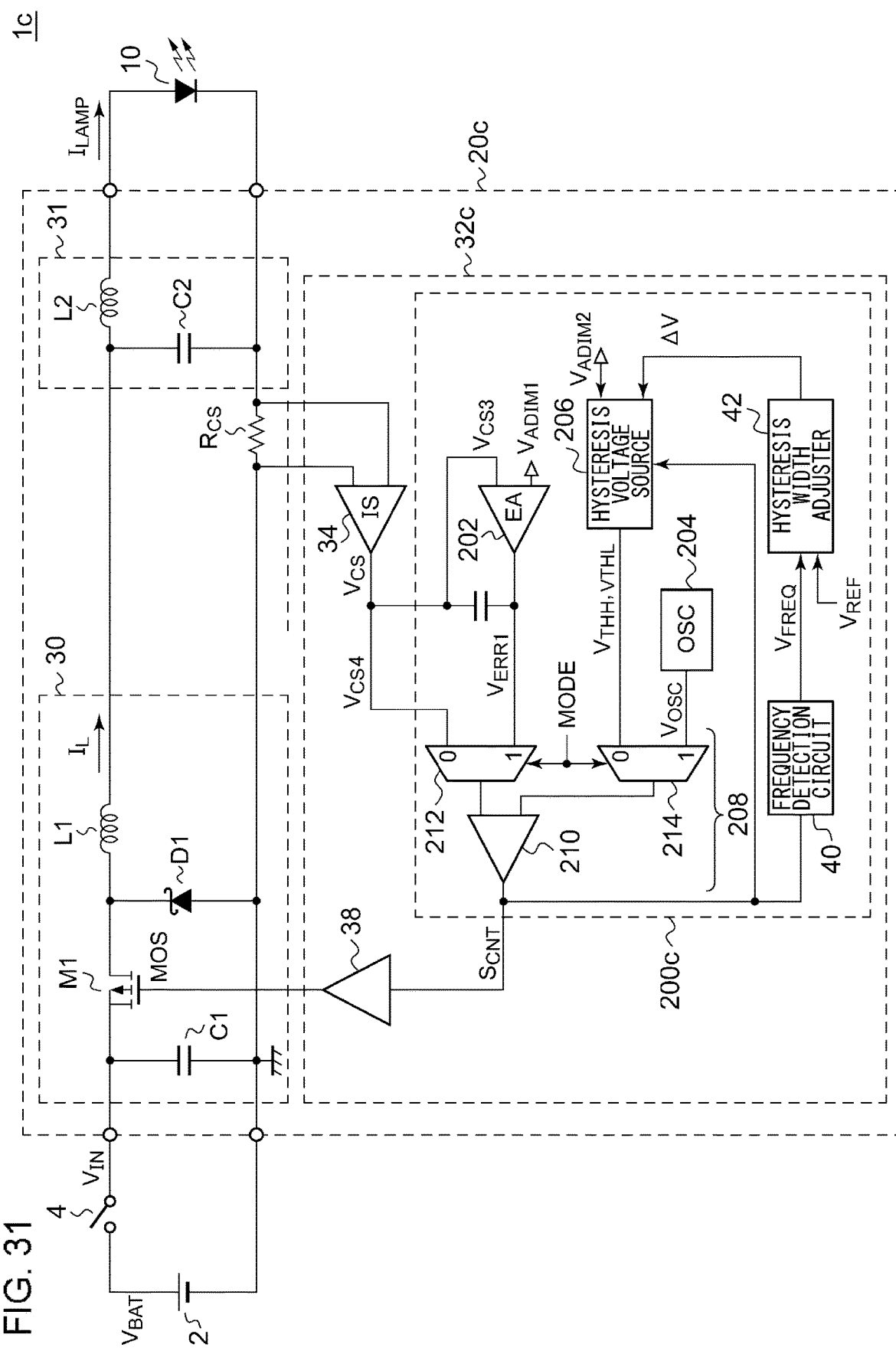
FIG. 31 is a circuit diagram showing a lighting circuit according to an eighth embodiment.

FIG. 31 is a circuit diagram showing a lighting circuit 20c according to an eighth embodiment. A pulse modulator 200c further includes a frequency detection circuit 40 and a hysteresis width adjuster 42 in addition to the configuration of the pulse modulator 200 shown in FIG. 28. In the hysteresis control mode, the frequency detection circuit 40 generates a frequency detection signal $V_{FREQ}$ that indicates the frequency of the control pulse $S_{CNT}$, i.e., the switching frequency of the switching transistor M1. The hysteresis width adjuster 42 adjusts the voltage difference (hysteresis width) $\Delta V$ ($=V_{THH}-V_{THL}$) between the upper threshold signal $V_{THH}$ and the lower threshold signal $V_{THL}$ such that the frequency detection signal $V_{FREQ}$ approaches the reference value $V_{REF}$.

With the eighth embodiment, the switching frequency can be stabilized to a frequency that corresponds to the reference value $V_{REF}$ regardless of fluctuation of the input voltage $V_{IN}$ or the output voltage $V_{OUT}$ or variation in the inductance L1.

Figure 32:
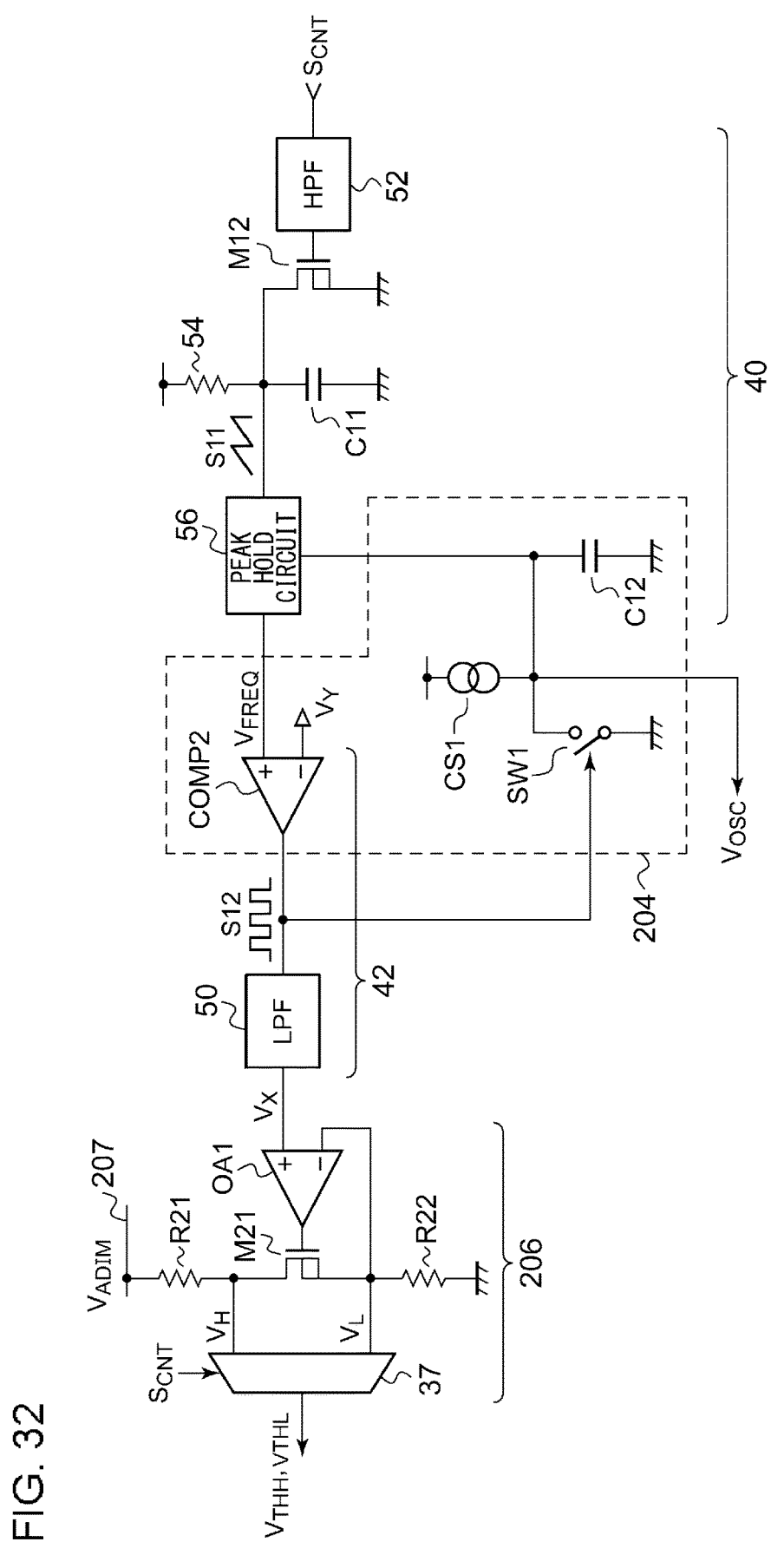

FIG. 32 is a circuit diagram showing an example configuration of a part of the lighting circuit 20c shown in FIG. 31. The hysteresis voltage source 206 includes resistors R21 and R22, a transistor M21, an operational amplifier OA1, and a selector 37.

The first resistor R21, the first transistor M21, and the second resistor R22 are sequentially arranged in series between a line 207 at which the analog dimming signal $V_{ADIM}$ is applied and the ground.

The gate of the first transistor M21 is biased as appropriate. For example, an operational amplifier OA1 is provided in order to bias the first transistor M21. The output of the operational amplifier OA1 is coupled to the gate of the first transistor M21. The non-inverting input terminal of the operational amplifier OA1 is coupled to a connection node that connects the transistor M21 and the second resistor R22. A control voltage $V_x$ is input to the inverting input terminal thereof. With this arrangement, the first transistor M21 is biased such that a current that is proportional to the control voltage $V_x$, i.e., represented by $I_x=V_x/R22$, flows through the first transistor M21. In this case, the two voltages $V_H$ and $V_L$ are represented by the following Expressions.

$V_H = V_{ADIM} - I_x \times R21$ $V_L = I_x \times R22$

In a case in which R21=R22=R, the following Expressions hold true.

$$V_H = V_{ADIM} - I_x \times R$$

$$V_L = I_x \times R$$

Accordingly, the difference of the two voltages (hysteresis width) is represented by $V_H - V_L = V_{ADIM} - 2 \times I_x \times R = V_{ADIM} - 2 \times V_x$.

That is to say, this arrangement is capable of controlling the hysteresis width according to the control voltage $V_x$.

Furthermore, the average of the two voltages is represented by the following Expression.

$$(V_H + V_L)/2 = V_{ADIM}/2$$

That is to say, this arrangement is capable of controlling the average value of the coil current I according to the analog dimming voltage $V_{ADIM}$.

The selector 37 receives the first voltage $V_H$ that occurs at a connection node that couples the first resistor R21 and the first transistor M21, and the second voltage $V_L$ that occurs at a connection node that couples the first transistor M21 and the second resistor R22. The selector 37 outputs one from among the voltages thus received, according to the control pulse $S_{CNT}$.

The frequency detection circuit 40 can be regarded as a F/V conversion circuit. The frequency detection circuit 40 includes a high-pass filter 52, a first capacitor C11, a second transistor M12, a charger circuit 54, and a peak hold circuit 56. The high-pass filter 52 receives the control pulse $S_{CNT}$ or a gate pulse of the switching transistor M1. The high-pass filter 52 can also be regarded as a differentiating circuit. One end of the first capacitor C11 is grounded. The charger circuit 54 charges the first capacitor C11. The charger circuit 54 is configured as a current source or otherwise a resistor. The transistor M12 is coupled in parallel with the first capacitor C11. When the output signal of the high-pass filter 52 exceeds a gate-source threshold signal, the first capacitor C11 is discharged.

A first periodic signal S11 having a ramp waveform is generated at the first capacitor C11. The frequency detection circuit 40 outputs the frequency detection signal $V_{FREQ}$ that corresponds to the amplitude of the first periodic signal S11. Specifically, the peak hold circuit 56 receives the first periodic signal S11, and outputs the frequency detection signal $V_{FREQ}$ that indicates the peak value of the first periodic signal S11. It should be noted that the configuration of the frequency detection circuit 40 is not restricted in particular. The frequency detection circuit 40 may include a capacitor C12 for holding the peak.

The hysteresis width adjuster 42 includes a comparator COMP2 and a low-pass filter 50. The comparator COMP2 generates a pulse signal S12 that indicates a comparison result between the frequency detection signal $V_{FREQ}$ and a reference value $V_y$. The low-pass filter 50 smoothes the output signal S12 of the comparator COMP2.

An error amplifier may be substituted for the comparator COMP2 and the low-pass filter 50.

The oscillator 204 shares circuit components with at least a part of the frequency detection circuit 40 and the hysteresis width adjuster 42. In FIG. 32, the capacitor C12 of the peak hold circuit 56 and the comparator COMP2 of the hysteresis width adjuster 42 are shared as a part of the oscillator 204. The oscillator 204 further includes a current source CS1 and a switch SW1 in addition to the comparator COMP2 and the capacitor C12. The switch SW1 is arranged in parallel with the capacitor C12. The comparator COMP2 compares the voltage $V_{C21}$ at the capacitor C12 with a predetermined threshold voltage $V_y$. When $V_{C21}$ is larger than $V_y$, the switch SW1 is turned on. With this arrangement, the voltage $V_{C21}$ across the capacitor C21 is configured as a periodic signal $V_{OSC}$ having a ramp waveform. By configuring the capacitor C21 and the comparator COMP2 as shared components, this suppresses an increase in the circuit area.

It should be noted that a comparator may be provided in addition to the capacitor C11, the current source 54, and the transistor M12, so as to form the oscillator 204.

Ninth Embodiment

Figure 33:
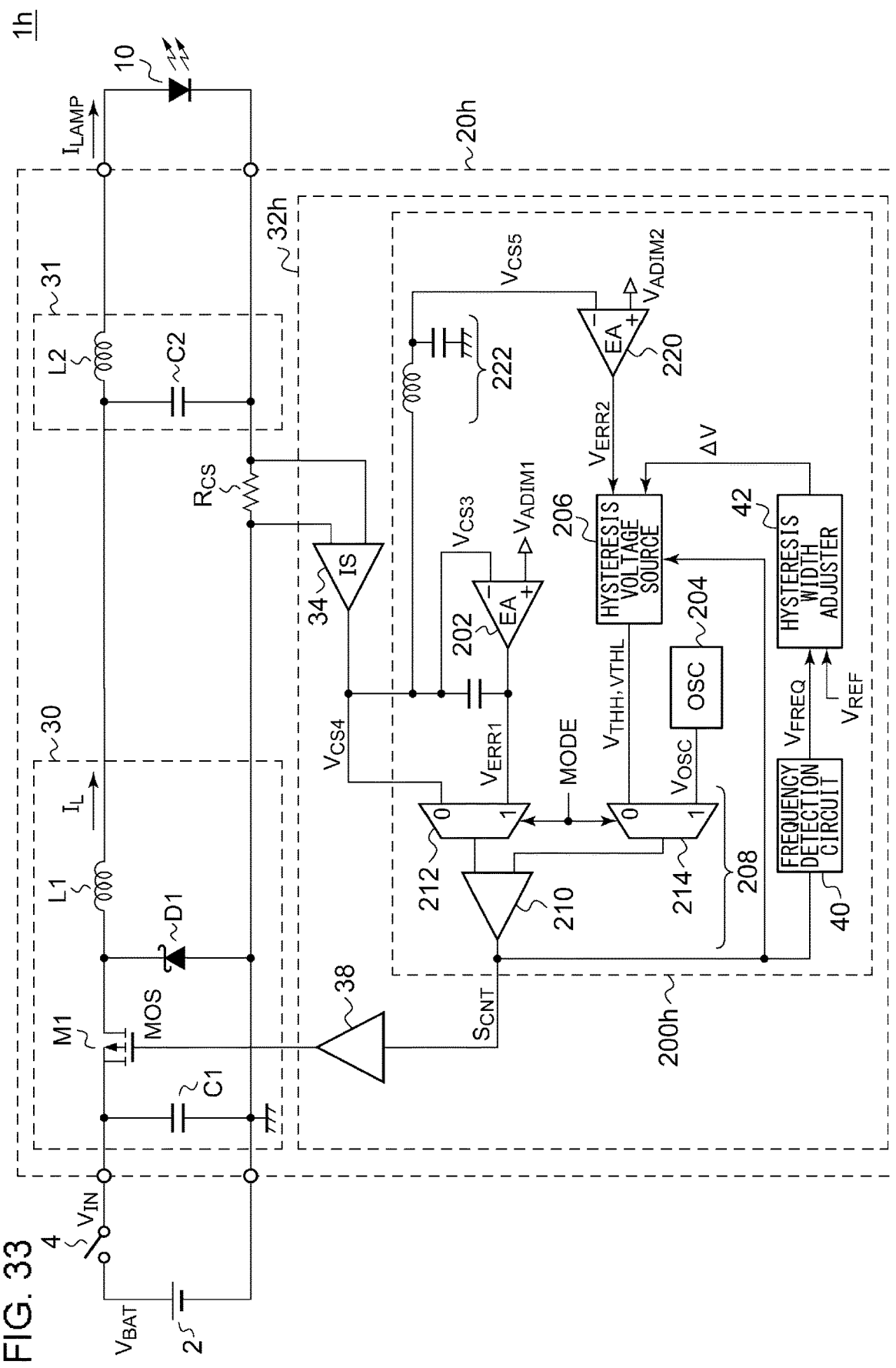
FIG. 33 is a circuit diagram showing a lighting circuit according to a ninth embodiment.

FIG. 33 is a circuit diagram showing a lighting circuit 20h according to a ninth embodiment. The lighting circuit 20h is configured as a combination of the lighting circuit 20f shown in FIG. 29 and the lighting circuit 20c shown in FIG. 31. A converter controller 32h shown in FIG. 33 further includes a second error amplifier 220 and a filter 222 in addition to the converter controller 32c shown in FIG. 31. The second error amplifier 220 amplifies the difference between the DC component of the lamp current $I_{LAMP}$ i.e., the fifth current detection signal $V_{CS5}$ that corresponds to the DC component of the coil current $I_L$, and a reference signal $V_{ADIM2}$ that indicates a target value of the fifth current detection signal $V_{CS5}$, so as to generate a second error signal $V_{ERR2}$. The filter 222 smoothes the current detection signal $V_{CS}$ generated by the current detection circuit 34, so as to generate the fifth current detection signal $V_{CS5}$.

The hysteresis voltage source 206 receives the second error signal $V_{ERR2}$ instead of the second analog signal $V_{ADIM2}$ shown in FIG. 31. The hysteresis voltage source 206 generates the upper threshold signal $V_{THH}$ and the lower threshold signal $V_{THL}$, which are shifted up and down according to the second error signal $V_{ERR2}$. The voltage difference $\Delta V$ between the upper threshold signal $V_{THH}$ and the lower threshold signal $V_{THL}$ is adjusted by the hysteresis width adjuster 42.

With the ninth embodiment, the fifth current detection signal $V_{CS5}$ may be generated based on the voltage drop across the sensing resistor $R_{CS1}$ as shown in FIG. 30. That is to say, the lighting circuit 20g shown in FIG. 30 and the lighting circuit 20c shown in FIG. 31 may be combined.

Tenth Embodiment

Figure 34:
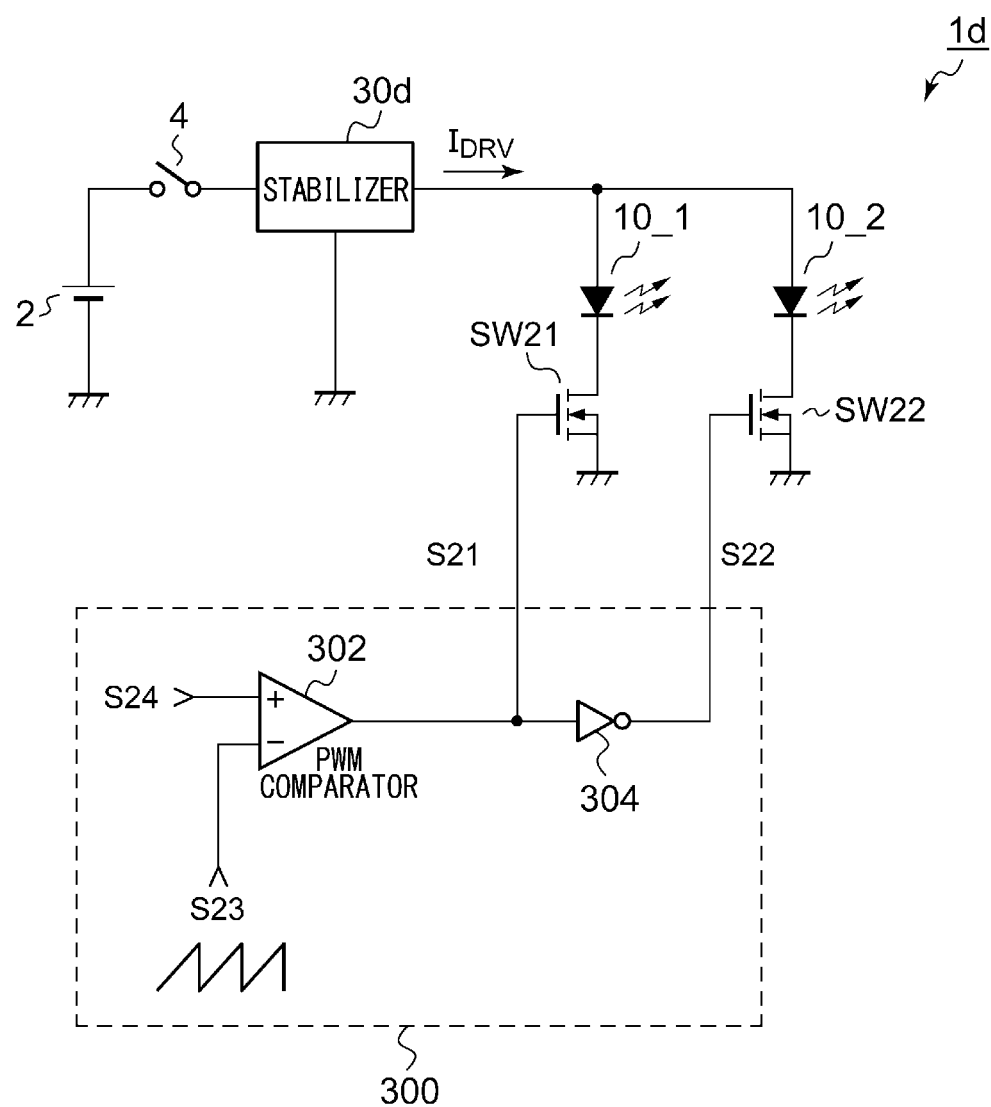
FIG. 34 is a block diagram showing a vehicular lamp according to a tenth embodiment.

FIG. 34 is a block diagram showing a vehicular lamp 1d according to a tenth embodiment. The vehicular lamp 1d includes a first semiconductor light source 10_1 and a second semiconductor light source 10_2 each having one end coupled to a common node, a first switch SW21 arranged in series with the first semiconductor light source 10_1, a second switch SW22 arranged in series with the second semiconductor light source 10_2, and a switching converter 30d that supplies a driving current $I_{DRV}$ to the first semiconductor light source 10_1 and the second semiconductor light source 10_2. The switching converter 30d may be configured using a combination of the converters and the controllers described in the first embodiment through the eighth embodiment. However, the configuration of the switching converter 30d is not restricted to such an arrangement.

The vehicular lamp 1d is configured such that the first switch SW21 and the second switch SW22 are switched on and off according to the PWM dimming pulses S21 and S22 having opposite logical values. The PWM controller 300 may include a PWM comparator 302 that compares a PWM ramp wave S23 with a duty instruction value S24 so as to generate the first PWM dimming pulse S21 and an inverter 304 that inverts the first PWM dimming pulse S21 so as to generate the second PWM dimming pulse S22.

Figure 35:
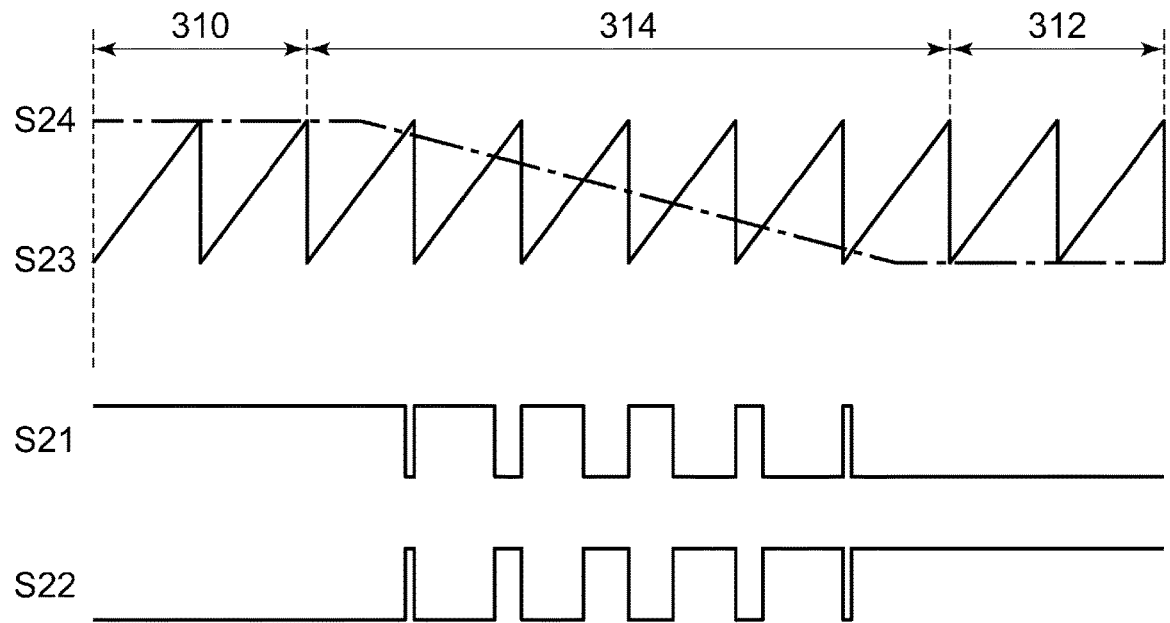
FIG. 35 is an operation waveform diagram showing the operation of the vehicular lamp shown in FIG. 34.

The above is the configuration of the vehicular lamp 1d. FIG. 35 is an operation waveform diagram showing the operation of the vehicular lamp 1d shown in FIG. 34.

In a region 310 in which the PWM dimming pulse S21 has a duty ratio of 100%, this arrangement is capable of turning on one from among the first semiconductor light source 10_1 and the second semiconductor light source 10_2. In a region 312 in which the PWM dimming pulse S21 has a duty ratio of 0%, this arrangement is capable of turning on the other one from among the first semiconductor light source 10_1 and the second semiconductor light source 10_2. Furthermore, by changing the duty ratio in a region 314, this arrangement is capable of switching the lighting-on state of the first semiconductor light source 10_1 to the lighting-on state of the second semiconductor light source 10_2 in a seamless manner.

Only a single semiconductor light source 10 is coupled to the output of the single converter 30d over all the periods regardless of the duty ratio. That is to say, only a single semiconductor light source 10 is turned on over all the periods. This allows fluctuation of the output of the switching converter 30d to be reduced, thereby facilitating the design of the switching converter 30d.

For example, in a case of employing a variable light distribution additional beam in a headlamp, there is a demand for switching two light source systems according to the vehicle speed information. That is to say, there is a demand for a function of enabling a distant range high-beam mode employing a spot light distribution when the vehicle is traveling at high speed, and a function of enabling a diffusion beam mode employing a wide light distribution when the vehicle is traveling at low speed. In a case in which a semiconductor light source is provided for each light distribution mode, when the light distribution mode is suddenly switched, this leads to sudden switching of the light distribution. In some cases, this involves sensations of visual discomfort. In such a case, with the tenth embodiment, this arrangement is capable of switching the light distribution in a seamless manner while gradually changing the amounts of light output from the two semiconductor light sources. This allows such sensations of visual discomfort to be reduced, and provides an impression of high quality.

Application

Figure 36:
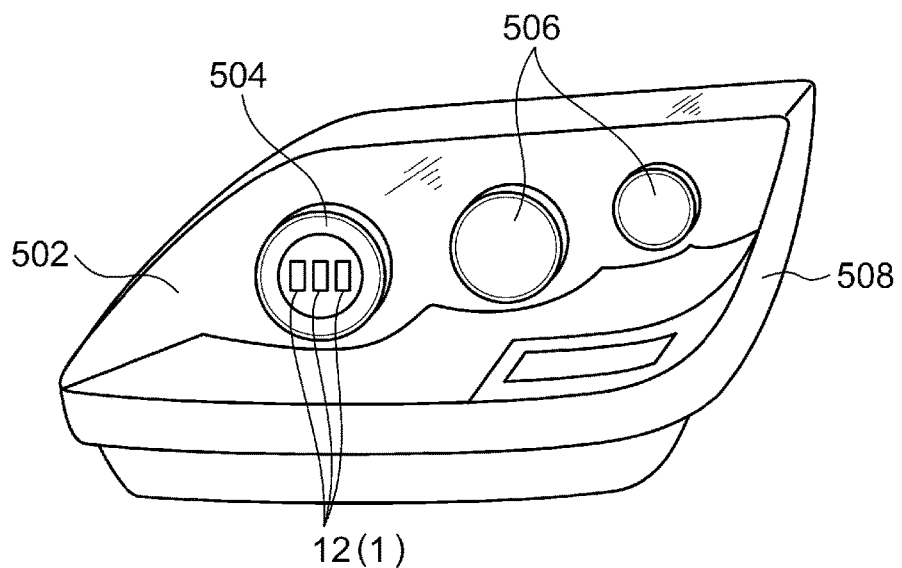
FIG. 36 is a perspective view of a lamp unit including the vehicular lamp.

Lastly, description will be made regarding the usage of the vehicular lamp 1. FIG. 36 is a perspective view showing a lamp unit (lamp assembly) 500 including the vehicular lamp 1. The lamp unit 500 includes a transparent cover 502, a high-beam unit 504, a low-beam unit 506, and a housing 508. The aforementioned vehicular lamp 1 may be employed as the high-beam unit 504, for example. Also, the vehicular lamp 1 may be employed as the low-beam unit 506 instead of or otherwise in addition to the high-beam unit 504.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

In the fifth embodiment, in the hysteresis mode, a bottom-detection and on-time-fixed control operation or otherwise a peak-detection and off-time-fixed control operation may be performed. Also, in the error amplifier control mode, other control operations using an output of the error amplifier such as a PFM control operation may be employed instead of the PWM control operation.

Description has been made in the embodiments regarding the hysteresis control operation for a step-down converter. Also, the present invention is applicable to step-up converters and step-up/step-down converters. It should be noted that, in a case of a step-down converter, the coil current is equivalent to the output current. However, in a case of a step-up converter, the coil current is equivalent to the input current. A part of the coil current corresponds to the output current.

What is claimed is:

1. A lighting circuit comprising:
a switching converter structured to supply electric power to a semiconductor light source; and
a converter controller structured to control the switching converter,
wherein the converter controller comprises:
a current detection circuit structured to generate a current detection signal that corresponds to a driving current supplied from the switching converter to the semiconductor light source;
a hysteresis comparator structured to compare the current detection signal with an upper threshold signal and a lower threshold signal, and to generate a control pulse according to a comparison result;
a driver structured to drive a switching transistor of the switching converter according to the control pulse;
a frequency detection circuit structured to generate a frequency detection signal that indicates a frequency of the control pulse; and
a threshold voltage adjustment circuit structured to change a voltage difference between the upper threshold signal and the lower threshold signal such that the frequency detection signal approaches a reference value,
wherein the threshold voltage adjustment circuit comprises an error signal generating circuit structured to generate a frequency error signal that corresponds to a difference between the frequency detection signal and the reference value,
and wherein the threshold voltage adjustment circuit is structured to change the voltage difference between the upper threshold signal and the lower threshold signal according to the frequency error signal.

2. The lighting circuit according to claim 1, wherein the threshold voltage adjustment circuit comprises a voltage source structured to generate an upper voltage and a lower voltage, and to change a voltage difference between the upper voltage and the lower voltage according to the frequency error signal,
and wherein the hysteresis comparator comprises:
a selector structured to receive the upper voltage and the lower voltage, and to select one from among the upper voltage and the lower voltage according to the control pulse; and
a first comparator structured to compare the current detection signal with a threshold voltage that corresponds to an output of the selector.

3. The lighting circuit according to claim 2, wherein the voltage source comprises:
a first terminal at which the upper voltage is developed;
a second terminal at which the lower voltage is developed;

a transistor provided between the first terminal and the second terminal;

a first resistor arranged between a fixed voltage line and the first terminal;

a second resistor arranged between the second terminal and a ground line; and an operational amplifier having an output coupled to a control terminal of the transistor, one input terminal coupled to receive the frequency error signal, and the other input terminal coupled to the second terminal.

4. The lighting circuit according to claim 1, wherein the frequency detection circuit comprises:

a high-pass filter coupled to receive the control pulse or a gate pulse of the switching transistor;

a first capacitor;

a charger circuit structured to charge the first capacitor; and a second transistor structured to discharge the first capacitor according to an output signal of the high-pass filter, and wherein the frequency detection circuit outputs the frequency detection signal that corresponds to an amplitude of a first periodic signal that occurs across the first capacitor.

5. The lighting circuit according to claim 1, further comprising a modulator structured to generate a modulation signal having a lower frequency than a switching frequency of the switching transistor, and to modulate a difference between the upper threshold signal and the lower threshold signal according to the modulation signal.

6. The lighting circuit according to claim 1, further comprising a modulator structured to generate a modulation signal having a lower frequency than a switching frequency of the switching transistor, and having any one from among a triangle wave, a sawtooth wave, a ramp wave, a sine wave, and a trapezoidal wave, and to superimpose the modulation signal on the reference value.

7. The lighting circuit according to claim 1, wherein the converter controller is structured to receive a pulse dimming signal that has been pulse modulated according to a target light amount for the semiconductor light source, and to alternately repeat an operating period in which the switching transistor is switched on and off and a suspension period in which the switching is suspended, and wherein, during the suspension period, the threshold voltage adjustment circuit holds the frequency detection signal at a level that has been set in the immediately previous operating period.

8. The lighting circuit according to claim 7, wherein the error signal generating circuit comprises:

a second comparator structured to generate a pulse signal that indicates a comparison result between the frequency detection signal and the reference value;

a sample-and-hold capacitor having one end that is set to a fixed electric potential; and a resistor and a switch arranged in series between an output of the second comparator and the other end of the sample-and-hold capacitor, and wherein the switch is structured to switch on and off according to the pulse dimming signal.

9. A vehicular lamp comprising:

a semiconductor light source; and the lighting circuit according to claim 1, structured to turn on the semiconductor light source.

10. A vehicular lamp comprising:

a first semiconductor light source and a second semiconductor light source each having one end coupled to a common node;

a first switch arranged in series with the first semiconductor light source;

a second switch arranged in series with the second semiconductor light source; and the lighting circuit according to claim 1, structured to supply a driving current to the first semiconductor light source and the second semiconductor light source, wherein the first switch and the second switch are structured to switch on and off according to respective PWM dimming signals configured as logic signals that are opposite to each other.

11. A lighting circuit comprising:

a switching converter structured to supply electric power to a semiconductor light source; and a converter controller structured to control the switching converter, wherein the converter controller comprises:

a current detection circuit structured to generate a current detection signal that corresponds to a driving current supplied from the switching converter to the semiconductor light source;

a hysteresis comparator structured to compare the current detection signal with an upper threshold signal and a lower threshold signal, and to generate a control pulse according to a comparison result; and a driver structured to drive a switching transistor of the switching converter according to the control pulse, and wherein a difference between the upper threshold signal and the lower threshold signal is modulated so as to be changing with time.

12. The lighting circuit according to claim 11, further comprising a modulator structured to generate a modulation signal having a lower frequency than a switching frequency of the switching transistor, and to modulate the difference between the upper threshold signal and the lower threshold signal according to the modulation signal.

13. The lighting circuit according to claim 12, wherein the modulator comprises:

an oscillator structured to generate a modulation signal having any one from among a triangle wave, a sawtooth wave, a ramp wave, a sine wave, and a trapezoidal wave; and a voltage source structured to generate an upper voltage and a lower voltage, and to change a voltage difference between the upper voltage and the lower voltage according to the modulation signal, and wherein the hysteresis comparator comprises:

a selector structured to receive the upper voltage and the lower voltage, and to select one from among the upper voltage and the lower voltage according to the control pulse; and a first comparator structured to compare the current detection signal with a threshold voltage that corresponds to an output of the selector.

14. A lighting circuit comprising:

a switching converter structured to supply electric power to a semiconductor light source; and a converter controller structured to control the switching converter, wherein the converter controller comprises:

an error amplifier structured to amplify a difference between a first current detection signal that corresponds to a DC component of a coil current of the switching converter or otherwise a DC component of an output current thereof and an analog signal that indicates a driving current to be supplied to the semiconductor light source, so as to generate an error signal;

a hysteresis comparator structured to compare a second detection signal that corresponds to the coil current with an upper threshold signal and a lower threshold signal determined according to the error signal, and to generate a control pulse that corresponds to a comparison result; and a driver structured to drive a switching transistor of the switching converter according to the control pulse.

15. The lighting circuit according to claim 14, further comprising an output filter structured to smooth the output current of the switching converter so as to generate the driving current, wherein the first current detection signal corresponds to the driving current.

16. The lighting circuit according to claim 14, wherein the converter controller further comprises:

a current detection circuit structured to generate the second current detection signal that corresponds to the coil current of the switching converter; and a low-pass filter structured to smooth the second current detection signal so as to generate the first current detection signal.

17. A vehicular lamp comprising:

a semiconductor light source; and the lighting circuit according to claim 14, structured to turn on the semiconductor light source.

18. A lighting circuit comprising:

a switching converter structured to supply electric power to a semiconductor light source; and a converter controller structured to control the switching converter, wherein the converter controller is structured to be switchable between a hysteresis control mode and an error amplifier control mode based on an output of an error amplifier.

19. The lighting circuit according to claim 18, wherein the semiconductor light source is structured as a semiconductor laser, wherein, when a driving current supplied to the semiconductor laser is larger than a laser oscillation threshold value, the hysteresis control mode is selected, and wherein, when the driving current is smaller than the laser oscillation threshold value, the error amplifier control mode is selected.

20. The lighting circuit according to claim 18, wherein the converter controller comprises:

a first error amplifier structured to amplify a difference between a third current detection signal that corresponds to a DC component of a coil current of the switching converter or otherwise a DC component of an output current thereof and a first analog signal, so as to generate a first error signal;

an oscillator structured to generate a periodic signal having any one from among a triangle wave, a sawtooth wave, and a ramp wave;

a hysteresis voltage source structured to generate an upper threshold signal and a lower threshold signal determined according to a second analog signal;

a comparator unit structured such that: (i) in the hysteresis control mode, the comparator unit compares a fourth current detection signal that corresponds to the coil current with the upper threshold signal and the lower threshold signal, and generates a control pulse that corresponds to a comparison result; and such that (ii) in the error amplifier control mode, the comparator unit compares the first error signal with the periodic signal, and generates a control pulse that corresponds to a comparison result; and a driver structured to drive a switching transistor of the switching converter according to the control pulse.

21. The lighting circuit according to claim 20, wherein the converter controller further comprises:

a frequency detection circuit structured to generate a frequency detection signal that indicates a frequency of the control pulse; and a hysteresis width adjuster structured to change a voltage difference between the upper threshold signal and the lower threshold signal such that the frequency detection signal approaches a reference value.

22. The lighting circuit according to claim 21, wherein the oscillator shares circuit components with at least a part of the frequency detection circuit and the hysteresis width adjuster.

23. The lighting circuit according to claim 20, wherein the converter controller further comprises a second error amplifier structured to amplify a difference between a fifth current detection signal that corresponds to a DC component of the coil current or otherwise a DC component of the output current and a reference signal that indicates a target value of the fifth detection signal, so as to generate a second error signal, and wherein the hysteresis voltage source is structured to receive the second error signal instead of the second analog signal, and to generate the upper threshold signal and the lower threshold signal determined according to the second error signal.

24. The lighting circuit according to claim 23, further comprising an output filter structured to smooth the output current of the switching converter, so as to generate a driving current to be supplied to the semiconductor light source, wherein the fifth current detection signal corresponds to the driving current.

25. The lighting circuit according to claim 24, wherein the converter controller comprises:

a current detection circuit structured to generate a current detection signal that corresponds to the coil current; and a low-pass filter structured to smooth the current detection signal generated by the current detection circuit, so as to generate the fifth current detection signal.

\* \* \* \* \*